United States Patent [19]

Propster et al.

[11] Patent Number: 4,541,048
[45] Date of Patent: Sep. 10, 1985

[54] MODULAR PROGRAMMABLE SIGNAL PROCESSOR

[75] Inventors: John A. Propster, La Mirada; John H. Rowan, Fullerton, both of Calif.

[73] Assignee: Hughes Aircraft Company, El Segundo, Calif.

[21] Appl. No.: 350,937

[22] Filed: Feb. 22, 1982

Related U.S. Application Data

[63] Continuation of Ser. No. 179,188, Aug. 18, 1980, abandoned, which is a continuation of Ser. No. 949,341, Oct. 6, 1978, abandoned.

[51] Int. Cl.³ ............................ G06F 7/38; G06F 15/00
[52] U.S. Cl. .................................... 364/200; 364/736
[58] Field of Search ................................ 364/200, 736

[56] References Cited

U.S. PATENT DOCUMENTS

| 3,312,943 | 4/67 | McKindles et al. | 364/200 |
|---|---|---|---|
| 3,537,074 | 10/1970 | Stokes et al. | 364/200 |
| 3,564,226 | 2/1971 | Seligman | 364/736 |
| 3,815,095 | 6/1974 | Wester | 364/200 |
| 3,875,391 | 4/1975 | Shapiro et al. | 364/736 |
| 4,025,771 | 5/1977 | Lynch, Jr. et al. | 364/736 |
| 4,041,461 | 8/1977 | Kratz et al. | 364/200 |
| 4,136,383 | 1/1979 | Takesue | 364/200 |

OTHER PUBLICATIONS

"Parallel Solutions of a Nonlinear Elliptic Boundary Value Problem"; Arthor: H. Schomberg; From: Simulation of Systems, Proceedings of the 8th AICA Congress, Delft, Aug. 23-28, 1976, North Holland Publishing Company, Amsterdam.
Paper from Elektronische Rechenlagen 20(1978) (3), 115-123; M3R—"A Modular Multi-Microcomputer System with Residual Availability and Process Security Structure".
IBM Technical Disclosure Bulletin, "Processing System", R. P. Fletcher, vol. 11, No. 5, Oct. 1968.
"Mehrrechnersysteme zur Erhohung der Zuverlassigkeit", J. Zurn; AEG Telefunken, Fachgebiet Ortong, 7900 Ulm/Donau; Anaewandte Informatik 8/75; pp. 333-341.

*Primary Examiner*—David H. Malzahn
*Attorney, Agent, or Firm*—W. J. Adam; E. F. Oberheim; A. W. Karambelas

[57] ABSTRACT

A signal processing system that has an improved modular architecture so that a selected number of arithmetic element (AE) units may be utilized with a single arithmetic element controller (AEC) unit to provide a system that can be readily expanded or decreased on computational ability. All of the AE units perform similar calculations under control of the AEC unit in response to common address control and coefficient signals. Each AE unit has its own extended work store (EWS) unit with all of the EWS units responding to the same address and control signals, from either the AEC unit or an external interface unit to conform to the modular architecture. Each EWS unit is synchronized with the AE unit, thus allowing continuous and high speed computations to be performed. Also, each of the EWS units is coupled to the external interface unit for receiving and transferring data when not being accessed by the AEC unit. The AE units, each of which are similar, may have a single multiplier and storage unit matched to a plurality of register and arithmetic logic (RALU) units so that parallel calculations may be performed utilizing the multiplier output data, thus increasing the overall speed of calculation a plurality of times of the system clock speed.

27 Claims, 39 Drawing Figures

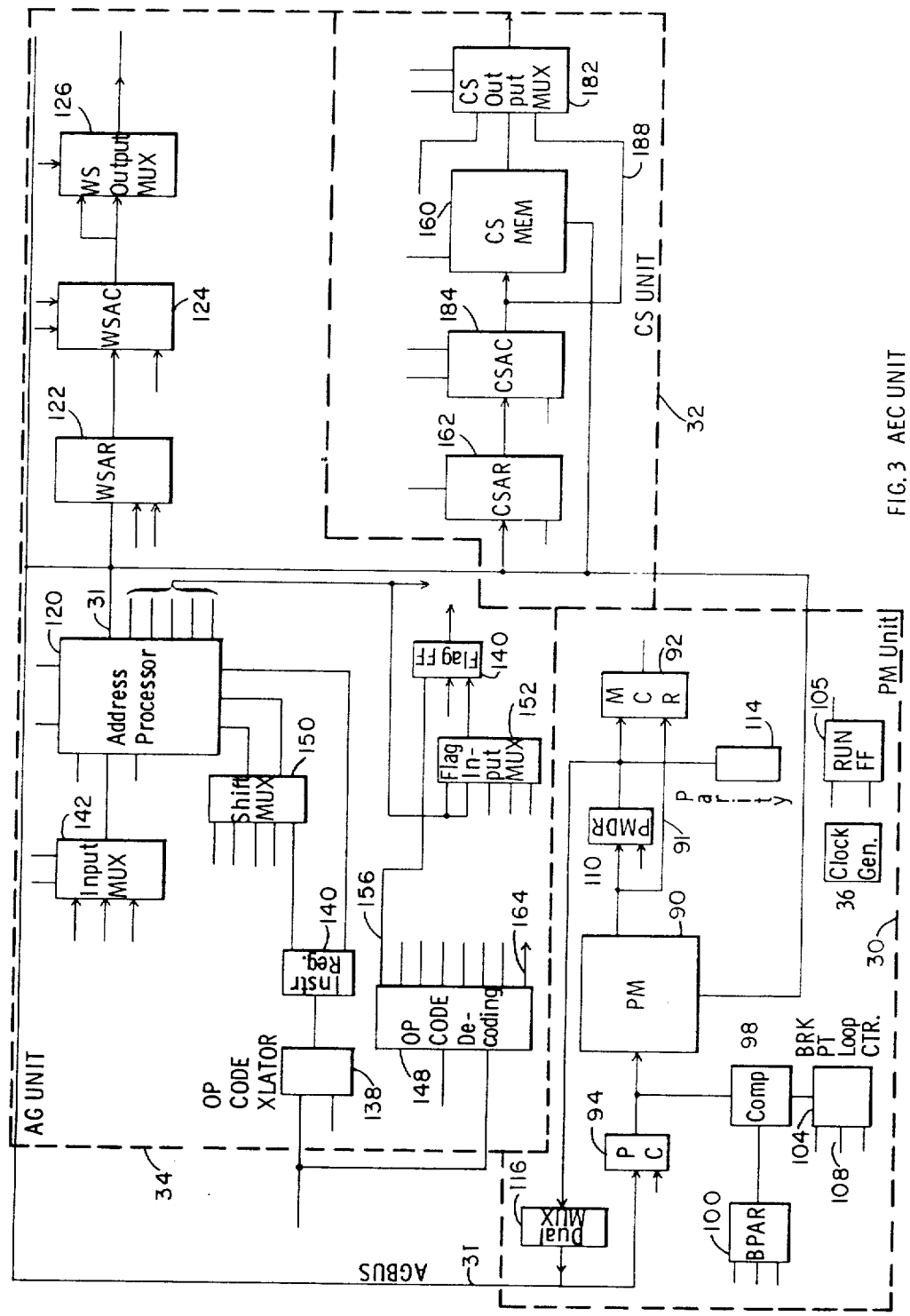
FIG. 3 AEC UNIT

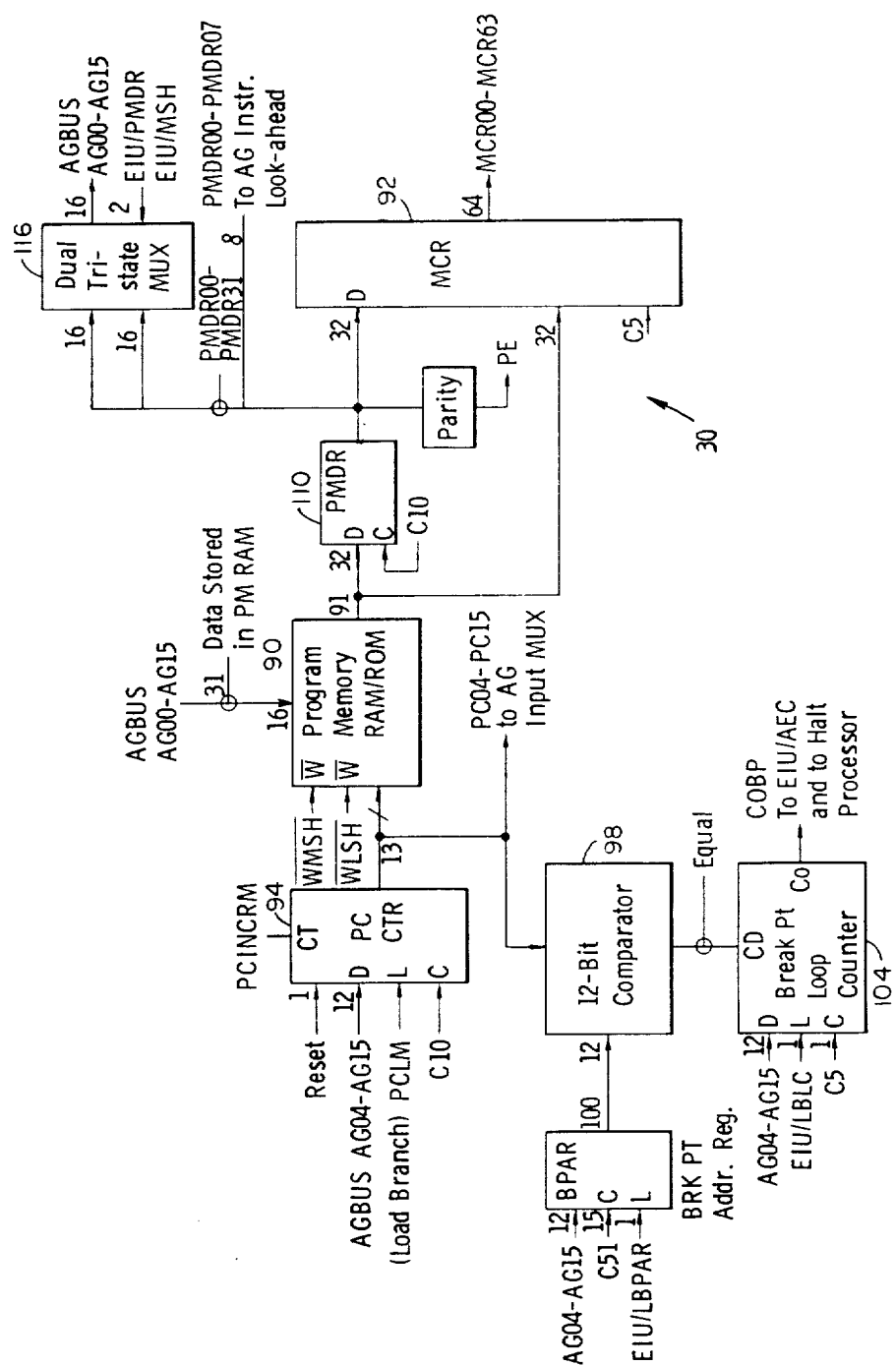
FIG. 4a PM UNIT

FIG. 5

| Field No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Normal Format | AEC OP Code | AG A Reg Addr. | AG B Reg Add. | SPARE | WS/ EWS Control | CS Control | MRR MDR Control MDRD | Multiplier Control | LIMITER CONTROL | Instruction Parity | Output Enable | Instruction/ Conditional Operation Field | Condition Controls | Input Register Control | A Address | B Address |
| | 0 7\|8 | 11\|12 | 15\|16\|17 | | 24\|25 27\|28 | | 32\|33/ 34 | 35/ 36 | 37 | 38 | 39 | 48\|49 51\|52 | | 55\|56 58\|59 | 60 63 |
| Immediate Data Format | | | | | | Immediate Data | | | | | | | | | |

AEC Control Fields | AE Control Fields

Address Generator | Storage | Multiplier | RALU

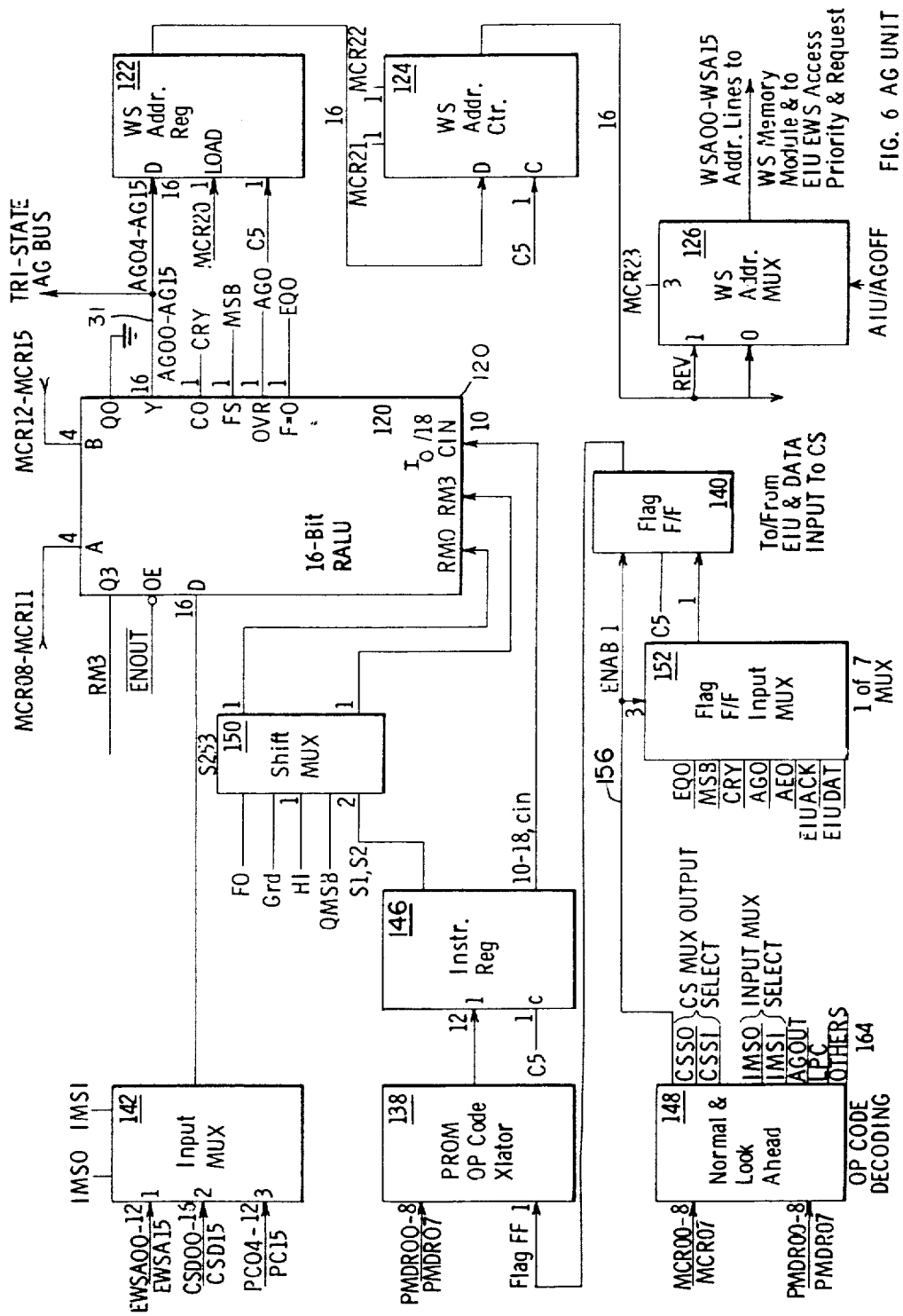
FIG. 6 AG UNIT

CS UNIT

AE & EWS UNITS

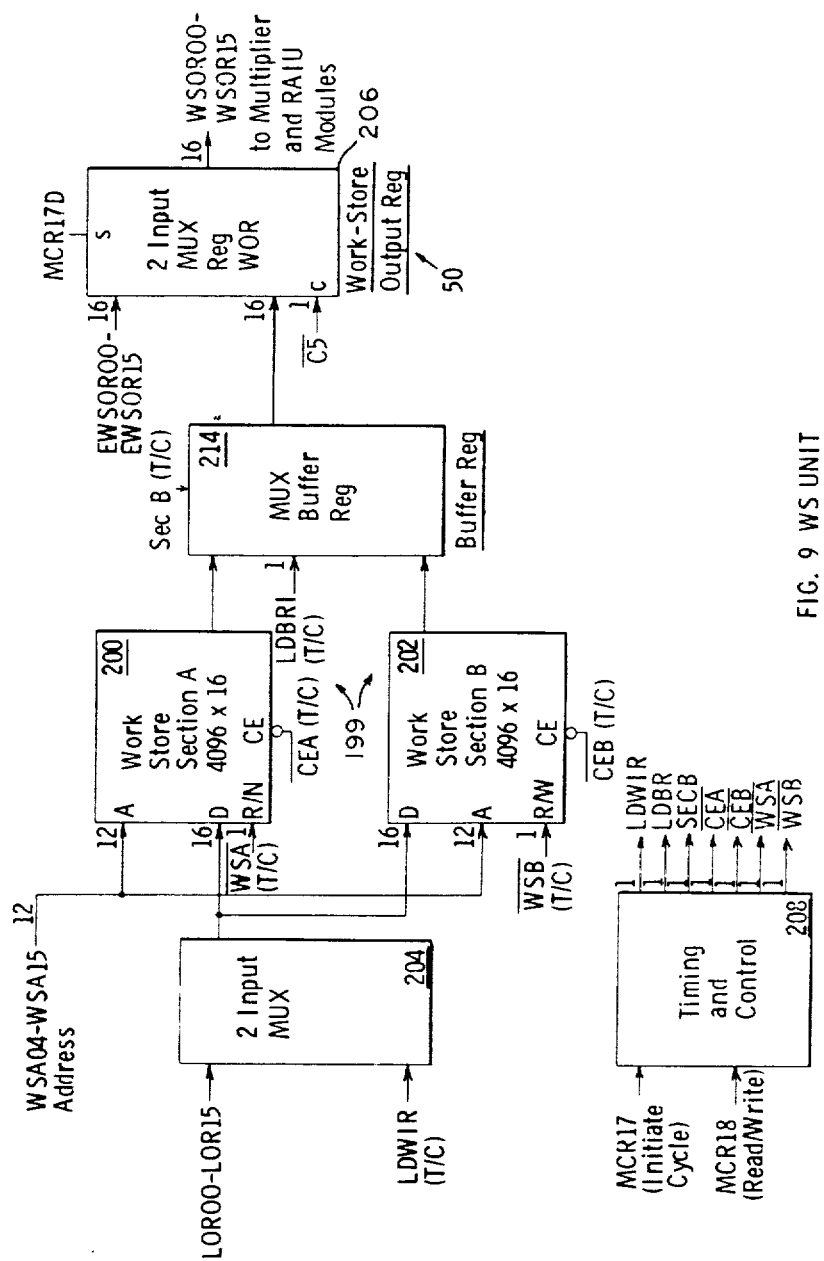
FIG. 9 WS UNIT

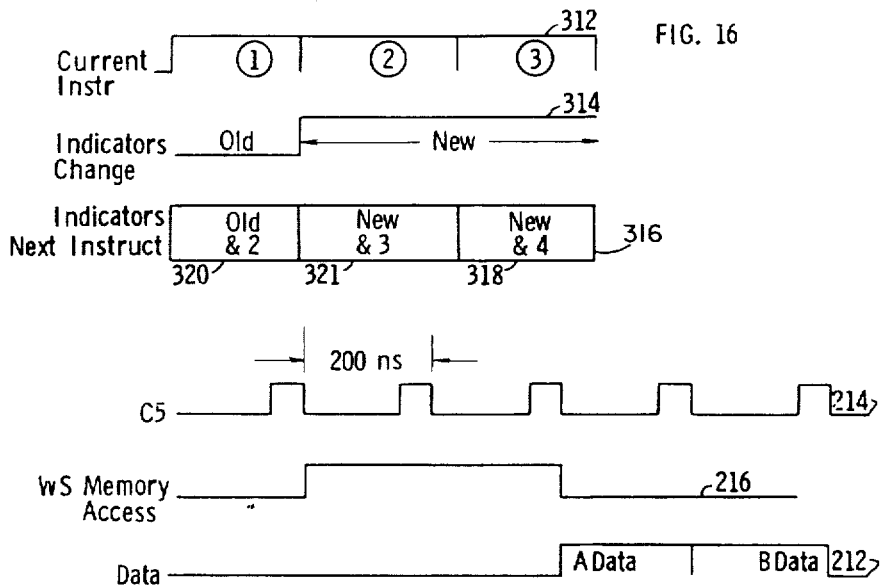
FIG. 16
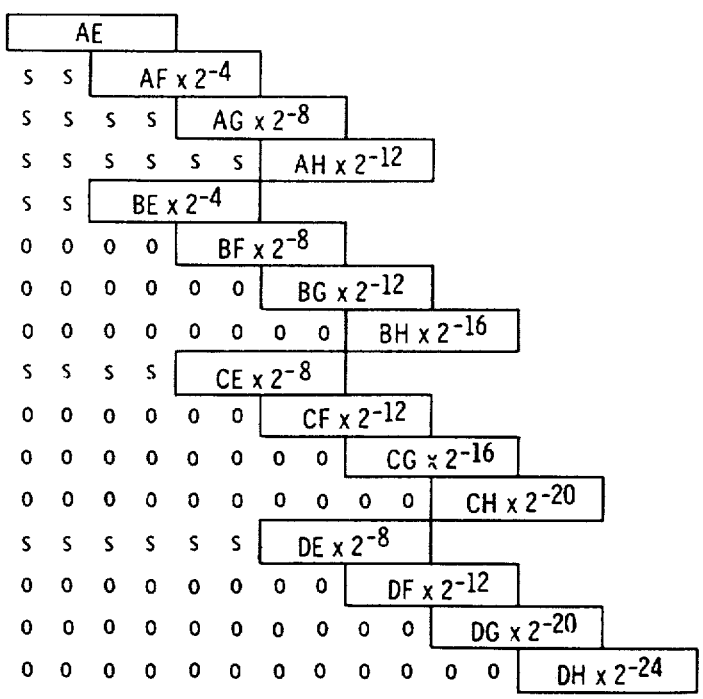
FIG. 10
FIG. 13

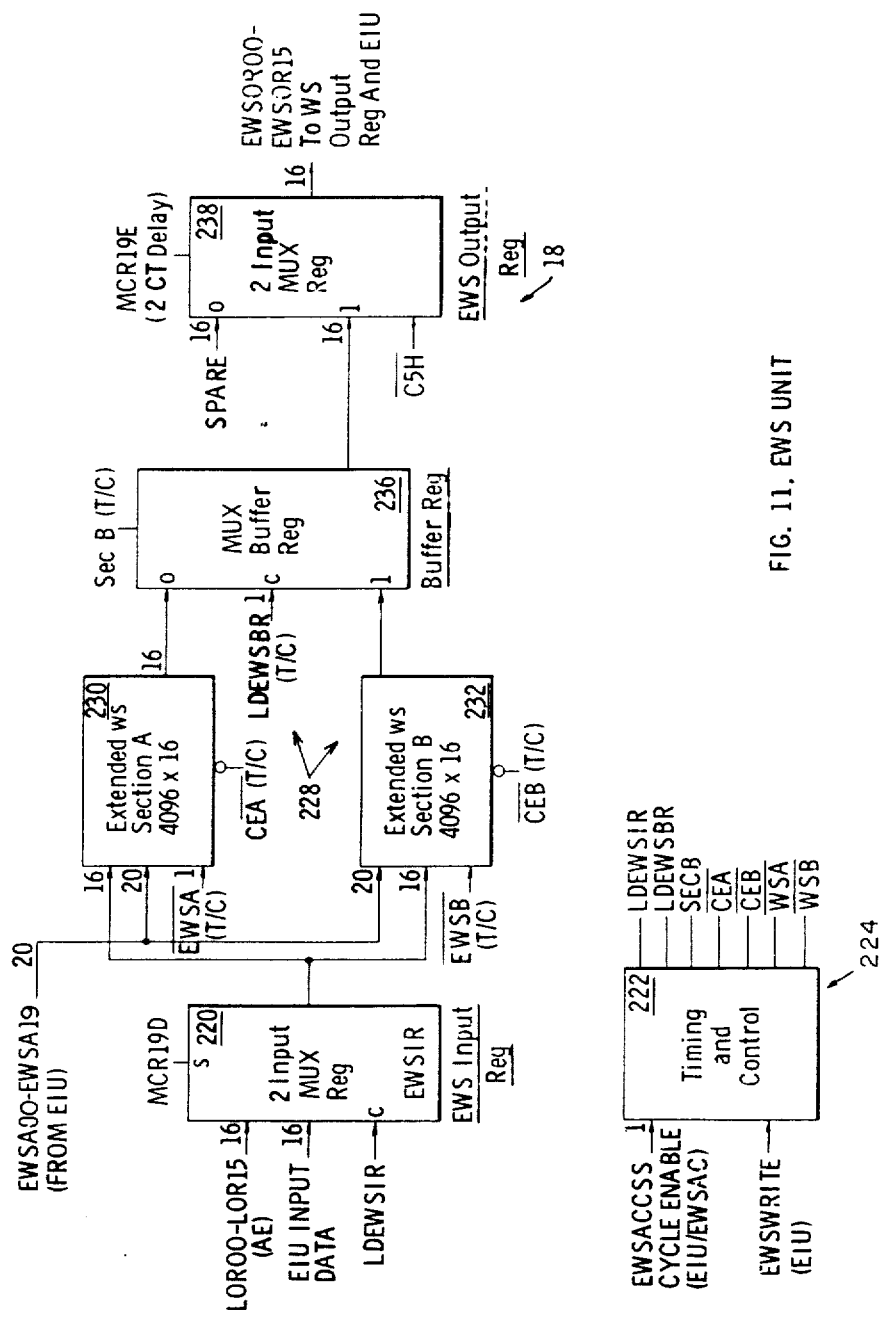
FIG. 11. EWS UNIT

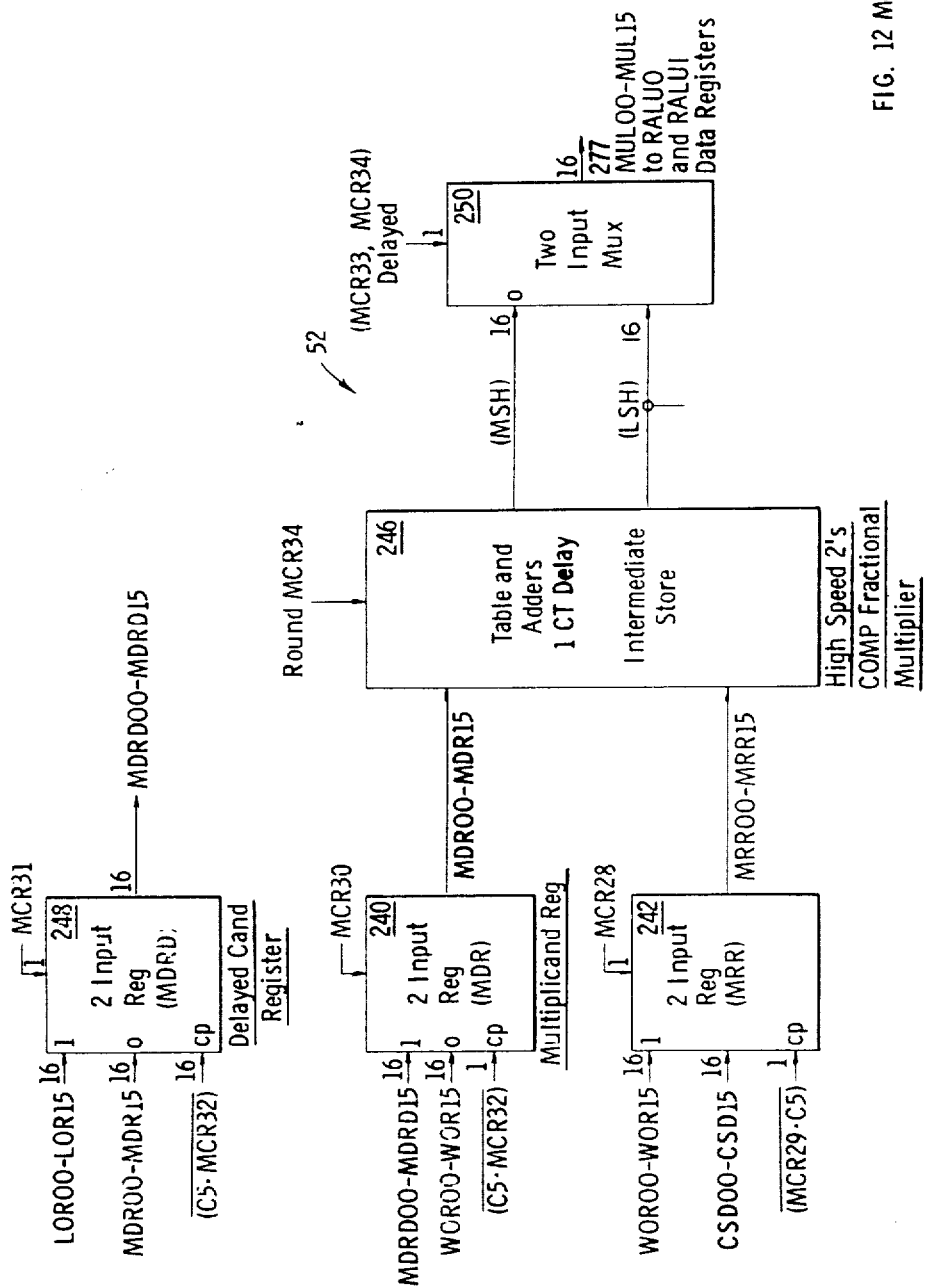
FIG. 12 MULT

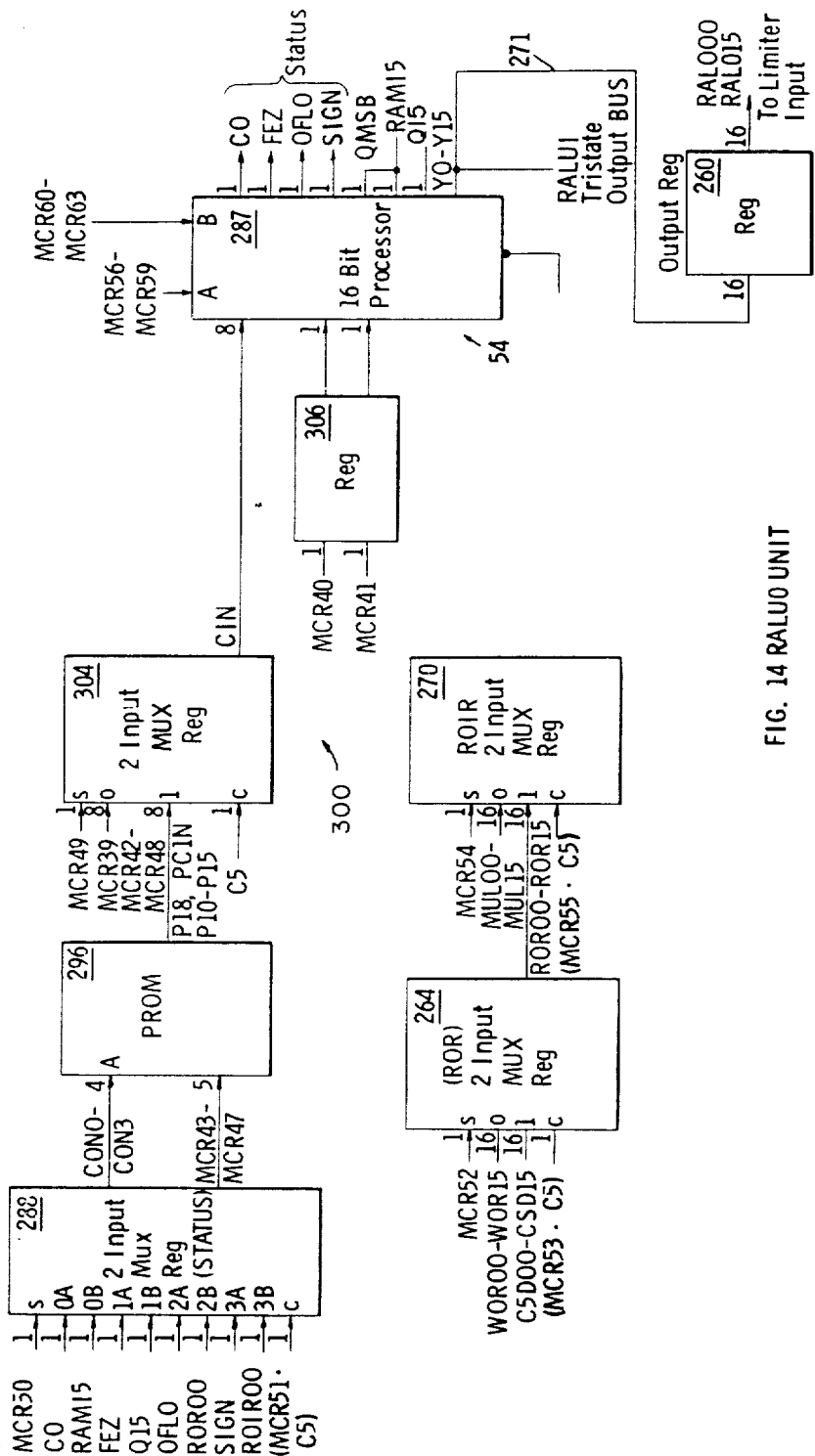
FIG. 14 RALU0 UNIT

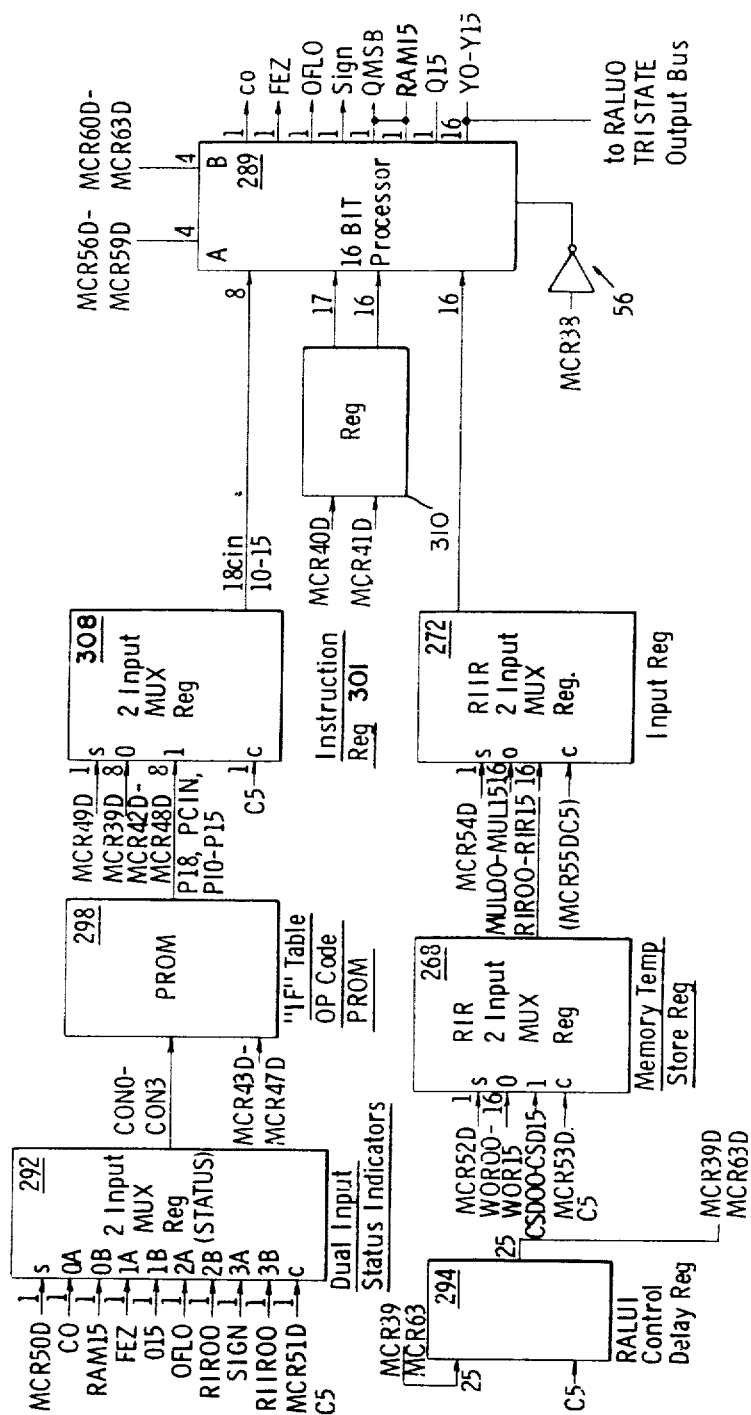
FIG. 15 RALU1 UNIT

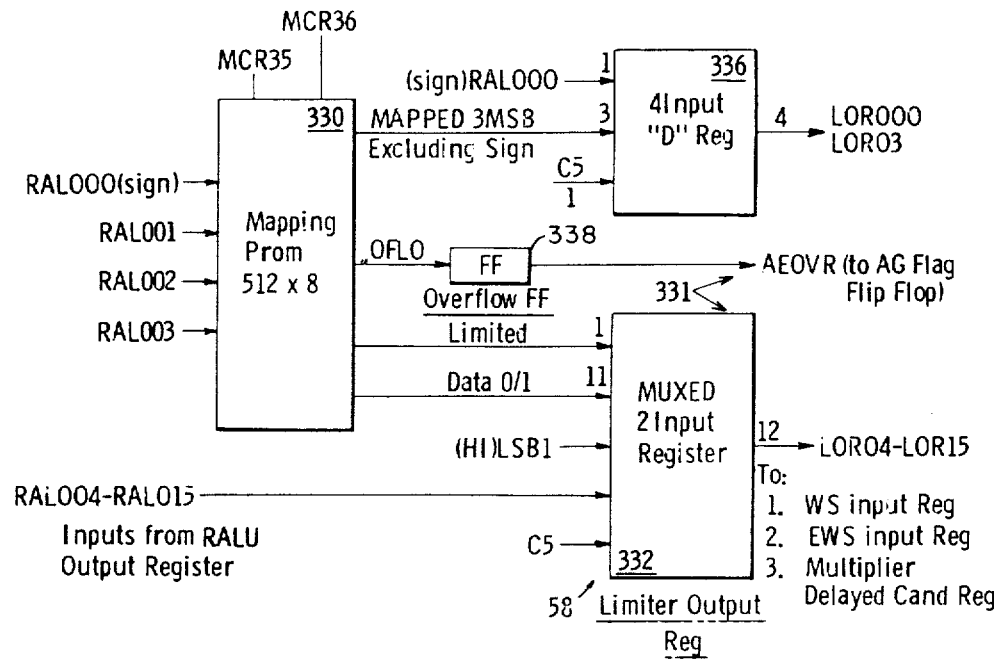
FIG. 17 LIMITER UNIT

FIG. 19 EIU BUS

FIG. 20 EWSDI

FIG. 21 EWSAC

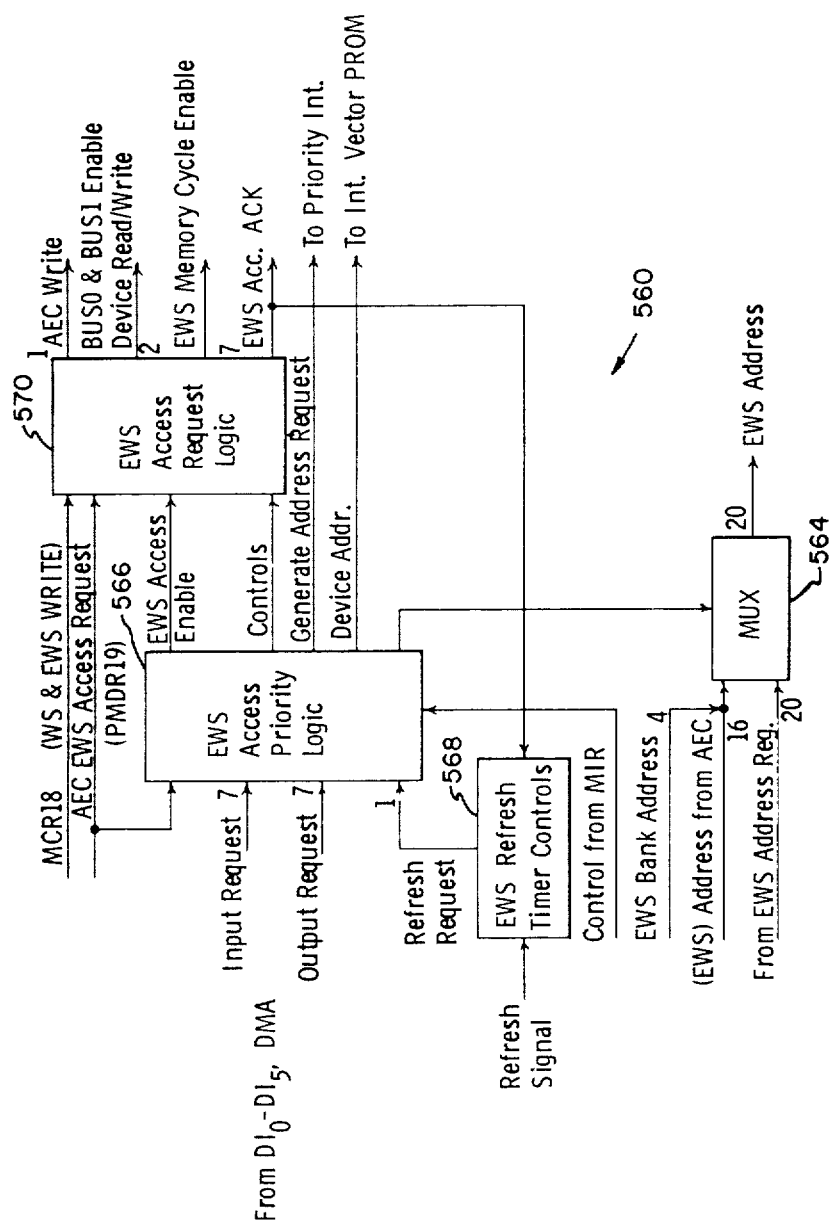
FIG. 23 EWS ACC. PR. & REQ.

AEC INTERF. CONTROL

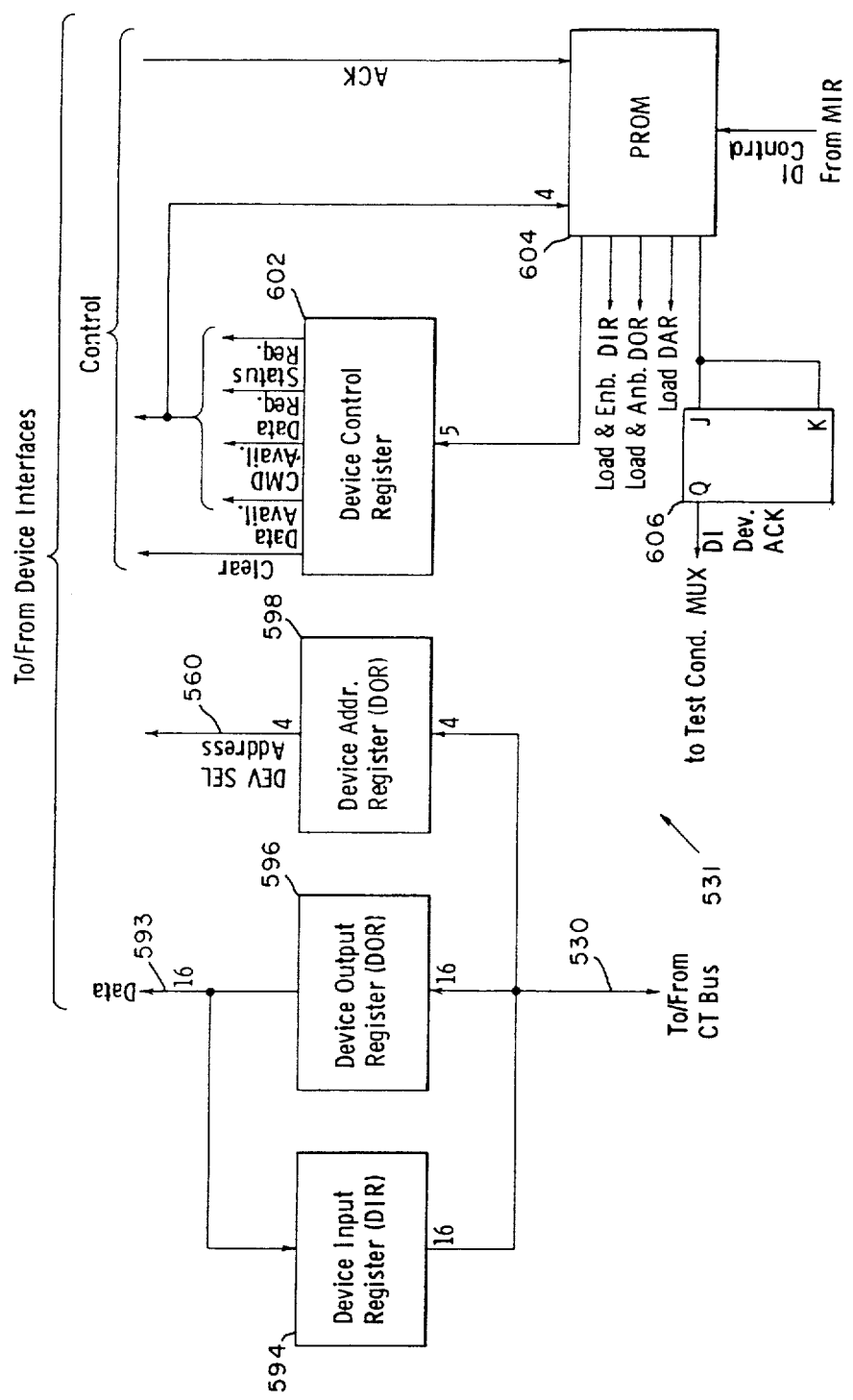
FIG. 25 DIC UNIT

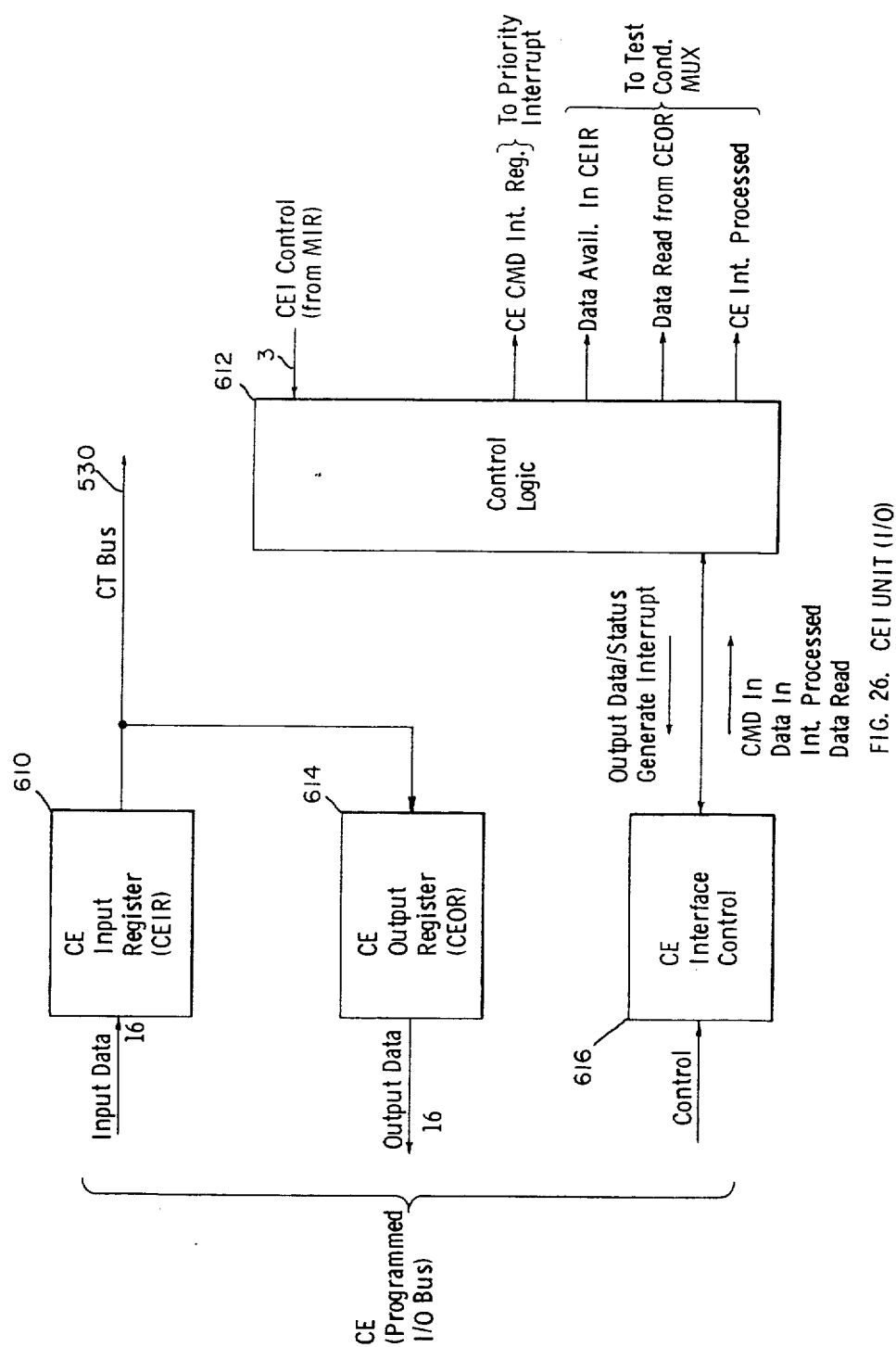
FIG. 26. CEI UNIT (I/O)

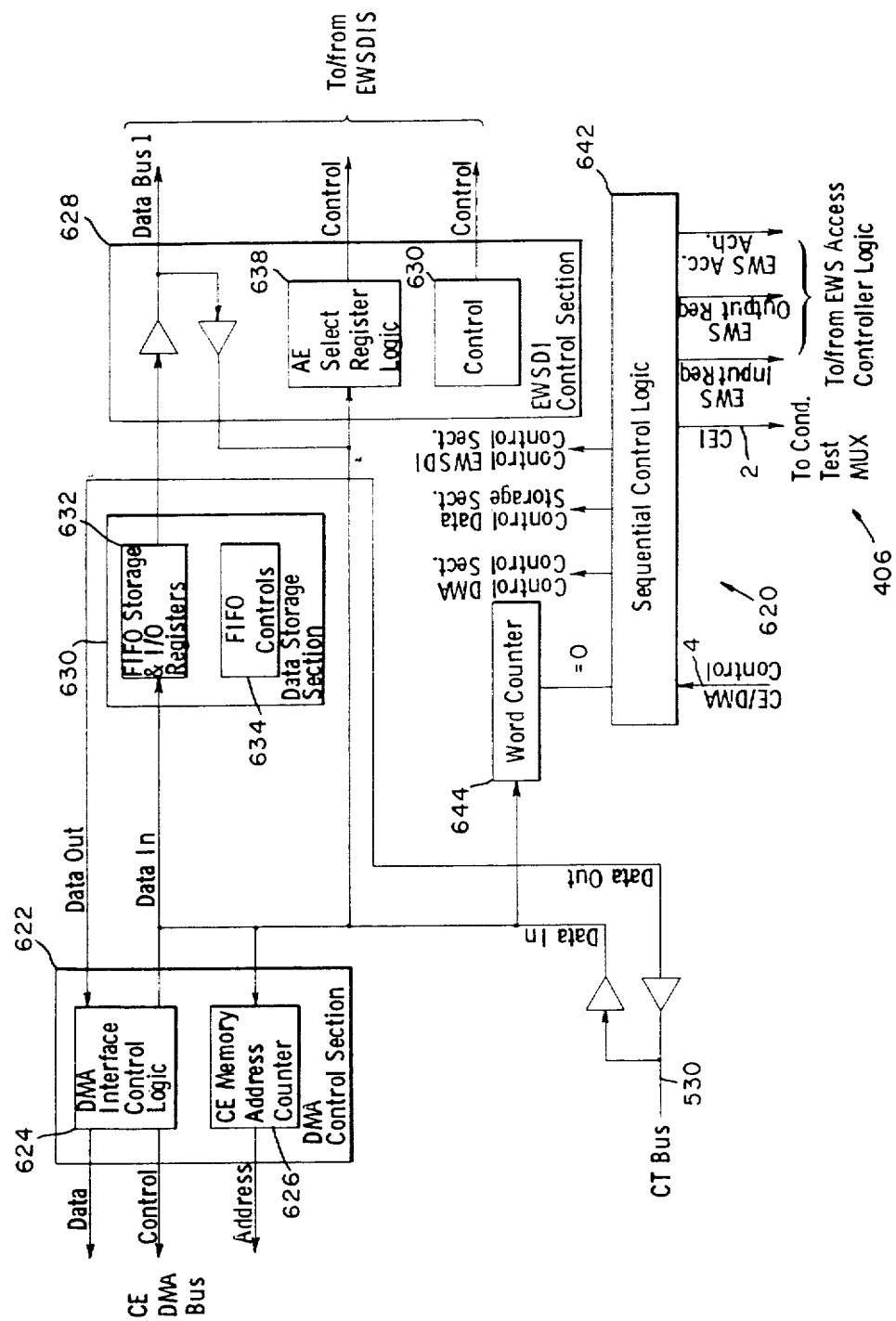
FIG. 27 CEI UNIT (DMA)

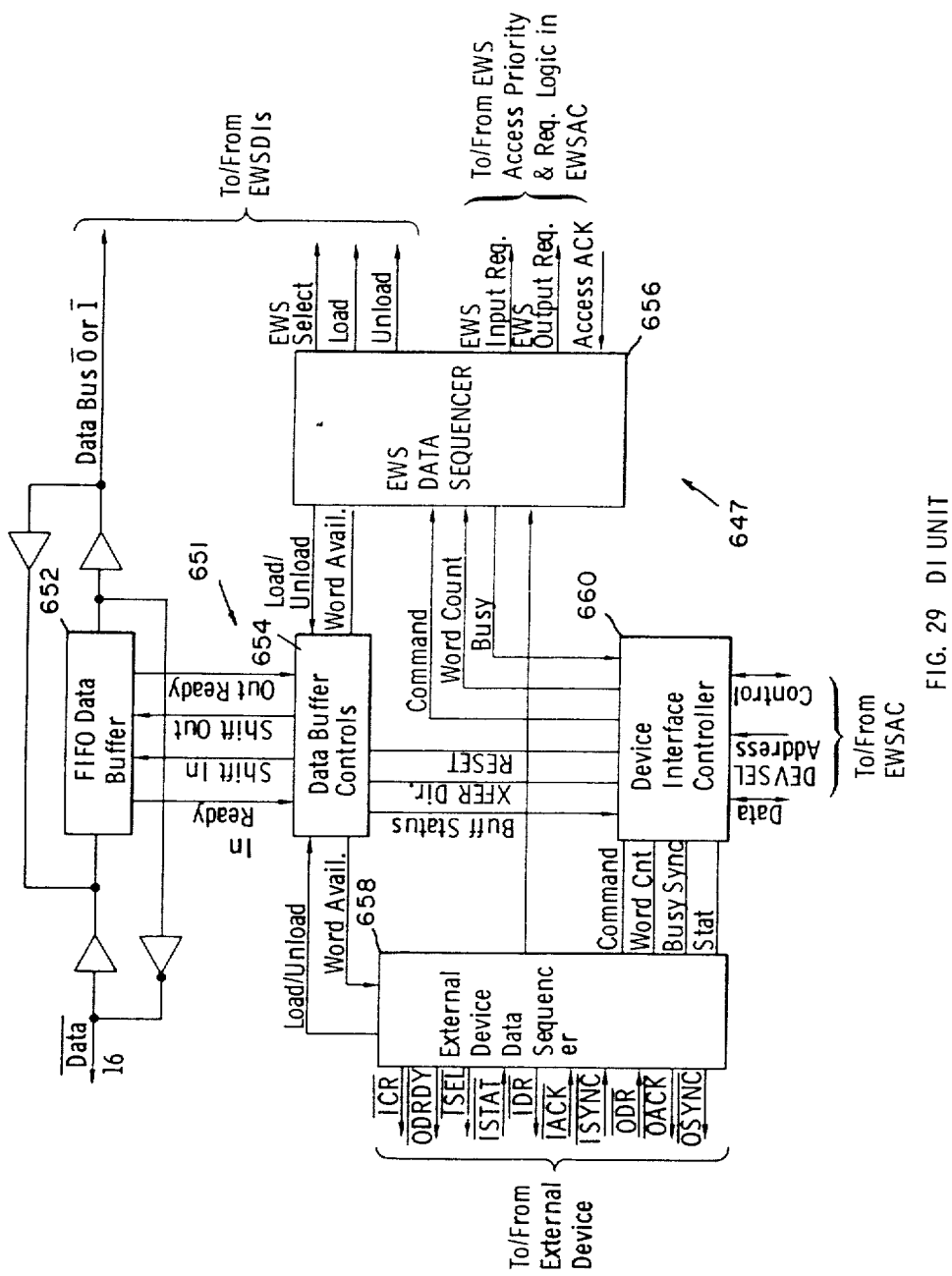
FIG. 29 DI UNIT

EWS DATA SEQ.

DIC UNIT

MODULAR PROGRAMMABLE SIGNAL PROCESSOR

This is a continuation of application Ser. No. 179,188, filed Aug. 18, 1980, now abandoned, which is a continuation of application Ser. No. 949,341, filed Oct. 6, 1978, now abandoned.

BACKGROUND OF THE INVENTION

This invention relates to digital processing systems and particularly to a programmable signal processor that is expandable for parallel processing, that provides for the failure of units most liable to have a fault and that performs calculations with a minimum of control elements.

Conventional signal processors may have the capability of adding another arithmetic element but they are not modular in the sense that the same control signals are applied to each arithmetic element. Also, the prior art signal processors have the disadvantage that failure of an arithmetic unit is not correctable without stopping the operation for repairs. Most processors are substantially dependent on a host computer for control and on a bulk memory for storage of data being processed. The waiting time for these external units has been found to substantially reduce the overall speed of processing. It would be a substantial advantage to the art if a processor were provided that was expandable, programmable, operated without substantial waiting time for bulk memory units and that upon failures of the type that were most likely to occur, provided a new configuration that eliminated the effect of the failure.

SUMMARY OF THE INVENTION

The processing system in accordance with the invention has a modular architecture that allows batches of data to be processed in parallel and allows the system to be expanded or decreased in size without changing the initial unit. An arithmetic element controller (AEC) unit is programmable to operate either independently or under partial control of a control element (CE) unit, and to simultaneously control a number of arithmetic element (AE) units. Each AE unit operates in parallel in response to common address and control signals and common coefficient values from the AEC unit. In order to not limit the processing speed of the AE units, each AE unit operates with its own extended work store (EWS) unit that is synchronized with the AE unit and is direct accessable during the processing. Each EWS unit is coupled to an external device so that selective transfer of data and processing results to each EWS unit may be provided. In order to further improve the efficiency of operation, each AE unit has a multiplier unit that is matched to a plurality of register and arithmetic logic (RALU) units so a plurality of calculations may be performed in parallel on the multiplier results, all in response to common control signals and coefficient data. The AEC unit has an architecture that allows simplified and reliable programming. The system includes a control arrangement that detects a failed AE unit or EWS unit and provides a redundant AE (and EWS unit) to perform the calculations of the failed units. The system is organized so that the units that are most likely to have a failure (AE units and EWS units) are separate units that can be replaced by a redundant unit. The control arrangement allows the failed AE unit to continue to perform calculations, but provides that the processed data from the failed AE will not be utilized.

BRIEF DESCRIPTION OF THE DRAWINGS

These and other objects, features and advantages of the invention itself, will become apparent to those skilled in the art in the light of the following detailed description taken in consideration with the accompanying drawings, wherein like reference numerals indicate like corresponding parts throughout the several parts wherein:

FIG. 3 is a schematic block diagram of the arithmetic element controller (AEC) unit of FIG. 1;

FIGS. 4a to 4e are schematic block diagrams of the program memory unit (PM) of FIG. 3;

FIG. 5 is a table showing the program microinstructions provided by the AEC unit to control the processing operation;

FIG. 6 is a schematic block diagram of a typical address generator (AG) unit of FIG. 3 in accordance with the invention;

FIG. 9 is a schematic block diagram of the work store (WS) unit of FIG. 8;

FIG. 10 is a schematic diagram of waveforms for further explaining the memory access of the work store unit;

FIG. 11 is a schematic block diagram of the extended work store unit of FIG. 3;

FIG. 12 is a schematic block diagram of the multiplier unit of FIG. 8;

FIG. 13 is a schematic diagram for further explaining the multiplier unit of FIG. 12;

FIGS. 14 and 15 are schematic block diagrams of the respective RALU0 and RALU1 units of FIG. 8;

FIG. 16 is a schematic diagram of waveforms for explaining a conditional operation of the RALU units;

FIG. 17 is a schematic block diagram of the limiter unit of FIG. 8;

FIG. 23 is a schematic block diagram further showing the EWS access priority and request logic of FIG. 22;

FIG. 25 is a schematic block diagram of the device interface control (DIC) unit of FIG. 21;

FIG. 26 is a schematic block diagram of the control element interface (CEI) unit for the programmed I/O bus of FIG. 18;

FIG. 27 is a schematic block diagram of the CE interface (CEI) for the direct memory access (DMA) bus of FIG. 18;

FIG. 29 is a schematic block diagram in further detail of the device interface (DI) unit of FIG. 18;

DETAILED DESCRIPTION OF THE INVENTION

Figure 1:
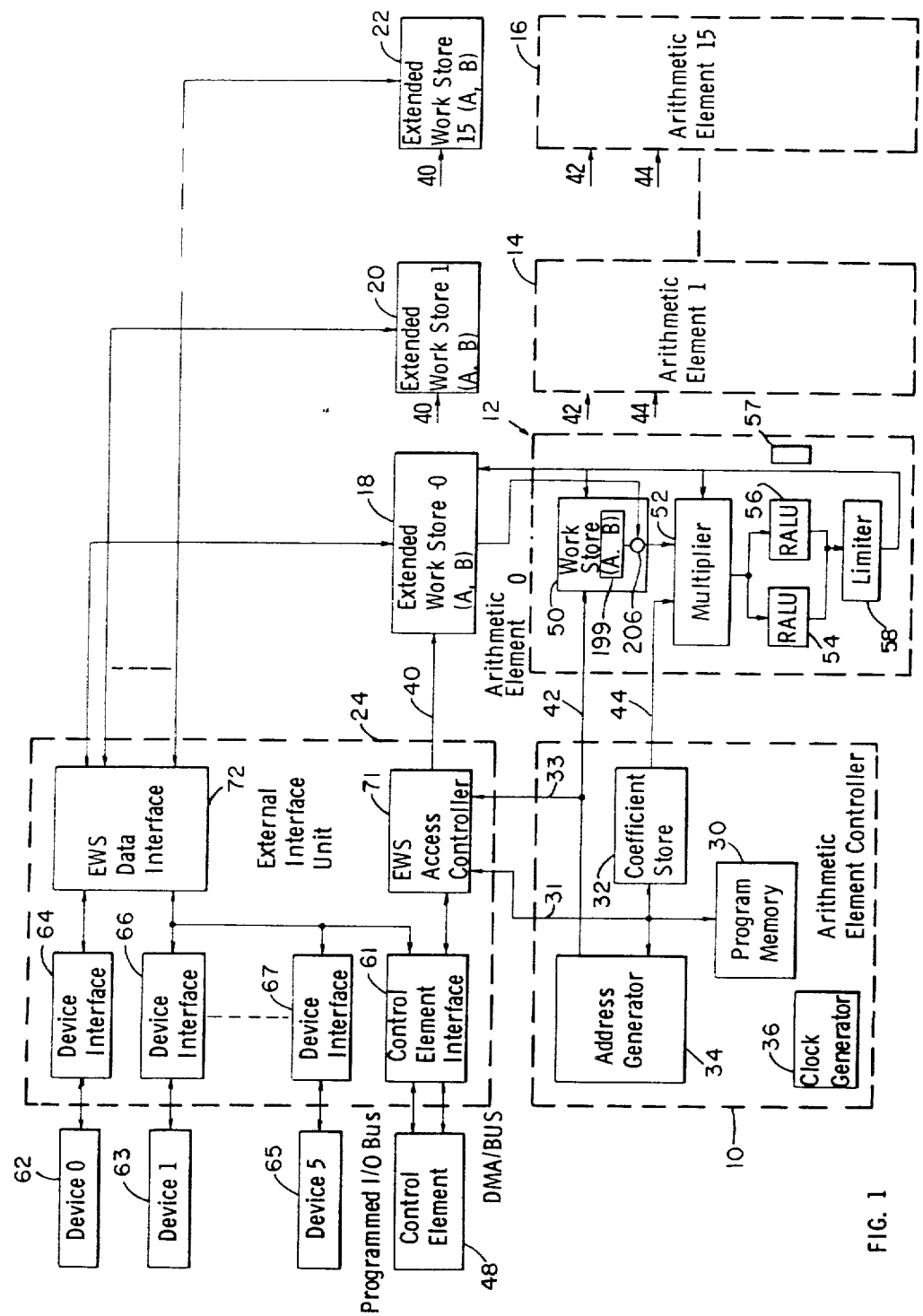
FIG. 1 is a schematic block diagram of the modular programmable processor system in accordance with the invention.

Referring first to FIG. 1, the processing system in accordance with the principles of the invention includes an arithmetic element controller (AEC) unit 10, a plurality of arithmetic element (AE) units such as 12, 14 and 16 each having respective extended work store (EWS) units 18, 20 and 22, and an external interface unit (EIU) 24. It is to be noted that in accordance with the principles of the invention, any desired number of AE units may be utilized and corresponding EWS units, and that one or more of the AE units may be redundant until a failed condition is sensed. The AEC unit provides the same address, control signals and coefficient values to each of the AE units so that a processor system can be expanded or minimized merely by adding or removing AE units along with their associated EWS units. The limit of the number of modular AE and EWS units that may be provided may be substantially determined by the selection structure in the EIU unit.

The AEC unit 10 includes a program memory (PM) unit 30, a coefficient store (CS) memory unit 32 and an address generator (AG) unit 34. A clock generator 36 may be utilized throughout the system and for example may have a 200 ns (nanosecond) interpulse clock period. The address generator 34 may include a register and arithmetic logic unit (RALU) that performs the address computations to access operands in the WS or EWS units and to access coefficients in the CS unit. The EWS unit address is transferred from the EI unit 24 by a composite lead 40, the work store address is transferred from the address generator 34 by a composite lead 42 and the coefficient data is transferred from the coefficient store 32 to the AE units through a lead 44. A tristate AG bus 31 couples the AG unit 34, the PM unit 30, the CS unit 32 and an EWS access controller (EWSAC) unit 71 in the EI unit 24.

The program memory unit 30 may be organized in a 3K word by 32-bit structure with the first 1K words being implemented with RAM (Random Access Memory) components and the remaining 2K words being implemented with PROM (Programmable Read Only Memory) components. Two memory accesses are thus required to obtain a 64-bit microinstruction as is utilized in the illustrated system.

It is to be noted that writing into the RAM store of program memory can be directed only from a control element (CE) 48 which is the host computer. The PM unit 30 has an executive and various arithmetic subroutines stored therein. The executive selects the subroutines for execution by sequencing through a subroutine address table (SAT) that may be stored in the CS unit 32.

Coefficients for use in the AE units are available in the coefficient store unit at addresses that may be defined by the microinstructions from the PM unit 30.

Each of the AE units such as 12, 14 and 16 is organized in a pipeline structure and includes a working store (WS) unit 50, a high speed multiplier unit 52, two register and arithmetic logic units (RALU0 and RALU1) 54 and 56 arranged in parallel and a limiter unit 58. The WS unit 50 which is organized in sections A and B, includes in the illustrated system, an 8K word by 16-bit RAM that operates on an effective word transfer rate of 5 MHz, i.e., two 16-bit words can be read from or written into the WS unit every 400 ns. The WS address is generated by the arithmetic element controller 10 while data to be written into the WS unit 50 originates from the output of the limiter 58. Section B of the WS unit 50 is accessed one clock time after section A is accessed, usiing a common address. Input and output data normally resides in the EWS unit such as 18 while in process data normally resides in the WS unit such as 50. This arrangement also permits transfer of data between EWS and an external device such as 62, 63 and 65 while the WS unit 50 supports the AE processing.

The multiplier unit 52 is, for example, a two-stage pipe-lined general-purpose multiplier capable of multiplying two, 16-bit fixed point, two's complement operands and forming a truncated or rounded 16-bit product at an effective rate of 5 MHz, for example. Since WS operands as well as coefficients from the coefficient store unit 32 can be loaded into the multiplier registers, the multiplier can perform a plurality of functions such as multiply two operands together, square an operand or multiply an operand by a coefficient, in the illustrated arrangement. Each of the two register and arithmetic logic units (RALU0 and RALU1) 54 and 56 contains 16-bit registers and a 16-bit arithmetic logic unit so as to provide dual channel operation. The register and arithmetic logic unit 56 performs exactly the same function as the unit 54 but with one clock period (200 ns) delay. This feature allows the AE units to perform addition at a 10 MHz rate when processing two channels of data at a time. It is to be noted that although only two RALU units are illustrated, additional RALU units such as illustrated by a dotted box 57, may be utilized with higher effective rates, all within the scope of the invention.

The EWS units such as 18 buffer input sensor samples for later processing by the AE unit 12. As an illustrative example, the EWS unit 18 is an 8K word by 16 static, MOS random access memory with an effective read-write cycle time of 200 ns. The EWS unit 18 is divided into sections A and B with section B being accessed one clock time after section A with both sections responding to a common address. Two words can be transferred in or out of the EWS unit 18 in 400 ns or two clock periods. When writing into the EWS unit 18, two 16-bit data words from either the control element interface 61, the device interfaces such as 64, 66 and 67, or the output of the limiter 58 of the arithmetic element 12 can be stored in the EWS unit 18 during two successive clock periods. When reading from the EWS units such as 18, two words can be transferred either to the arithmetic element 12, to the control element interface (CEI) 61 or to the device interfaces 64, 66 and 67 and in turn to respective devices 62, 63 and 65. Reading or writing in two-word batches as opposed to one-word groups is not usually restrictive since the device interfaces are organized to handle several channels of data in a time-multiplexed manner. The arithmetic element units operate at maximum efficiency when simultaneously processing two channels of data. The appropriate extended work store addresses to perform these read and write operations are supplied from the EWS access controller unit 71 on the lead 40. Address generation is controlled by both the AEC unit 10 and the device interface, with the arithmetic element controller having higher priority and providing the address in case of conflict. Thus, the architecture of the EWS unit allows the loading of samples or the reading out of data to be overlapped in time with arithmetic element controlled program execution.

The device interface 64 receives and transmits data between the extended work store units and the device 0 which is device 62 over a 16-bit bidirectional bus and the EWS data interface unit 72. The device interfaces such as 66 and 67 receive and transmit data between the extended work store units and the devices such as respective devices 63 and 65 also over a 16-bit bidirectional buses and through the EWS data interface unit 72. Input data is stored in registers in the EWS data interface unit 72 until both sections of the memories of the extended work store units such as 18, 20 and 22 can accept the data, at which time the data is written into the EWS memories. An address counter in the EWS access controller (EWSAC) allows each EWS unit such as 18, 20 and 22 to be sequentially accessed for transferring data thereto or therefrom.

The control element interface (CEI) unit 61 receives commands and/or data to/from the control element 48 and passes them to the EWSAC for decoding and execution. The EWSAC subsequently effects the proper control over the AEC unit 10, the EWS units, or the CEI's direct memory access interface. The direct memory access interface operates under control of the EWSAC unit 71, and outputs, for example, raw data samples, partially processed data and target detection data (such as in a SONAR, RADAR or IR systems) directly into the memory of the control element 48. Also, it is to be noted that the DMA interface in the CEI unit 61 can transfer blocks of data from the memory in the control element 48 into the memories in the AEC unit 10. The EWSAC unit 71 receives commands from the CEI unit 61, decodes these commands, and performs the necessary operations to: (1) set a breakpoint, (2) read 16-bit words from the control element 48 and store them in either the program memory unit 30 or the coefficient store unit 32 or the EWS units 18, 20, and 22, (3) initialize the direct memory access (DMA) interface in CEI unit 61 to perform a DMA transfer and store the 16-bit words, read by the DMA interface from the control element 48, in either the program memory unit 30 or the coefficient store unit 32 or the EWS units 18, 20 and 22, (4) read the 64-bit program memory words and send them in groups of four 16-bit words to the control element 48, (5) read the words in the coefficient store unit 32 and send them to the control element 48, (6) read the registers in the AEC unit 10 and send their contents to the control element 48, (7) read the words in the EWS units and send them to the control element, (8) initiate an AEC program execution, and (9) halt AEC program execution. When an arithmetic element controller program terminates execution (either normally or when a breakpoint or parity error condition is detected) or a DMA transfer to load the PM unit 30 or the CS unit 32 completes, the EWS access controller generates an interrupt that is sent to the control element 48. The actual cause of the interrupt is maintained in a 16-bit status register (not shown) that can be read by the control element 48. The CEI unit 61 automatically clears this status register whenever a new command is received from the control element 48. The extended work store (EWS) access controller 71 controls the priority for addressing the extended work store units.

Figure 2:
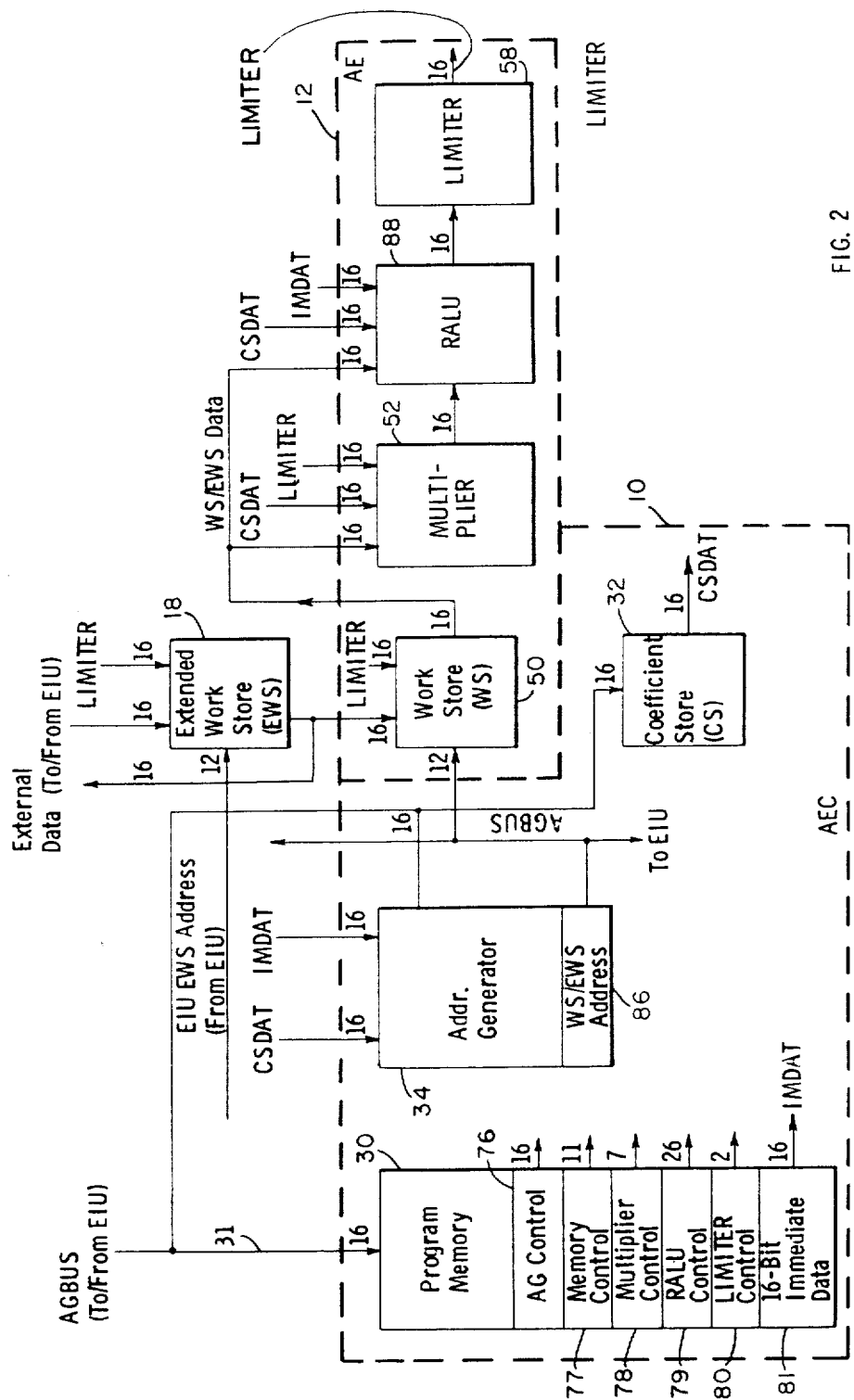
FIG. 2 is a functional block diagram of the processor of the invention.
Figure 4B:
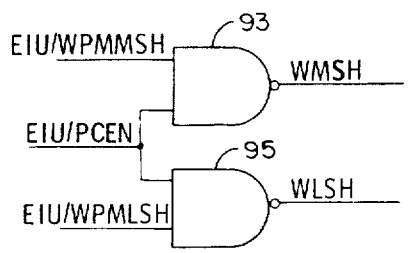
Figure 4C:
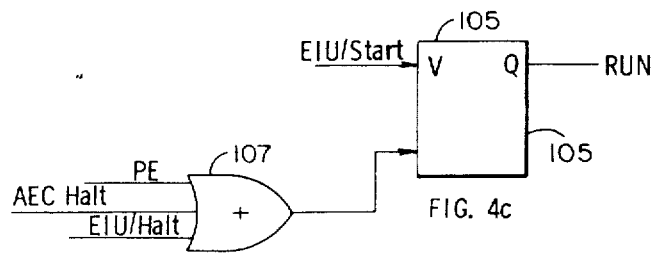
Figure 4D:
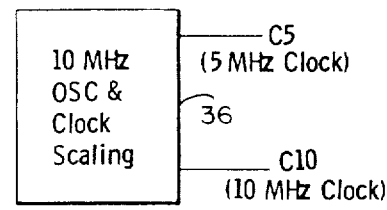
Figure 4E:
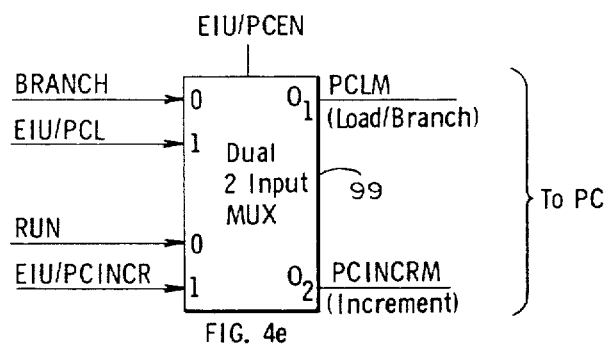

Referring now to FIG. 2, the microprogram control will be generally explained relative to the AEC unit 10 and a single AE unit 12 and EWS unit 18. It is to be understood that similar terms are also applied to other of the plurality of arithmetic element units and extended work store units but for convenience, only a single arithmetic element unit is shown. The program memory unit 30 and its control arrangement has the tasks of fetching the 64-bit next instruction, outputting 62 control lines to other modules, outputting 16-bits of immediate data and outputting 12-bits, for example, of address from the program counter (not shown). The program memory unit 30 receives branch addresses on the AGBUS 31 and provides the 16-bit program counter to the address generator unit 34 to be used during program branching. Boxes 76 to 80 are shown to illustrate the microinstruction control throughout the system and to show the number of microinstruction bits that are utilized for each major control function. The address generator (AG) control of the box 76 provides 16 microinstruction bits, the memory control of the box 17 provides 11 microinstruction bits, the multiplier control of the box 78 provides 7 microinstruction bits, and the RALU control of the box 79 provides 26-bits and the limiter control of the box 80 provides 2-bits. As an arrangement for providing immediate data to the system, a portion of the instruction may be utilized as illustrated by a box 81 with 16 microinstruction bits being set aside for this purpose to provide the IMDAT data. The address generator 34 generally performs the tasks of outputting addresses for memory modules, outputting branch addresses for program memory control, outputting data to the coefficient store memory unit 32, inputting data and providing control functions. A box 86 indicates the work store or the extended work store address generation; addresses are applied to the work store unit 50 and to the extended work store unit 18 as well as to other work store and extended work store units. It is to be noted that the programmer utilizes the work store bus when transferring the extended work store address to the EI unit for multiplexing to the EWS units such as 18.

The AGBUS 31 is coupled to the EWS access controller 71 (FIG. 1), to the program memory unit 30, to the coefficient store unit 32 and to the address generator 34. Thus from the AGBUS 31, the branch address are applied to the program memory unit 30, coefficient store addresses are applied to the coefficient store unit 32 and addresses or data are applied to the EWS access controller 71 (FIG. 1) and in turn to the control element interface unit 61. The input data to the address generator unit 34 are the 16-bits of coefficient store CSDAT data and the 16-bits of IMDAT data, the latter being received from the program memory 30. The address generator unit 34 performs a plurality of control functions including loading of the program counter (FIG. 3) and selecting coefficient store data output as a function of the operational code.

The tasks of the EWS unit 18 are storage of input data and processed limiter output data from limiter 58. The EWS unit 18 receives addresses from and transfers data to the EI unit 24 of FIG. 1, and receives limiter output data from limiter 58 of the arithmetic element 12 and transfers data to the arithmetic element 12. Thus, the extended work store unit 18 provides for transfer of 16-bits of data between itself and an output register or MUX register 206 (FIG. 9) located in the work store unit 50, which data may then be transferred to the multiplier unit 52 and to a RALU unit 88. The WS unit 50 receives LIMITER data from the LIMITER 58 as well as receiving addresses from the address generator 34 and provides 16-bits of LIMITER data to the multiplier unit 52. The RALU unit 88 may receive 16-bits of data from the multiplexer 52. The tasks of the coefficient store unit 32 include supplying operands for the multiplier unit 52 and the RALU unit 88, providing higher level program control from a subroutine address table (SAT) to the program memory unit 30 and providing coefficients for operation of the address generator, the multiplier unit 52 and the RALU unit 88, which coefficients are included in the term CSDAT.

The multiplier unit 52 receives 16-bit data from the WS unit 50, 16-bit operands (CSDAT) from the CS and 16-bit data from the LIMITER. The RALU unit 88 which may include two or more 16-bit processors, provides programmed arithmetic and logical operations in response to data received from the WS unit 50 and from the EWS unit 16 bits of CSDAT data, 16 bits of immediate IMDAT data and 16 bits of data from the multiplier 52. The limiter unit 58 performs the task of passing or symmetrically limiting at half, quarter or eighth of full scale, the data received from the RALU unit 88. Thus, it can be seen that the AEC 10 can simultaneously control from one to a maximum number of arithmetic element units with the maximum number being determined principally by the access selection arrangement of the external interface units.

Referring now to FIG. 3, the arithmetic element controller unit 10 will be further explained starting with the PM unit 30 as is shown in further detail in FIG. 4a through 4e. The program memory unit 30 includes a program memory 90 from which 64-bit instructions are fetched and loaded into a microcommand register (MCR) 92, over a 32-bit composite lead 91, which instructions are the fundamental control of all the processing elements. The program memory 90 receives data AG00 through AG15 on the AGBUS 31 to be stored in the RAM (random access memory) portions, and receives terms $\overline{WMSH}$ and $\overline{WLSH}$ for controlling two write or read cycles during each clock period of 200 ns. A 13-bit program counter (PC) 94 addresses or points to the next instruction half word located in the program memory 90 and in the illustrated system has the ability to address 8192 32-bit half words or 4096 sequentially assembled 64-bit program memory instruction words. Thus, in the illustrated system having a 200 ns clock, the program counter is normally incremented each 100 ns to address each sequential half word or to fetch a full word every 200 ns. The program counter 94 is loaded from the tri-state address generator bus (AGBUS) 31 with signals AG04 through AG15 to effect a conditional or unconditional branch operation. The controls for loading the program counter 94 which are for branching, (BRANCH) are derived from two sources, the first being the address generator unit 34 within which are coded several operational codes which effect conditional or unconditional branches by loading the program counter 94. These coded operational codes from the address generator are:

| Assembler Mnemonic | Comment |
| --- | --- |
| LPC | Load PC 94 from AGBUS 31. |
| BPAG | Conditionally load the PC 94 if flag flip-flop in AG 34 is equal to zero. |
| BTAG | Conditionally load the PC if flag flip-flop in AG is equal to one. |
| BALP | Branch and save link. Load PC 94 from AG 34 and save PC in AG Register B. |

The second source for loading the program counter 94 emanates from the external interface unit 28, and as will be explained subsequently, this source allows the control element or external host computer to affect externally controlled inputting or outputting of data to or from the program memory to or from the external control element. Five lines specify multiplexed control over the AEC program counter 94.

| Hardware Function | Comment |
| --- | --- |
| EIU/PCEN | Enable EI unit 24 to control the AEC program to the EI unit counter 94. which term will be explained relative EI unit. |
| EIU/PCL | Load the AEC PC from the AG BUS when MIU/PCEN. |
| EIU/PCINCR | Increment the AEC PC when EIU/PCEN even when RUN FF is false. |
| EIU/WTMLSH | Write AGBUS into program memory halfword. The 16 LSH bits are written into the EIU/PCEN. |
| EIU/WPMMSH | Write AGBUS into program memory halfword. The MSH bits are written into when EIU/PCEN. |

It should be noted that the program counter 94 specifies the next instruction address. Therefore, when branching is effected, the next instruction address resides in the program counter 94 so that the next instruction after the coding of a branch will be executed prior to effecting the coded branch. The program counter 94 is RESET to location zero when power is first applied to the system so that the start up memory location is zero for the first instruction after the application of power.

The program counter 94 is also reset when the AEC executes a half instruction. The program counter 94 feeds three destinations, the first being to supply addresses to the program memory 90 as controlled by terms $\overline{WMSH}$ and $\overline{WLSH}$ controlling the most least significant halves as a function of EIU/WPMMSH, EIU/PCEN and EIU/WPMLSH from AND gates 93 and 95. An EIU controlled MUX 99 receives branch EIU/PCL, RUN and EIU/PCINCR to provide the two terms PCLM (load-branch) and PCINCRM (increment).

Terms which control a dual tristate MUX 116 and in turn the program counter 94 are the following. These terms specify which 16-bit half of the program memory half words are to be put on the AGBUS.

| Hardware Function | Comment |
| --- | --- |
| EIU/PMDR | Enable left or right half of PMDR to the AGBUS. |
| EIU/MSH | When 1 MSH of PMDR to AGBUS. When zero LSH to AGBUS. Meaningful only if CEI/PMDR is true. |

The terms PC4 through PC15 are also applied to an address generator input MUX (FIG. 6) to effect saving the next instruction address when executing a branch in the same link (BALP). Another destination of the output term is a breakpoint address comparator (BPAR) 98 which compares the program counter address to a breakpoint address set up by the control element in a breakpoint address register 100. Coincidence of these addresses when the breakpoint has been enabled causes a breakpoint loop counter 104 to decrement and when zero is reached, to apply a term COBP to the EI unit 24 to interrupt the control element and to halt operation of the processor system. Also the term COBP will inform the control element through a status word that a breakpoint as set by the control element has occurred. The breakpoint address register 100 receives the breakpoint address on the AG bus leads AG04 through AG15, a clock signal C5 and a EIU/LBPAR load signal from the control element. The breakpoint loop counter 104 receives data on the AG bus leads AG04 through AG15, the EIU/LBLC load term and the clock signal C5 at the input leads. Thus, two control lines control loading of the breakpoint address and breakpoint loop counter in the program memory module.

| | Comment |
| --- | --- |
| EIU/LBPAR | Load breakpoint address register 100 from AGBUS 31. CE instruction effects this. |
| EIU/LBPLC | Load breakpoint loop counter 104. |

The breakpoint logic is mechanized within the program memory unit to effect breakpoint halting of the system under control of the control element. An SBP command sent from the control element across the interface to the control element interface unit 61 and the EWS access controller 71 (FIG. 1) effects this control with this command being sent only when the processor is not running, that is halted. When the processor is halted, the tri-state address bus 31 is not being used by the processor and it is available to the EI unit 24. Upon receiving the SBP software directive from the control element, the EI unit 24 effects the load of the breakpoint address register 100 and the breakpoint loop counter 104. The first control word which is loaded into the breakpoint address register 100 contains 4-bits to specify SBP and 12-bits of program breakpoint address information. The second word contains 12 lower order bits which specify the number of times the breakpoint address is to be looped, that is to be counted, for halting the processor and this word is applied to the breakpoint loop counter 104. The halting of the processor is always the counter loop minus one. Subsequent to the loading of these words from the AGBUS, the control element can direct the processor to begin program execution at a specified program memory location. A breakpoint address coincidence in the comparator 98 is utilized to enable decrementing the breakpoint loop counter 104 and when the count is equal to zero and the equal output signifies that the address coincides, the output carry of the output counter 104 is true. This output carry (COBP) specifies that the program has looped through the breakpoint address the required number of times. This output carry is utilized to halt the processor by resetting a RUN flip flop 105. An OR gate 107 responds to PE (parity error), AEC HALT and EIU/HALT to reset the run flip flop 105 which is set the signal by EIU/START. The EIU control over the RUN flip flop 105 is as follows:

| Hardware Function | Comments |
| --- | --- |
| EIU/HALT | A single clock-time pluse that resets the AEC RUN flip flop. It also resets the program counter in the AEC to zero. RUN being false inhibits the AEC program counter from incrementing. |
| EIU/START | This single clock-time pulse loads the program counter from the AGBUS and turns on the RUN flip flop to start program execution. CE execute instruction effects this. |

Also, this output carry COBP is sent to the control element upon request as a status bit.

The program memory 90 in the illustrated system is organized as an 8192 block 32-bit word, each 32-bit word containing one half of each 64-bit machine instruction. The memory half words are addressed by the program counter 94 and during the basic 200 ns machine clock time, two half words are accessed from the program memory 90. The first half word of the instruction is accessed during the first 100 ns and clocked into a program memory data register (PMDR) 110, the first half word always being the most significant half (MSH) of the instruction. During the second 100 ns interval, the second half of the instruction (LSH) is simultaneously clocked into two different registers, the LSH replacing the MSH in the program memory data register 110 and the LSH being clocked into the lower half of the microcommand register (MCR) 92.

The program memory 90 may be mechanized as a mixture of blocks of RAM memory and ROM memory and in the illustrative arrangement may have a total capacity of 4096 words. The ROM memory may be provided by a programmable read only memory (PROM) to provide 64-bit word of ROM store which is addressable in a contiguous block from a predetermined location. Writing into program RAM store in the memory 90 is controlled by the EI unit 24 (FIG. 1) and loading is effected by writing four 16-bit words from the CE unit 48 via the CEI unit 61 and the EWS access controller 71 (FIG. 1) into the half word program store. The process which occurs for writing in the RAM portion of the program memory 90 from the control element is as follows:

a. The control element issues a command to halt the processor. This command is received by the CEI unit 61 and the EWSAC unit 71 applies a signal to halt the processor. In the halt condition EI unit 24 has principal control over loading of registers, control for directing data flow over the AGBUS, and control over outputting of registers.

b. the control element issues a command LPMCE to the control element interface 61 to load the program memory 90 at an address with the four trailing 16-bit words which are passed across the interface.

c. The EWS Access Controller subsequent to receiving the LPMCE from the control element sequentially executes the following sequence of commands to effect loading of the program memory 90. These tests may be in programs resident in the EWS Access Controller.

1. Load the program counter 94 with the address to be written into.
2. Write the first 16-bit program word passed over the interface into the program memory 90.
3. Write the second 16-bit program word passed over the interface into program memory 90, one half word now being filled.
4. Increment the program counter 94 to point to the next half word in the program memory 90.
5. Repeat steps b and c to write the third and fourth 16-bit words into the program memory 90.

Data is always written into the program memory 90 from the address generator tri-state bus 31 and the data to be written into program memory 90 is placed on this bus 31 by the EI unit 24 and the pulse EIU/PCEN is issued to write into either the least significant half (16-bits) or the most significant half (16-bits) of the 32-bit program memory half word. In the illustrative system, writing into the program memory 90 can only be directed from the EI unit 24 to preserve the contents therein from inadvertent programming errors.

The program memory data register 110 which is a 32-bit register is utilized to hold each half of the 64-bit machine instruction as it is accessed from the program memory 90 in response to 100 ns clock C10. During the first 100 ns, access to the program memory 90, the MSH of the machine instruction is clocked into this register 110. During the second 100 ns access to the program memory 90, the parity is generated on the first 32-bit word now resident in the program memory data register 110. At the end of the second 100 ns access interval, the LSH of the machine instruction replaces the MSH in the program memory data register 110 and the state of the generated parity of the MSH is saved in a flip-flop which may be in a parity generator 114. Parity is then generated on the LSH resident in the program memory data register 110 and if the composite 64-bit parity is in error, the parity error signal PE causes the processor to halt and the control element 48 (FIG. 1) will be interrupted. A status word which is sent to the control element 48 when requested will reflect the parity error by the bit PE.

Another feature of the processor in accordance with the invention is that the contents of program memory 90 can be inspected by the control element 48 through appropriate software control commands issued by the control element. The read program memory (RPM) command issued to the control element interface 61 starts a program, resident in the EWS Access Controller which transfers four 16-bit words from the EI unit 24 across the interface to the control element 48. These four 16-bit words which make up the composite 64-bit instruction can be passed from the program memory data register 110 through the AGBUS 31 to the EI unit 24. The 32-bit program memory data register data is passed through the tri-state MUX (multiplexer) 116 through the address generator bus 31 to the EWS access controller 71 (FIG. 1) and in turn to the control element interface 61. The MUX 116 is controlled by the EI unit 24 for putting its output on the AGBUS and for determining which 16-bits of the program memory data register 110 are transmitted over the address generator bus. It is to be noted that high order 8-bits of the program memory data register 110 (PMDR00 through PMDR07) are outputted to the address generator unit 34 so that instruction look-ahead can be effected.

The 64-bit microcommand register (MCR) 92 is updated every 200 ns because the MSH (MCR00 through MCR31) is loaded from the program memory data register 110 and the LSH (MCR32 through MCR63) is loaded from the output of the program memory 90. Thus, every 200 ns a new microinstruction is available to control the five downstream processing elements.

The clock generator 36 is utilized throughout the system to provide a clock signal C50 having a 200 ns interpulse period and a clock signal C10 having a 100 ns interpulse period.

Referring now also to FIG. 5 which shows the microword field for the 64 instruction bits, the microinstruction control will be further explained. A 64-bit instruction in the microcommand register 92 supplies the control signals that determine the parallel operations performed by all the processing elements during the corresponding 200 ns clock period. It can be noted that five major fields within the instruction control the processing elements at each modular processing section.

The microinstruction bits and the AEC control fields can be better understood by reference to Table 1, which shows their function in further detail:

TABLE 1

| Microcode Bits | | | | Field* | Description |
|---|---|---|---|---|---|
| | | | | AEC CONTROL FIELDS | |
| 0-7 | | | | OP=(FCTN,MOD) | AEC operation field. |
| | | | | A= | AG source register 1 |
| 8 | 9 | 10 | 11 | | |
| 0 | 0 | 0 | 0 | 0 | AG RALU register A0 |
| . | . | . | . | . | . |
| . | . | . | . | . | . |
| . | . | . | . | . | . |
| 1 | 1 | 1 | 1 | F | AG RALU register A15 |
| | | | | B= | AG source register 2 |
| 12 | 13 | 14 | 15 | | |
| 0 | 0 | 0 | 0 | 0 | AG RALU register B0 |
| . | . | . | . | . | . |
| . | . | . | . | . | . |
| 1 | 1 | 1 | 1 | F | AG RALU register B15 |
| 16 | | | | Spare | |
| 17 | | | | WA = | Working store access request |
| 0 | | | | 0 | WS access not enabled |
| 1 | | | | 1 | WS access enabled |
| 18 | | | | WW = | Working store write enable |
| 0 | | | | R | WS write disabled (WS read) |
| 1 | | | | W | WS write enabled |
| 19 | | | | EA = | Extended work store access request |
| 0 | | | | 0 | Not accessing EWS |
| 1 | | | | 1 | Accessing EWS |
| 20 | | | | WR = | Work store address req (WSAR) |
| 0 | | | | H | Hold previous contents of WSAR |

TABLE 1-continued

| | | | |
|---|---|---|---|
| 21 | 22 | L<br>WC = | Load WSAR<br>Working Store Address<br>Counter (WSAC) |
| 0 | 0 | H | Hold prior contents of WSAC |
| 0 | 0 | L | Parallel load WSAC from WSAR |
| 1 | 0 | D | Decrement WSAC |
| 1 | 1 | I | Increment WSAC |
| 23 | | BR =<br>0 | Bit reverse<br>Bits unaltered from WSAC |
| 1 | | 1 | Bits reversed from WSAC |
| 24 | | Spare | |
| 25 | | CR = | Coefficient Store Address Register (CSAR) |
| 0 | | H | Hold previous contents of CSAR |
| 1 | | L | Load CSAR from 12 LSBs of AG output bus |
| 26 | 27 | CC = | Coefficient store Address Counter (CSAC) |
| 0 | 0 | H | Hold previous contents of CSAC |
| 0 | 1 | L | Load CSAC |
| 1 | 0 | D | Decrement CSAC |
| 1 | 1 | I | Increment CSAC |

MULTIPLIER CONTROL

| | | | |
|---|---|---|---|
| 28 | 29 | MR = | Arithmetic Element Multiplier (MRR) |
| 0 | 0 | H | Hold previous contents of MRR |
| 0 | 1 | W | Load MRR from working store |
| 1 | 0 | U | Hold previous contents of MRR |
| 1 | 1 | C | Load MRR from coefficient store |
| 30 | 31 | 32 | ML = | AE Multiplicand Register (MDR) |
| 0 | 0 | 0 | H | Hold previous contents of MDR |
| 0 | 0 | 1 | WR | Load MDR from working store and MDRD from MDR |
| 0 | 1 | 1 | WS | Load MDR from working store and MDRD from LOR |
| 1 | 0 | 1 | DR | Load MDR from MDRD (MDR delayed) and MDRD from MDR |
| 1 | 1 | 1 | DS | Load MDR from MDRD (MDR delayed) and MDRD from LOR |
| 33 | 34 | MC = | Multiplier Control |
| 0 | 0 | R | Most significant bits rounded |
| 0 | 1 | T | Most significant bits truncated |
| 1 | 0 | U | Table look-up function based upon MRR |
| 1 | 1 | L | Least significant bits unrounded |
| 35 | 36 | L = | Output Hard Limiter |
| 0 | 0 | 0 | No limiting, detect and flag overflow |
| 0 | 1 | 2 | Half scale limiting signal overflows |
| 1 | 0 | 4 | Quarter scale limiting, signal overflows |
| 1 | 1 | 8 | Eighth scale limiting, signal overflows |

| Microcode Bits | Field | Description |
|---|---|---|
| | AE RALU CONTROL | |
| 37 | | Parity Bit (Not programmed) This bit is automatically computed by the assembler. |
| 38 | OT = | RALU Output Enable |
| 0 | Ai, O, F | RALU is enabled, output Ai or F |
| 1 | 1, NS* | RALU₁ REG F is enabled |
| 39 40 41 | DE = | RALU Destination |
| 0 0 0 | Q | Q |
| 0 0 1 | O, NO, NS** | Default or idle |
| 0 1 1 | Bj, j=0,1..., F, NS** | S2 Register (OT = Ai) |
| 0 1 1 | Bj, j=0,1..., F, NS** | S2 Register (OT ≠ Ai) |
| 1 0 0 | RQj,j=0,1...,F | Right-shifted (B, Q) registers |
| 1 0 1 | RBj,j=0,1...,F | Right-shifted (B) registers |
| 1 1 0 | LQj,j=0,1...,F | Left-shifted (B, Q) registers |
| 1 1 1 | LBj,j=0,1...,F | Left-shifted B register |

| Microcode Bits | | | | Field | Description |
|---|---|---|---|---|---|
| | | | | AE RALU OP CODES (NONCONDITIONAL) | |
| 42–44 | 45–47 | 48 | 49 | (R1,OP,S2)*** | |
| I₅₄₃ | I₂₁₀ | C_IN | COND | | |
| 4 | 2 | 0 | 0 | ,ZRO, | Default or Idle state |
| 4 | 0 | 0 | 0 | Ai,AND,Q | |
| 4 | 1 | 0 | 0 | Ai,AND,Bj | |
| 4 | 5 | 0 | 0 | D,AND,Ai | (LOGICAL AND) |
| 4 | 6 | 0 | 0 | D,AND,Q | |
| 3 | 0 | 0 | 0 | Ai,ORR,Q | |
| 3 | 1 | 0 | 0 | Ai,ORR,Bj | |
| 3 | 5 | 0 | 0 | D,ORR,Ai | (LOGICAL OR) |
| 3 | 6 | 0 | 0 | D,ORR,Q | |
| 6 | 0 | 0 | 0 | Ai,EOR,Q | |
| 6 | 1 | 0 | 0 | Ai,EOR,Bj | |
| 6 | 5 | 0 | 0 | D,EOR,Ai | (EXCLUSIVE OR) |
| 6 | 6 | 0 | 0 | D,EOR,Q | |
| 7 | 0 | 0 | 0 | Ai,XNR,Q | |
| 7 | 1 | 0 | 0 | Ai,XNR,Bj | |
| 7 | 5 | 0 | 0 | D,XNR,Ai | (EXCLUSIVE NOR) |
| 7 | 6 | 0 | 0 | D,XNR,Q | |
| 7 | 2 | 0 | 0 | ,INV,Q | |
| 7 | 3 | 0 | 0 | ,INV,Bj | (LOGICAL COMPLEMENT) |
| 7 | 4 | 0 | 0 | ,INV,Ai | |
| 7 | 7 | 0 | 0 | ,INV,D | |
| 0 | 2 | 0 | 0 | ,PAS,Q | |
| 0 | 3 | 0 | 0 | ,PAS,Bj | |
| 0 | 4 | 0 | 0 | ,PAS,Ai | (PASS UNCHANGED) |
| 0 | 7 | 0 | 0 | ,PAS,D | |
| 5 | 0 | 0 | 0 | Ai,MSK,Q | |
| 5 | 1 | 0 | 0 | Ai,MSK,Bj⁶ | |
| 5 | 5 | 0 | 0 | D,MSK,Ai | (MASK) |
| 5 | 6 | 0 | 0 | D,MSK,Q | |
| 0 | 0 | 0 | 0 | Ai,ADD,Q | |
| 0 | 1 | 0 | 0 | Ai,ADD,Bj | |
| 0 | 5 | 0 | 0 | D,ADD,Ai | (SUM) |
| 0 | 6 | 0 | 0 | D,ADD,Q | |
| 0 | 0 | 1 | 0 | Ai,AP1,Q | |
| 0 | 1 | 1 | 0 | Ai,AP1,Bj | |
| 0 | 5 | 1 | 0 | D,AP1,Ai | (SUM + 1) |
| 0 | 6 | 1 | 0 | D,AP1,Q | |
| 0 | 2 | 1 | 0 | ,INC,Q | |
| 0 | 3 | 1 | 0 | ,INC,Bj | |
| 0 | 4 | 1 | 0 | ,INC,Ai | (INCREMENT) |
| 0 | 7 | 1 | 0 | ,INC,D | |
| 1 | 2 | 0 | 0 | ,DEC,Q | |
| 1 | 3 | 0 | 0 | ,DEC,Bj | |
| 1 | 4 | 0 | 0 | ,DEC,Ai | (DECREMENT) |
| 1 | 7 | 0 | 0 | ,DEC,D | |
| 2 | 2 | 0 | 0 | ,ISC,Q | |
| 2 | 3 | 0 | 0 | ,ISC,Bj | |
| 2 | 4 | 0 | 0 | ,ISC,Ai | (ONE's COMPLEMENT) |

TABLE 1-continued

| | | | | | |
|---|---|---|---|---|---|
| 1 | 7 | 0 | 0 | .1SC,D | |
| 2 | 2 | 1 | 0 | .2SC,Q | |
| 2 | 3 | 1 | 0 | .2SC,Bj | |
| 2 | 4 | 1 | 0 | .2SC,Ai | (TWO's COMPLEMENT) |
| 1 | 7 | 1 | 0 | .2SC,D | |
| 1 | 0 | 0 | 0 | Q,SM1,Ai | |
| 1 | 1 | 0 | 0 | Bj,SM1,Ai | |
| 1 | 5 | 0 | 0 | Ai,SM1,D | |
| 1 | 6 | 0 | 0 | Q,SM1,D | (DIFFERENCE−1) |
| 2 | 0 | 0 | 0 | Ai,SM1,Q | |
| 2 | 1 | 0 | 0 | Ai,SM1,Bj | |
| 2 | 5 | 0 | 0 | D,SM1,Ai | |
| 2 | 6 | 0 | 0 | D,SM1,Q | |
| 1 | 0 | 1 | 0 | Q,SUL,Ai | |
| 1 | 1 | 1 | 0 | Bj,SUB,Ai | |
| 1 | 5 | 1 | 0 | Ai,SUB,D | |
| 1 | 6 | 1 | 0 | Ai,SUB,D | |
| 2 | 0 | 1 | 0 | Ai,SUB,Q | (DIFFERENCE) |
| 2 | 1 | 1 | 0 | Ai,SUB,Bj | |
| 2 | 5 | 1 | 0 | D,SUB,Ai | |
| 2 | 6 | 1 | 0 | D,SUB,Q | |

| Microcode Bits | | | | Operation | Field |
|---|---|---|---|---|---|
| CONDITIONAL AE RALU OPERATIONS | | | | | R1, OP, S2 |
| 42 | 43–47 | 48 | 49 | | |
| $I_5$ | $I_{43210}$ | $C_{IN}$ | COND | | |
| 0 | 0 | 0 | 1 | FO = 1:Z/P | ,F1ZP,Bj |
| 0 | 1 | 0 | 1 | FO = 0:Z/P | ,F0ZP,Bj |
| 0 | 2 | 0 | 1 | FO = 0:P/2SC | ,F0P2,Bj |
| 0 | 3 | 0 | 1 | FO = 0:P/1SC | ,F0P1,Bj |
| 0 | 4 | 0 | 1 | CO = 0:P/INC | ,C0P1,Bj |
| 0 | 5 | 0 | 1 | CO = 0:DEC/P | ,C0DP,Bj |
| 0 | 6 | 0 | 1 | CO = 0:1SC/2SC | ,C012,Bj |
| 0 | 7 | 0 | 1 | ROR0 = 0:P/2SC | ,R0P2,D |
| 0 | 8 | 0 | 1 | ROIR0 = 0:P/2SC | ,R1P2,D |
| 0 | 9 | 0 | 1 | CO = 0:A/S | Bj,C0AS,Ai |
| 0 | 10 | 0 | 1 | CO = 0:A/P | Ai,C0AP,Bj |
| 0 | 11 | 0 | 1 | CO = 0:A/A+1 | Ai,C0A1,Bj |
| 0 | 12 | 0 | 1 | CO = 0:S−1/S | Ai,C0SD,Bj |
| 0 | 13 | 0 | 1 | FO = 0:P/A | Ai,F0PA,Q |
| 0 | 14 | 0 | 1 | FO = 0:P/A | Ai,F0PB,Bj |
| 0 | 15 | 0 | 1 | FEQ0 = :P/A | Ai,E0PA,Bj |
| 0 | 16 | 0 | 1 | FEQ0 = 1:P/A | Ai,E1PA,Bj |
| 0 | 17 | 0 | 1 | FO = 0:OR/P | Ai,F0OP,Bj |
| 0 | 18 | 0 | 1 | FO = 0:P/S | Ai,F0PS,Q |
| 0 | 19 | 0 | 1 | FO = 0:S/P | Ai,F0SP,Bj |
| 0 | 20 | 0 | 1 | FO = 0:PA/PB | Ai,F0AB,Bj |
| 0 | 21 | 0 | 1 | FEQ0 = 0:P/RS | ,E0RS,Bj |
| 0 | 22 | 0 | 1 | FEQ0 = 1:P/RS | ,E1RS,Bj |
| 0 | 23 | 0 | 1 | FO = 0:RSA/B | Ai,F0RS,Bj |
| 0 | 24 | 0 | 1 | FO = 9:LSA/B | Ai,F0LS,Bj |
| 0 | 25 | 0 | 1 | CO = 0:A/A+1 | D,C0A1,Ai |
| 0 | 26 | 0 | 1 | FO = 1:DEC/P | ,F1DP,Bj |

| Microcode Bits | | | | | Description | |
|---|---|---|---|---|---|---|
| CONDITIONAL AE RALU OPERATIONS | | | | | | |
| 42 | 43–47 | 48 | 49 | | | |
| $I_5$ | $I_{43210}$ | $C_{IN}$ | COND | IF | THEN | |
| 0 | 0 | 0 | 1 | FO=1 | 0 | DEST |
| 0 | 1 | 0 | 1 | FO=0 | 0 | DEST |
| 0 | 2 | 0 | 1 | FO=0 | Bj | DEST |
| 0 | 3 | 0 | 1 | FO=0 | Bj | DEST |
| 0 | 4 | 0 | 1 | CO=0 | Bj | DEST |
| 0 | 5 | 0 | 1 | CO=0 | Bj−1 | DEST |
| 0 | 6 | 0 | 1 | CO=0 | −Bj−1 | DEST |
| 0 | 7 | 0 | 1 | ROIR=0 | D | DEST |
| 0 | 8 | 0 | 1 | ROIR0=0 | D | DEST |
| 0 | 9 | 0 | 1 | CO=0 | Bj+Ai | DEST |
| 0 | 10 | 0 | 1 | CO=0 | Ai+Bj | DEST |
| 0 | 11 | 0 | 1 | CO=0 | Ai+Bj | DEST |
| 0 | 12 | 0 | 1 | CO=0 | Ai−Bj−1 | DEST |
| 0 | 13 | 0 | 1 | FO=0 | Ai | DEST |
| 0 | 14 | 0 | 1 | FO=0 | Bj | DEST |
| 0 | 15 | 0 | 1 | FEQ0=0 | Bj | DEST |
| 0 | 16 | 0 | 1 | FLQ0=1 | Bj | DEST |
| 0 | 17 | 0 | 1 | FO=0 | Ai v Bj | DEST |
| 0 | 18 | 0 | 1 | FO=0 | Ai | DEST |
| 0 | 19 | 0 | 1 | FO=0 | Bj−Ai | DEST |

TABLE 1-continued

| 0 | 20 | 0 | 1 | FO=0 | Ai | DEST |
|---|---|---|---|---|---|---|
| 0 | 21 | 0 | 1 | FEQ0=0 | Bj | Bj |
| 0 | 22 | 0 | 1 | FEQ0=1 | Bj | Bj |
| 0 | 23 | 0 | 1 | FO=0 | Ai | RBj |
| 0 | 24 | 0 | 1 | FO=0 | Ai | LBj |
| 0 | 25 | 0 | 1 | CO=0 | D+Ai | DEST |
| 0 | 26 | 0 | 1 | FO=1 | Bj−1 | DEST |

| Microcode Bits | | | | Description | | Alternate Condition |
|---|---|---|---|---|---|---|
| 42 | 43–47 | 48 | 49 | | ELSE | |
| $I_5$ | $I_{43210}$ | $C_{IN}$ | COND | | | |
| 0 | 0 | 0 | 1 | Bj | DEST | ROIR0=1 |
| 0 | 1 | 0 | 1 | Bj | DEST | ROIR0=0 |
| 0 | 2 | 0 | 1 | −Bj | DEST | ROIR0=0 |
| 0 | 3 | 0 | 1 | −Bj−1 | DEST | ROIR=0 |
| 0 | 4 | 0 | 1 | Bj+1 | DEST | RAM15=0 |
| 0 | 5 | 0 | 1 | Bj | DEST | RAM15=0 |
| 0 | 6 | 0 | 1 | −Bj | DEST | RAM15=0 |
| 0 | 7 | 0 | 1 | −D | DEST | OVR=0 |
| 0 | 8 | 0 | 1 | −D | DEST | FO=0 |
| 0 | 9 | 0 | 1 | Bj−Aj | DEST | RAM15=0 |
| 0 | 10 | 0 | 1 | Bj | DEST | RAM15=0 |
| 0 | 11 | 0 | 1 | Ai+Bj+1 | DEST | RAM15=0 |
| 0 | 12 | 0 | 1 | Ai−Bj | DEST | RAM15=0 |
| 0 | 13 | 0 | 1 | Ai+Q | DEST | ROIR0=0 |
| 0 | 14 | 0 | 1 | Ai+Bj | DEST | ROIR0=0 |
| 0 | 15 | 0 | 1 | Ai+Bj | DEST**** | Q15=0 |
| 0 | 16 | 0 | 1 | Ai+Bj | DEST**** | Q15=1 |
| 0 | 17 | 0 | 1 | Bj | DEST | ROIR0=0 |
| 0 | 18 | 0 | 1 | Ai−Q | DEST | ROIR0=0 |
| 0 | 19 | 0 | 1 | Bj | DEST | ROIR0=0 |
| 0 | 20 | 0 | 1 | Bj | RBj | Q15=0 |
| 0 | 21 | 0 | 1 | Bj | RBj | Q15=1 |
| 0 | 22 | 0 | 1 | Bj | RBj | ROIR0=0 |
| 0 | 23 | 0 | 1 | Bj | LBj | ROIR0=0 |
| 0 | 24 | 0 | 1 | Bj | LBj | ROIR0=0 |
| 0 | 25 | 0 | 1 | D+Ai+1 | DEST | RAM15=0 |
| 0 | 26 | 0 | 1 | Bj | DEST | ROIR0=0 |

*Note that the default condition is underlined in each field
**NS = not specified
***BITS 42–48 DESIGNATE COMBINED OP CODE AND OPERAND BITS (R1.OP.S2)
****IF i=j then a conditional left (B+2B) shift is effectively specified Where DEST  Bj
            Q
            NONE The major functional fields which are associated with the processing elements as listed above are further broken down into 16 fields which control subtasks within each of the major processing elements. The 64-bit instructions (63+parity) have two formats as shown in FIG. 5 with the first format called the normal microinstruction format having 16 fields that control the various hardware elements in the processor system. The second format called the immediate data format allows 16-bits of immediate data to be specified in microinstruction (MCR) bits 20 through 35. This immediate data can be used either to initialize a register in the address generator or a register in the register and arithmetic logic units 54 and 56. It is to be noted that the immediate data field (MCR bits 20 through 35) overlaps field 5 (bits 20 through 24), field 6, field 7, field 8 and field 9 (bit 35) of the normal microinstruction format. Thus, these fields are not available and the corresponding hardware elements cannot be controlled when the immediate data format is being employed. Hardware logic however may be provided as is well known in the art to insure that a workstore address register (WSAR) 122, current work store address counter (WSAC) 124, coefficient store address register 162, and coefficient store address counter (CSAC) 184 do not change state when a microinstruction with the immediate data format appears in the microcommand register 92.

Referring now in addition to FIG. 3, also to FIG. 6 which shows the address generator unit 34 in further detail, the address generator is a 16-bit processor which has a fundamental task of address arithmetic and may be implemented with an Advanced Micro Devices 2901A, 4-bit slice processor 120. The address generator 34 may also receive data from other modules or may output data to other modules. Additionally the address generator 34 can exercise control over hardware functions in other modules, thus acting as a controller. Control of the address generator unit 34 is programmed as the high order 16-bits of the 64-bit processor instruction and has an instruction format with bit 0 to 7 containing the OP CODE, bits 8 through 11 containing the A field and bits 12 through 15 containing the B field. The 8-bit OP CODE specifies the address generator operation and the A and B fields specify register addresses within the processor 120. Table 2 summarizes the address generator operation code that may be utilized for programming the address generator unit 34. The first column labeled MNEMONIC lists the 45 basic AG functions which can be programed in the processor. The second column lists in shorthand notation the internal operation performed by the address generator processor unit 34 and the third column lists the output of the address generator process at the AGBUS when the tri-state output control is activated. The fourth column lists the 8-bit OP Code (2 HEX characters) required to effect each of the basic 45 AG functions. Across the top of the Table 2 are 15 different columns with each column containing an assembler mnemonic followed by a short explanation of each entry. These 15 columns are called modifiers because they modify the basic AG function to produce a composite OP CODE. Each one of these 15 column operations is an operation which is concurrent with the 45 basic AG functions as the Table is a matrix of 45 different AG functions (ROWS) and 15 different modifiers (columns). With each assembler input statement to the address generator one or two concurrent operations are essentially being programmed. It is also to be noted that in Table 2 a modifier cannot be coded in concurrence with all of the 45 AG operations in the Table. For example, only 10 different AG functions can be programmed with the EQO column modifier which sets a flag flip-flop if the output of the address generator is equal to zero. These unused OP CODES if inadvertently coded, are interpreted as a "no" operation by the hardware. The Table 2 shows the 118 OP CODES that are utilized in the illustrated processor of the 256 available OP CODES.

TABLE 2

ADDRESS GENERATOR OPERATION CODE

| MNE-MONIC | INTERNAL | OUTPUT Y | NONE* 00 | EQO: 01 | MSB: 02 | CRY: | AGO: | LPC: | AEO: 05 | EWC: 08 | DWC: | EWI: 0A | IAE: | SWI: | VAL: | ACK: | DAT: |
|---|---|---|---|---|---|---|---|---|---|---|---|---|---|---|---|---|---|
| AGPC | PC+B | A | 00 | | | | | | | | | | | | | | |
| AGWC | WS MUX+B | A | 0C | | | | | | | | | | | | | | |
| AGCC | CSAC+B | A | 0D | | | | | | | | | | | | | | |
| AGCS | CS+B | A | 0E | | | | | | | | | | | | | | |
| IAGI | IMM DATA+B | A | 0F | | | | | | | | | | | | | | |
| AIDA | IMM DATA+A+B | ID+A | 8C | | | | | | | | | | | | | | |
| AIDC | FLAG = 0 ID+ | ID+A | | | | | | | | | | | | | | | |
| | A+B | | 8D | | | | | | | | | | | | | | |
| BALP | FLAG = 1 A+B | A+PC | | | | | | | | | | | | | | | |
| LRAB* | PC+B | A+PC | F0 | | | | | FB | | | | | | | | | |
| INCR | A+B | A | 10 | | | | | | | | | | | | | | |
| DECR | A+1+B | 30 | 30 | 11 | 12 | 33 | 34 | F1 | 15 | 18 | 19 | 1A | 20 | B0 | B1 | | |
| ARAB | A−1+B | 40 | 40 | 31 | 32 | | | F2 | 35 | 38 | 39 | 3A | | | | | |
| SRAB | B+A+B | B+A | 50 | 41 | 42 | 43 | 44 | F3 | 45 | 48 | 49 | 4A | | | | | |
| OSAB | B−A+B | B−A | 60 | 51 | 52 | 53 | 54 | F4 | 55 | 58 | 59 | 5A | | | | | |
| | | B+A | 70 | 61 | 62 | 63 | 64 | | 65 | 68 | 69 | 6A | | | | | |
| NRAB | B ∧ A+B | B ∧ A | 78 | 7D | | | | | | | | 7E | | | | | |
| SALA | 2A+B (ARITH) | A | 70 | 79 | | | | | | | | 7A | | | | | |
| SAI.I. | 2A+B (LOG) | A | 71 | | | | | | | | | | | | | | |
| SLLI | 2A+B (1 FILL) | A | 72 | | | | | | | | | | | | | | |
| RAI.L | ROTATE LEFT LOG | A | 73 | | | | | | | | | | | | | | |
| SARA | ½A+B (ARITH) | A | 74 | | | | | | | | | | | | | | |
| SAI* | ½A+B (LOG) | A | 75 | | | | | | | | | | | | | | |
| SRI.I | ½A+B (1 FILL) | A | 76 | | | | | | | | | | | | | | |
| RARI. | ROTATE RT LOG | A | 77 | | | | | | | | | | | | | | |
| STCS | LOAD A INTO CS | PC+1+PC | E6 | | | | | | | | | | | | | | |
| BTAG | FLAG = 0 | | F7 | | | | | | | | | | | | | | |
| | FLAG = 1 | B+PC | | | | | | | | | | | | | | | |
| BFAG | FLAG = 0 | B+PC | F5 | | | | | | | | | | | | | | |
| | FLAG = 1 | PC+1+PC | | | | | | | | | | | | | | | |
| LRCS | FLAG = 0 B+B | B | 80 | 81 | | | | | | | | 82 | | | | | |
| | FLAG = 1 A+B | A | 84 | 85 | | | | | | | | 86 | | | | | |
| APCB | FLAG = 0 B+A+B | B+A | 89 | | | | | | | | | | | | | | |
| | FLAG = 1 B+B | B | 8A | | | | | | | | | | | | | | |
| AQI.I. | 2A+B, 2Q+Q | A | 21 | | | | | | | | | | | | | | |
| ACRL | ½A+B, ½Q+B | A | 88 | | | | | | | | | | | | | | |
| LRAQ | A+Q | Q | 22 | | | | | | | | | | | | | | |
| LROB | A+B | Q | B2 | | | | | | | | | | | | | | |
| OQXX | | A | | | | | | | | | | | | | | | |
| SSTA | SET AEC STATUS REGISTER | ID | B4 | | | | | | | | | | | B3 | | | |
| SSTI | SET AEC STATUS REGISTER | | | | | | | | | | | | | | B5 | | |
| RSIA | AEC STAT REG ↓B | | B6 | | | | | | | | | | | | | B7 | |
| OCMD | OUTPUT COMMAND TO EIU | A | B8 | | | | | | | | | | | | | | |

TABLE 2-continued

ADDRESS GENERATOR OPERATION CODE

| | | | |
|---|---|---|---|
| OCMI | OUTPUT COMMAND TO EIU | ID | B9 |
| ODAT | OUTPUT A TO EIU | A | BA |
| ODAI | OUTPUT ID TO EIU | ID | BC |
| FDAT | READ DATA FROM EIU→B | — | BD |
| LBAR | LOAD EWS BAR FROM A | A | BE |
| LBAI | LOAD EWS BAR FROM ID | ID | BF |
| RBAR | READ EWS BAR INTO B | — | C0 |
| HALT | | | FF |

MODIFIERS
NONE*
EQO: LOAD AG FLAG F/F WITH AG'S F=0
MSB: LOAD AG FLAG F/F WITH AG'S F₀ (ALU MSB)
CRY: LOAD AG FLAG F/F WITH AG'S C_OUT
AGO: LOAD AG FLAG F/F WITH AG'S OVERFLOW
LPC: LOAD PC FROM AG
AEO: LOAD AG FLAG F/F WITH AE'S OVERFLOW
EWC: ENABLE CURRENT WORK STORE WRITE
DWC: DISABLE CURRENT WORK STORE WRITE
EWL: EN CURRENT WORK STORE IF COND FF = 1
IAE: INITIALIZE AE RALU WITH IMMED DATA
SWI: SET SWI FIT IN AEC STATUS REGISTER
VAL: CLEAR VAL BIT IN AEC STATUS REGISTER
ACK: LOAD AG FLAG F/F WITH ACK SIGNAL FROM EIU
DAT: LOAD AG FLAG F/F WITH DAT SIGNAL FROM EIU

*DEFAULT STATE

The input terms and signals to the address generator unit 34 are as follows:

| Data Inputs | Comments |
|---|---|
| CSD00 through CSD16 | 16-bit data from coefficient output MUX. This can be immediate data or the CS address counter or the CS memory contents as specified by the controls to the CS data output MUX. |
| PC04 through PC15 | The 12-bit program counter contents which specifies the next instruction address. |
| AEO | Limiter output overflow indicator to flag flip-flow. |

| Control Inputs | Comments |
|---|---|
| PMDR00 through PMDR07 | Early 8 bits of address generator OP CODE for look ahead OP CODE translation and look ahead control. |
| MCR00 through MCR07 | Address generator OP CODE for slower decoding in PROMS and gates. |
| MCR08 through MCR011 | 4 bit A field address from microcommand register |
| MCR12 through MCR15 | 4 bit B field address from microcommand register |
| $\overline{ENOUT}$ | SSI developed composite signal which puts 2901 on AG output bus when low. |

Four control bits are received from the microcommand register 92 to effect control over the work store address register (WSAR) 122, work store address counter (WSAC) 124 and a work store address MUX 126. The microbits have the following functions:

| Controls | Comments |
|---|---|
| MCR20 | Load work store address register when true. |
| MCR21 through MCR22 | Two bit field which controls holding, loading, incrementing or decrementing of the work store address counter. |
| MCR23 | Single bit from MCR which controls selection of address to be output to work store memory module. |

The output terms or signals from the address generator unit 34 and from the address generator processor 120 are as follows:

| Data Outputs | Comments |
|---|---|
| AG00 through AG15 | The tri-state address generator outputs (when enabled). |

| Address Outputs | Comments |
|---|---|
| WSA04 through WSA15 | 12-bit address from work store output MUX to work store memory module(s). |

Also, a number of OP CODE decoded functions for controlling other modules are also provided as will be discussed subsequently.

A look-ahead OP CODE translator 138 is provided and may be a table look up PROM which translates an 8-bit composite AG OP CODE and the output of the flag flip-flop 140 into equivalent instructions for the address generator processor 120. Any suitable processor may be utilized in the address generator processor 120 which in the illustrated system is the Advanced Micro Devices 2901A 4-bit slice processor, with four 2901A slices combined in accordance with the manufacturer's instructions. A look-ahead is required to accommodate additional instructions which change the 2901A instructions as a function of a FLAG flip-flop 146. It is to be recalled that the first half of the instruction fetched from the program memory, is resident in the program memory data register 110 during the last one hundred nanoseconds when the second half of the instructions is fetched. This second one hundred nanosecond time interval is utilized to effect the look-ahead. The OP CODE for the address generator is resident in RMDR00 through RMDR07 for translation into 2901A processor language. As is well known in the art each of the mnemonic functions of Table 3 is provided in the 2901A instructions by translation to a 12-bit 2901A instructions. Table 3 describes the translation of AG OP CODE functions to 2901A instructions. The Table shows the assembler mnemonic for the programmed AG function and the corresponding 12-bit translated 2901A instruction. The basic 9-bit OP CODE is tabulated under the RALU comumn and is shown in the 2901A octal instruction. The input carry is listed under the column labeled C. The two $S_1$ and $S_2$ bits are utilized to specify shift inputs to the 2901 A for shift instructions. The output column specifies the output of the tri-state address generator bus when enabled to be output. Thus, it can be seen that the OP CODE translator 138 can provide a translation to the OP CODE of the 2901A processor, or any other suitable processor that may be utilized in the system in accordance with the invention.

TABLE 3

| | | OP CODE TRANSLATION | | | | | |
|---|---|---|---|---|---|---|---|
| MNEM | FUNCTION | (Flag) | (Int Op) | (Out) | (RALU) | (C) | (S2, S1) |
| Halt | Halt all AEC operations | | | | 142 | 0 | 0 |
| LRAB | Load A into B | | A=>B | A | 304 | 0 | 0 |
| INCR | Increment A | | A+1=>B | A+1 | 304 | 1 | 0 |
| DECR | Decrement A | | A−1=>B | A−1 | 314 | 0 | 0 |
| ARAB | Add A to B | | B+A=>B | B+A | 301 | 0 | 0 |
| SRAB | Subtract A from B | | B=A−>B | B=A | 311 | 1 | 0 |
| OSAB | Output sum of A and B | | | B+A | 101 | 0 | 0 |
| NRAB | and A with B | | B&A=>B | B&A | 341 | 0 | 0 |
| BALP | Branch and link PC=B, A=PC | | PC=>B | A | 237 | 0 | 0 |
| BTAG | Branch on AG flag P/P true | 0 | | PC+1 | 107 | 1 | 0 |
| | (load PC from AG, D=PC) | 1 | | B | 103 | 0 | 0 |

TABLE 3-continued

OP CODE TRANSLATION

| MNEM | FUNCTION | (Flag) | (Int Op) | (Out) | (RALU) | (C) | (S2, S1) |
|---|---|---|---|---|---|---|---|
| BFAG | Branch on AG flag false | 0 | | B | 103 | 0 | 0 |
| | (load PC from AG, D=PC) | 1 | | PC+1 | 107 | 1 | 0 |
| LRCB | Conditionally load A into B | 0 | B=>B | B | 303 | 0 | 0 |
| | | 1 | A=>B | A | 304 | 0 | 0 |
| ARCB | Conditionally add A to B | 0 | B+A=>B | B+A | 301 | 0 | 0 |
| | | 1 | B=>B | B | 303 | 0 | 0 |
| AGPC | Load AG from PC | | PD=>B | A | 237 | 0 | 0 |
| AGWC | Load AG from WS AC out MUX | | MUX=>B | A | 237 | 0 | 0 |
| AGCC | Load AG from CS addr counter | | CSC=>B | A | 237 | 0 | 0 |
| AGCS | Load AG from CS | | CS=>B | A | 237 | 0 | 0 |
| IAGI | Init AG with/immed. Data | | I=>B | A | 237 | 0 | 0 |
| AIDA | Add immed. data to A | | I+A=>B | I+A | 305 | 0 | 0 |
| AIDC | Conditionally add immed. data to A | 0 | I+A=>B | I+A | 305 | 0 | 0 |
| | | 1 | A=>B | A | 304 | 0 | 0 |
| STCS | Store A into CS | | — | A | 203 | 0 | 0 |
| LRAQ | Load A into Q | | A=>Q | Q | 4 | 0 | 0 |
| LRQB | Load Q into B | | Q=>B | Q | 302 | 0 | 0 |
| QQXX | Output Q | | | Q | 102 | 0 | 0 |
| AQLL | Shift A & Q left logical | | 2A=>B | A | 604 | 0 | 0 |
| | | | 0=>B15 | | 0 | 0 | 0 |
| | | | 2Q=>Q | | 0 | 0 | 0 |
| | | | 0=>Q15 | | 0 | 0 | 0 |
| AQRL | Shift A & Q right logical | | ½A=>B | A | 404 | 0 | 0 |
| | | | 0=>B0 | | 0 | 0 | 0 |
| | | | ½Q=>Q | | 0 | 0 | 0 |
| | | | 0=>Q0 | | 0 | 0 | 0 |
| SALA | Shift A left arithemtic | | 2A=>B | A | 704 | 0 | 1 |
| | | | 0=>B15 | | 0 | 0 | 0 |
| SALL | Shift A left logical | | 2A=>B | A | 704 | 0 | 0 |
| | | | 0=>B15 | | 0 | 0 | 0 |
| SLLI | Shift A left logical (1 fill) | | 2A=>B | A | 704 | 0 | 0 |
| | | | 1=>B15 | | 0 | 0 | 0 |
| RALL | Rotate A left logical | | 2A=>B | A | 704 | 0 | 1 |
| | | | A0=>15 | | 0 | 0 | 0 |
| SARA | Shift A right arithmetic | | ½A=>B | A | 504 | 0 | 1 |
| | | | A0=>B0 | | 0 | 0 | 0 |
| SARL | Shift A right logical | | ½A=>B | A | 504 | 0 | 0 |
| | | | 0=>B0 | | 0 | 0 | 0 |
| SRLI | Shift A right logical (1 fill) | | ½A=>B | A | 504 | 0 | 0 |
| RARL | Rotate at right logical | | 1=>B0 | | 0 | 0 | 0 |
| | | | ½A=>B | A | 504 | 0 | 1 |
| | | | A15=>B0 | | 0 | 0 | 0 |
| SSTA | Set AEC status register from A | | — | A | 134 | 0 | 0 |
| SSTI | Set AEC status register from Immed. Data | | — | I | 137 | 0 | 0 |
| RSTA | Read AEC status register into B | | SR+B | — | 237 | 0 | 0 |
| OCMD | Output command to EIU from A | | — | A | 134 | 0 | 0 |
| OCMI | Output command to EIU from Immed. Data | | — | I | 137 | 0 | 0 |
| ODAT | Output A to EIU | | — | A | 134 | 0 | 0 |
| ODAI | Output Immed. Data to EIU | | — | I | 137 | 0 | 0 |
| RDAT | Read data from EIU | | D+B | — | 237 | 0 | 0 |
| LBAR | Load EWS BAR from A | | — | A | 134 | 0 | 0 |
| LBAI | Load EWS BAR from Immed. Data | | — | ID | 137 | 0 | 0 |
| RBAR | Read EWS BAR | | BAR+B | — | 237 | 0 | 0 |

Further information is presented on the AG OP CODES in Table 4.

TABLE 4

ADDRESS GENERATOR FUNCTIONS

| Mnemonic | Description | Hex Code |
|---|---|---|
| AGPC | Load AG register B from the program counter (PC) which contains the address of the next instruction to be executed. | 00 |

TABLE 4-continued

ADDRESS GENERATOR FUNCTIONS

| Mnemonic | Description | Hex Code |
|---|---|---|
| AGWC | Output register A. Load AG register B from work store address counter MUX and output register A. Two examples follow which illustrate the use of working store extended access request (EA) and bit reverse (BR) ØP = AGWC, A=1, B=2, load access WSAC and into AG register 2; output register 1. ØP = AGWC, A=1, B=2, BR=1 load bit-reversed WSAC into AG register 2; output register 1. | 0C |
| AGCC | Load AG register B from coefficient store address counter (CSAC) and output register A. | 0D |
| AGCS | Load AG register B from coefficient store (CS) location indicated in CSAC and output AG register A. | 0E |
| IAGI | Load AG register B with immediate data. Output AG register A. | 0E |
| AIDA | Load AG register B with the sum of register A and 16-bit immediate data. Output AG register A. | 8C |
| AIDC | Conditionally load AG register B with the sum of register A and 16-bit immediate data when the AG flag is 0; or load AG register B from AG register A if the AG flag is 1. The AG RALU output is, respectively, immediate data + AG register A (when flag = 0 or AG register A (when flag = 1). | |
| BALP | Load the program counter (next instruction's address) into AG register B and replace the program counter with the contents of AG register A. NOTE The next sequential instruction is executed before branching based upon the address loaded into the program counter. Example: 1 ØP=IAGI, B=1, AD3=BRNCH Load AG register 1 with "BRNCH" 2 ØP=BALP, A=1 Branch to "BRNCH" 3 ØP=INCH   Increment AG register 0 . . . 9 BRNCH ØP=DECR Decrement AG register 0 The sequence of instruction executed is 1, 2, 3, 9, ie, 3 is executed before branching. | F0 |
| LRAB | Load AG register A into AG register B and output register A. NOTE This is the default state for bits 0 through 7. | 10 |
| INCR | Load AG register B with AG register A incremented by 1. Output AG register A, incremented. | 30 |
| DECR | Load AG register B with AG register A decremented by 1. Output AG register A, decremented | 40 |
| ARAB | Load AG register B with the sum of AG register A and AG register B. Output AG register A + AG register B. | 50 |
| SRAB | Load AG register B with the difference AG register B - AG register A and output the difference. NOTE The difference is B-A not A-B. | 60 |
| ØSAB | Output AG register A plus AG register B. NOTE This instruction does not alter any of the AG registers. | 70 |
| NRAB | Load AG register B with the logical "AND" A B and output A B. | 78 |
| SALA | Load register B with AG register A left-shifted arithmetically, ie, a zero is shifted into the LSB and the MSB or sign bit is preserved, with a shift out of the 2nd MSB. Output register A. | |
| SALL | Load AG register B with AG register A left-shifted logically ie, a zero is shifted into the LSB and the MSB is shifted out. Output register A. | |
| SLL1 | Load AG register B with AG register A left-shifted logically and 1-filled from the right; ie, a one is shifted into the LSB and the MSB is shifted out. Output register A. | 72 |
| RALL | Load AG register B with AG register A left-shifted logically and the MSB of register A shifted into the LSB of register B. Register A is left-rotated logically into register B. Output register A. | 74 |
| SARA | Load AG register B with AGH register A right-shifted arithmetically; ie, the sign bit is extended into the next significant bit and the LSB is shifted out. Output register A. | 75 |
| SARL | Load AG register B with AG register a right-shifted logically, ie, zero is shifted into the MSB or sign bit and the LSB is shifted out. Output register A. | 75 |
| SRL1 | Load AG register B with AG register A right-shifted logically with one shifted into the MSB or sign bit and the LSB is shifted out. Output register A. | 76 |
| RARL | Load AG register B with AG register A right-shifted logically and the LSB of register A shifted into the MSB of register B. Output register A. | 77 |
| STCS | Load AG register A into the coefficient store (CS) at the location given by the coefficient store address counter. | E6 |
| BTAG | If the AG flag — 0, the program counter (PC) is incremented by 1; if the AG flag — 1, the PC is loaded from AG register B. The AG flag must be set 2 clocks prior to its usage. Example: 1 ØP=(LRAB,EQO) Load AG flag 2 ØP=LRAB NO-OP wait one clock 3 ØP-BTAG, B=1 Conditional operation | F7 |
| BFAG | If the AG flag = 0, load AG register B into the program counter (PC); if the AG flag = 1, increment the PC by 1. NOTE See note on BTAG | F5 |
| LRCB | If the AG flag = 0, load AG register B into AG and output register B; if the AG flag = 1, load AG register A into AG register B and output register A. NOTE See note for BTAG | 80 |
| ARCB | If the AG flag = 0, load AG register B with the sum of AG register A and AG register B and output the sum. If the AG flag = 1, load AG register B from AG register B and output register B. | 84 |
| AQLL | Logically left-shift AG register A and load it into AG register B; logically left-shift Q, passing the MSB into the LSB of register B and 0 into the LSB of Q: | 89 |

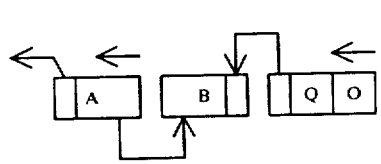

| AQRL | Logically right-shift AG register A and | 8A |

TABLE 4-continued
ADDRESS GENERATOR FUNCTIONS

| Mnemonic | Description | Hex Code |
|---|---|---|
| | load it into AG register B with 0 in the MSB and pass the LSB into the MSB of Q which is also right-shifted 1 bit: | |
| LRAQ | Load AG register Q from AG register A and output register Q. | 21 |
| LRQB | Load AG register B from AG register Q and output register Q. | 88 |
| ØQXX | Output AG register Q. NOTE No change occurs in any of the AG registers on this instruction. | 22 |
| SSTA | Set AEC status bits in the AEC status register from the 5 LSBs (bits 11 thru 15) of AG register A. | |
| SSTI | Set AEC status bits in the AEC status register from the 5 LSBs of the immediate data field (microinstruction bits 31 thru 35). | |
| RSTA | Read the AEC status register into AG register B. | |
| OCMD | Output a command from AG register A to the EIU. | |
| OCMI | Output a command from the microinstruction immediate data field to the EIU. | |
| ODAT | Output data from AG register A to the EIU. | |
| ODAI | Output data from the microinstruction immediate data field to the EIU. | |
| RDAT | Read data from the EIU into AG register B. | |
| LBAR | Load the EWS bank address register from bits 12 thru 15 of AG register A. | |
| LBAI | Load the EWS bank address register from the 4 LSBs of the immediate data field (microinstruction bits 32 thru 35). | |
| RBAR | Read the EWS bank address register into bits 12 thru 15 of AG register B; bits 0 thru 11 are (TBD). | |
| HALT | Halt AG operation and set AEC to quiescent state. | FF |
| EQO | Load AG flag F/F with AG F = 0 output | |
| MSB | Load AG flag F/F with AG F0 output | |
| CRY | Load AG flag F/F with AG Co output | |
| AGØ | Load AG flag F/F with OVR output | |
| AEØ | Load AG flag F/F with AE OVR output | |
| EWC | Enable writing into current work store (See Note 1) | |
| DWC | Disable writing into current work store (See Note 1) | |
| EWC | Enable writing into current work store if AG flag F/F = 1 (see Note 1) | |
| IAE | Initialize AE RALU with immediate data from microinstruction (See Note 2) | |
| LPC | Load program memory address counter (PC) from AG | |
| SWI | Set the SWI bit in the AEC status register | |
| VAL | Clear the VAL bit in the AEC status register | |
| ACK | Load AG FLAG F/F with ACK signal from EIU. (The ACK signal designates whether or not the EIU has processed a command or data word previously sent to the EIU from the AEC. Specifically whenever the AEC executes a OCMD, OCMI, ODAT, or ODAI instruction, the ACK signal will be cleared false until the EIU has processed the command | |

TABLE 4-continued
ADDRESS GENERATOR FUNCTIONS

| Mnemonic | Description | Hex Code |
|---|---|---|
| | or data word at which time it will be set true.) | |
| DAT | Load AG FLAG F/F with DAT signal from the EIU. (The DAT signal designates whether or not the EIU has a data word available for the AEC. Specifically the EIU will set the DAT signal true whenever a data word is available for the AEC; when the AEC executes a RDAT instruction the DAT signal will be cleared false.) | |

An instruction register 146 copies the translated OP CODE each 200 ns clock time and its 12-bit instruction register contains the 2901A instruction that is executed each clock time. The instruction is applied to the $I_0/I_8$,-$C_{IN}$ input port.

An input MUX 142 applies data at the D input port of the address generator processor 120 and three sources are selectable under OP CODE decoding in an OP CODE decoding unit 148 providing terms IMS0 and IMS1. These two bits of control are timely because of the look-ahead decoding of the decoding unit 148. The three sources of data into the intput MUX 142 are:

a. The 12-bit program counter 94 (PC04 through PC15), which is selected when an AG operation requiring PC data is required (AGPC, BALP).

b. Coefficient store output MUX (CSD00 through CSD15) data which is selected when OP CODE denotes CS data or immediate data (immediate data is passed through the CS MUX) or the 12-bit CS address counter.

c. The 16-bit address specified by the work store address counter MUX. (WSA0 through WSA15). This data is selected by the assembler mnemonic AGWC.

A shift input MUX 150 selects data to be serially input to the 2901A register file as a function of the OP CODES. The following Table depicts data that is shifted into the RM0 and RM3 ports of the processor 120 when executing any of the 10 shift instructions of the processor's system.

| Assembler Coding | MSB Input | LSB Input | Comment |
|---|---|---|---|
| SALA | X | 0 | Zero to LSB |
| SALL | X | 0 | Zero to LSB |
| SLLI | X | 1 | One to LSB |
| RALL | X | MSB of data | Rotate left |
| SARA | MSB | X | Spread sign |
| SARL | 0 | X | Right shift and insert 0 |
| SRLI | 1 | X | Right shift and insert 1 |
| RARL | LSB | X | Rotate Right |
| AQLL | X | MSB of Q | Double left shift 1 + LSB of Q |
| AQRL | 0 | X | Double length right shift logic LSB of register to Q |

As is well known in the art, and is shown in Advanced Micro Devices Inc. Catalog, a 2901A implemented address processor is a microprogrammable processor which contains 17 registers and may be mechanized for 16-bits in width. In addition to the 4-bit slices, 2901A, a look-ahead carry generator, S182, may be utilized for fast anticipated carries required in the arithmetic operations. It is well known in the art that the 2901A process contains registers which are utilized as index registers and loop counters which can be controlled by the programmer. The two 2901A register address fields (A and B) are supplied directly by the microcommand register as follows:

| | Comments |
|---|---|
| MCR08 through MCR11 | |
| A field | Specifies the address of one of 16 registers as a source operand. |
| MCR12 through MCR15 | |
| B field | Specifies the address of one of the 16 registers acting as a source operand or as a destination when writing back into file. |

The 9-bit OP CODE field, $I_8$ through $I_0$, and the input carry are supplied by the instruction register 146. The four status output from the 2901A processor (CRY, MSB, AGO, and EQO) are applied to a flag input flip-flop MUX 152 for being tested and providing an input to the flag flip-flop 140 also receiving a clock signal C5. An ENAB1 signal is received on a lead 156 from the OP CODE decoding unit 148 to enable the flag flip-flop 140. The AG address bus 31 (AG00 through AG15) applies output addresses to the work store address register 122 and data inputs to the RAM portions of a coefficient store memory module 160. The coefficient store address register 162 also receives addresses from the AGBUS 31. The output enable EIU/AGOFF which enables the output of the 2901A to the AGBUS is controlled from three basic sources. The output is put on the bus for a group of decoded instructions listed in Table 2 and the function is labeled AGOUT at the output of the OP CODE decoding unit 148. The two other sources which puts the 2901A output on the AGBUS 31 are those two control bits which specify loading the coefficient store address register 162 (MCR25) or the loading of the work store address register 122 (MCR20).

The flag flip-flop 140 can be set under address generator OP CODE control from one to eight possible sources and this flip-flop can subsequently control one of five possible conditional AG operations (AIDC, BTAG, BFAG, LRCB, ARCB). The seven sources of data that can be set into the flag flip-flop 140 are assembler designated by one of eight OP CODE modifiers from Table 2. The composite OP CODE (operation and modifier) is decoded into four lines to select one of eight inputs and to enable clocking of the flag flip-flop. The seven modifiers which act concurrently with the AG functions are as follows:

| Assem Coding | Comment |
|---|---|
| OP = (OP, EQO) | Set flag, if AG ALU outputs equal zero. Ten concurrent AGU operations are possible. |
| OP = (OP, MSB) | Set flag if AG ALU MSB equals one. Six concurrent AG operations are possible. |
| OP = (OP, CRY) | Set flag if output carry from AG ALU is one. Four concurrent AG operations are possible. |
| OP = (OP, AGO) | Set flag if AG overflows. Four concurrent AG operations are possible. |
| OP = (OP, AEO) | Set flag if limiter output has overflowed. Six concurrent AG operations are possible. |

-continued

| Assem Coding | Comment |
|---|---|
| OP = (OP, ACK) | Set flag if ACK signal from EIU is true. One concurrent AG operation is possible. |
| OP = (OP, DAT) | Set flag if DAT signal from EIU is true. One concurrent AG operation is possible. |

The flag flip-flop input MUX 152 thus responds to the seven modifiers which set the flag flip-flop when it is enabled.

The OP CODE decoding unit 148 provides both normal and look-ahead decoding with normal decoding being utilized when speed of decoding is not of prime importance, such as in setting of the flag flip-flop 140. PROMS are used to decode these functions as required. When time is critical in a data path then the look-ahead technique employed in translating the AG OP CODE into the 2901A format is utilized. Two such very important data path selections are the coefficient store output MUX select CSS0 and CSS1 and the 2901A input MUX control select IMS0 and IMS1. These four bits which steer data through these multiplexers employ look-ahead so that the controls are clocked into a flip-flop every 200 ns.

The composite AG OP CODE affects two processes, programming of the 2901A address generator processor as discussed above and a controller function. The controller functions are affected concurrently with AG address processing. The output functions of the controller which may be provided on a composite lead 164 at the output of the OP CODE decoding unit 148 are decoded 8-bit AG composite OP CODES as are listed in a Table 5.

TABLE 5

| Hardware Function | Comment |
|---|---|
| LPC | Load program counter to effect a branch. |
| CSS0/CSS1 | Select CS data output MUX as a function of OP CODE. |
| AGOUT | Specify a decoded instruction which requires enabling AG to tri-state output bus. |
| HALT | Decoded $FF_{16}$ OP CODE which is used to reset the run flip-flop, i.e., minipro halts. |
| EWC | Enable work store write. |
| DWC | Disable work store write. |

The work store address register 122 which has a 16-bit capacity is loaded from the AGBUS 31. A single bit of control MCR20 and the clock pulse C5 loads this register 122. A zero holds the current contents of the work store address register 122 and a one loads the register 122 from the 16 bits of the AGBUS 31.

The 16-bit work store address counter 124, which is an up/down counter, can be loaded from the work store address register 122, incremented or decremented. The control for this counter 124 is provided by two control bits MCR21, MCR22 and the microcommand register 92 to provide the control as summarized below.

| MCR21 | MCR22 | Comments |
|---|---|---|
| 0 | 0 | Hold current contents. |
| 0 | 1 | Load WSAC from work store address |

-continued

| MCR21 | MCR22 | Comments |
| --- | --- | --- |
|  |  | register (WSAR). |
| 1 | 0 | Decrement address counter. |
| 1 | 1 | Increment address counter. |

It should be noted that the output of the work store address counter 124 is applied to both the work store address MUX 126 and the extended work store address MUX 220.

The work store output MUX 126 supplies the count to the work store address counter 124 or the bit reversed count to the work store memory modules such as 50. The bit reversed addressing is utilized to effect data sorting algorithms that may be programmed within the processor. The single bit of control which effects this bit reversal is MCR23 which provides a bit reversal when a zero receives the bits unaltered from the work store address counter 124 and when a 1 reverses the bit so that signals WAC15/WAC04 changes to WSA04/WSA15.

Figure 7:
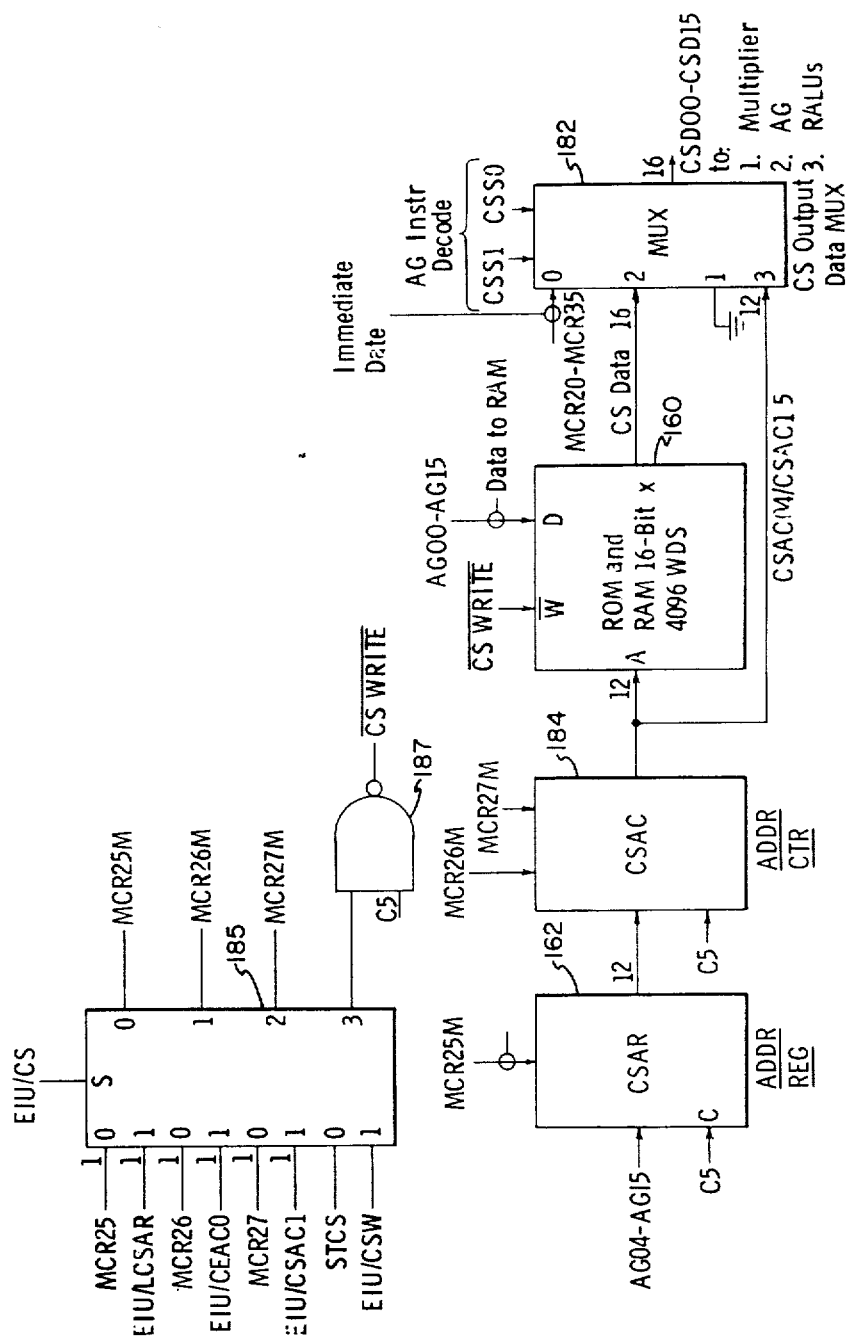
FIG. 7 is a schematic block diagram of the coefficient store (CS) unit of FIG. 3.

Referring now to FIG. 7 as well as FIG. 3, the coefficient store unit 32 is primarily used to store coefficients required by the high-speed multipliers, such as 52, to effect FFT (fast fourier transform) and other digital filters, for example, as well as any processing tasks which the processing system in accordance with the invention has been programmed to perform. A secondary usage of the coefficients store unit 32 is to provide expanded data storage for use by the arithmetic element controller 10 programs. Arithmetic element controller executive program control tables, algorithm parameters and a subroutine address table (SAT) may also be stored in the coefficient store memory 160 of the coefficient store unit 32. It should be noted that by storing SATs in the coefficient store memory 160 the processor system in accordance with the invention is table programmable by addressing subroutines which, for example, may be permanently stored in the program memory 90. The system access time of the coefficient store memory 160 is such that coefficients can be supplied every 200 ns to modules to which the coefficient storage unit 32 provides outputs. The inputs to the coefficient store unit 32 are:

a. The tri-state 16-bit AGBUS 31 which supplies addresses and data to the coefficient store module 160.

b. 16-bit immediate data MCR20 through MCR35 from the microcommand register 92 which can be output from a coefficient store output MUX 182 to processing elements in the arithmetic elements.

c. Those controls which are necessary to control the module under program control, that is, the microinstructions, or under control by the EIU. The outputs of the coefficient store module which supply the address generator, multiplier and RALU modules are sixteen multiplexed output data lines CSD00 through CSD15 which supply from a coefficient store output MUX 182, data from the output of the coefficient store memory 160, 16-bit immediate data MCR20 through MCR35 from the program instruction and the current address CSAC04 through CSAC15 of the coefficient store address counter 184 which is contained in 12-bits. The coefficient store memory 160 in the illustrated system is capable of addressing a maximum of 4096 16-bit memory locations $000_{16}$ through $FFF_{16}$.

The coefficient store unit 32 is generally under program control but the control element interface 61 under software directives from the control element CE through the external interface unit 24 can supply data-/addresses over the AGBUS 31 and those controls required to load addresses, to write and provide other operations when the EI unit 24 has the control. Thus, controls and data are both multiplexed between program and external interfaces.

The coefficient store address register 162 is a 12-bit register which is loaded under program control MCR25 from the low order 12-bits of the address generator bus 31 at clock time C5. The microcommand register bit MCR25M controls the register 162 to hold the current contents when it is a zero and to reload it from the low order twelve bits from the AGBUS 31 when MCR25 is a 1. Control from both the AEC unit 10 and the EI unit 24 is provided by a 2 input MUX 185 which receives five lines from the EIU to control the CS memory address register 162, CS address counter 184 and for writing into the coefficient store 160. These controls are multiplexed with microcommand register controls from the arithmetic element controller 10.

| Hardware Function | Comment |
| --- | --- |
| EIU/CS | When true the EIU control over CS memory multiplexed controls. When false, the control is from the microcommand register. |
| EIU/LCSAR | When true, the coefficient store address register is loaded from the tri-state AGBUS. But only if EIU/CS is true. |
| EIU/CEACO<br>EIU/CSACI | Two control lines which control holding, loading, incrementing, or decrementing the CSAC in the AEC. Meaningful only when EIU/CS is equal to a one. |
| EIU/CSW | Write contents of AGBUS into CS memory. Meaningful only when EIU/CS is equal to a one. |

The input MUX 185 also receives MCR25, MCR 26, MCR 27 and STCS the latter of which is a STORE INTO CS OP CODE. The output signals from the MUX 185 are MCR25M, MCR26M, MCR27M and an output which is applied to an AND gate 187 along with the clock signal C5 to provide $\overline{CSWRITE}$.

The coefficient store address counter (CSAC) 184 has a 12-bit capacity and is loaded from the 12-bit address register 162. In addition, this pointer register can be incremented or decremented under control of the microinstruction bits MCR26M and MCR28M at clock time C5. The address counter 184 directly addresses a maximum of 4096 16-bit coefficient locations, for example, in the coefficient memory store 160. The control which emanates from the microcommand register is as follows:

| MCR26M | MCR27M | Comment |
| --- | --- | --- |
| 0 | 0 | Hold current contents. |
| 0 | 1 | CSAR + CSAC. |
| 1 | 0 | Decrement CSAC. |
| 1 | 1 | Increment CSAC. |

The coefficient store memory 160 in the illustrated system is mechanized with a mixture of high-speed semiconductor RAM and ROM memories with access being provided in 200 ns. For example, the coefficients may be stored in the ROM and the table addresses may be stored in the RAM. Writing into the RAM under program control is effective only by the decoded STCS command decoded from OP CODE bit MCR00 through MCR07. This instruction writes the contents of the register in the address generator unit 34 that is specified by the address field, into the coefficient store memory 160 at the address specified by the coefficient store address counter 184. Data written into the RAM portion of the coefficient store memory 160 is always written from the AGBUS 31.

The coefficient store output data MUX 182 (CS output data MUX) outputs data CSD00 through CSD15 from one of three sources to the address generator unit 34 at the input MUX 142, the multipliers in the arithmetic element units such as the multiplier 52 in the AE unit 12 and the RALU modules or units such as 54 and 56 in the AE unit 12. The first data source is 16-bits of immediate data from the current instruction, which is MCR20 through MCR35 and the second source is 12-bits of data representing the current coefficient store address counter location CSAC04 through CSAC15. The third source of output data from the module is CS memory data read from the coefficient store memory 160. The control for steering the proper output data from the output MUX 182 are the terms CSS0 and CSS1 which emanates from the OP CODE decoding unit 148 of the address generator unit 34. The coefficient store output MUX 182 normally outputs coefficient store memory data to the multipliers of the arithmetic element units, such as 12. Immediate data is routed through the output MUX 182 to the address generator input MUX 142 when executing instructions referencing immediate data, that is, IAG, AIDA and AIDC. Only a single instruction, AGCC, routes the contents CSAC04 through CSAC15 of the address counter 184 through the output MUX 182 to the address generator input MUX 142.

Figure 8:
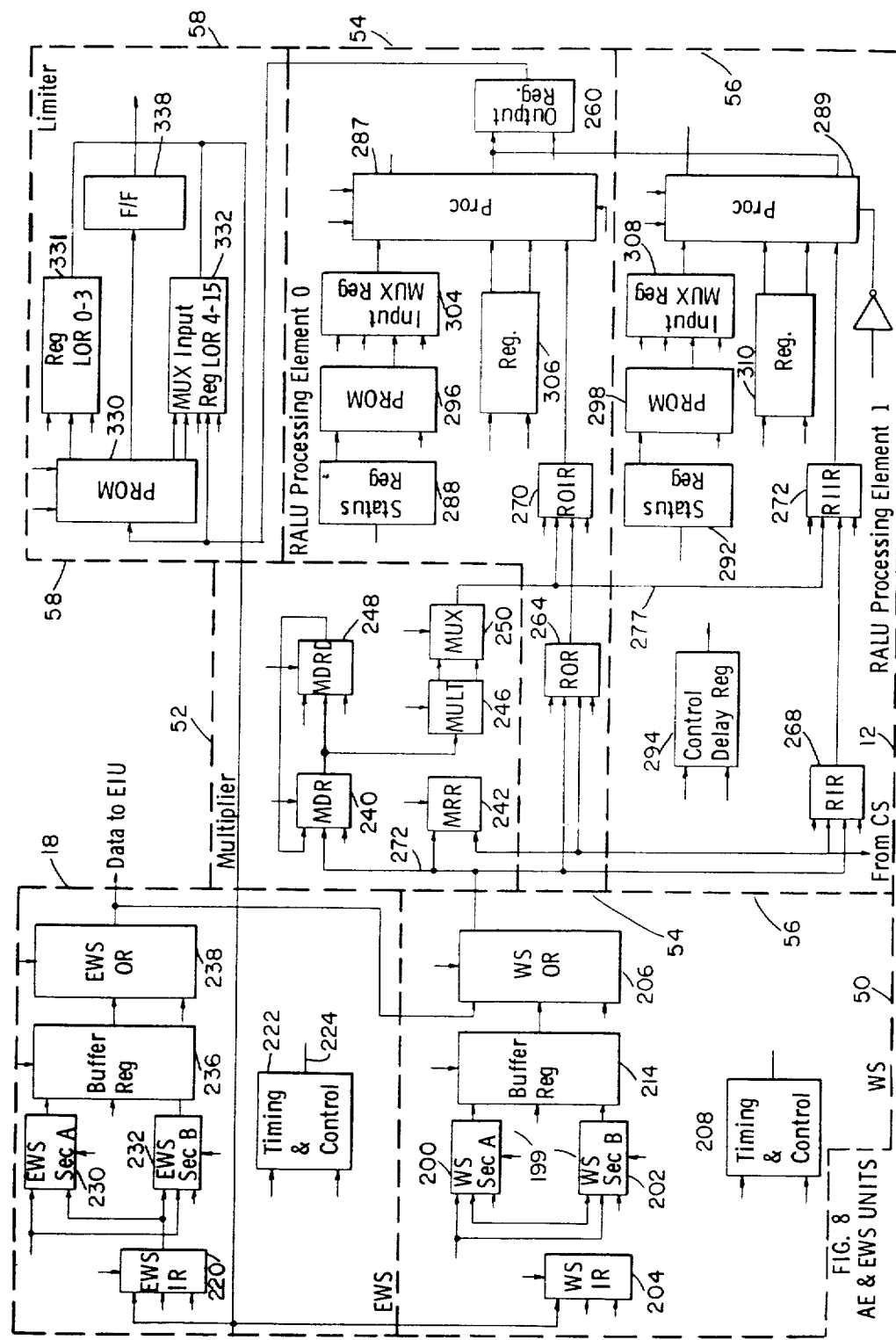
FIG. 8 is a schematic block diagram showing the arithmetic element (AE) unit and extended work store (EWS) unit of FIG. 1.

Referring now to FIG. 8, which is a schematic block diagram of a typical arithmetic element 12, 14 or 16 and a typical respective associated extended work store units such as 18, 20 and 22, as well as referring to FIG. 9 the arithmetic element unit 12 will now be explained. The WS unit 50 minimizes required program accesses to EWS units by providing storage within the arithmetic element unit such as 12 for the intermediate results of various computations. The storage may be configured as a work store memory 199 having work stores 200 and 202 forming respective sections A and B which in the illustrated system, each have a capacity of 4096×16-bit words. Addressing of the work stores 200 and 202 is random access with a read/write cycle of 200 ns. The input terms to the work store unit 50 are as follows:

| | Comment |
|---|---|
| Data Inputs | |
| LOR00/LOR15 | The 16-bit limiter output register 331 data which can be written into a work store input register (WSIR) 204 of the work store unit 50. |
| EWSOR00/EWSOR15 | The 16-bit data word from an external work store output register 238, which can be routed to the work store (WS) output register 206. |
| Address Inputs | |
| WSA04/WSA15 | 12-bit address coming from the work store address MUX 126 in the address generator unit 34. This address specifies one of 4096 locations in work store sections A and B (200 |

| -continued |
|---|
| Comment |
| and 202) to read from or write into. |

The control lines which initiate a read/or write cycle and control the source of data to the work store input register 204 and to the work store output register 206 are as follows:

| Control | Comment |
|---|---|
| MCR17 | Initiate a work store memory cycle. |
| MCR18 | Read or write control. When a "1" a write cycle. When a "0" a read cycle. |

The outputs from the work store unit 50 are WSOR00 through WSOR15 which is a 16-bit word that may also be received from the EWS unit 18 by the work store output register 206 which is a two input MUX register.

A timing and control unit 208 supplies seven timing and control signals to the registers in this WS unit 50 as a function of the cycle initiate (MCR17) and the read/write cycle control (MCR18), the signals being provided to the output leads as follows:

| Signal | Comment |
|---|---|
| LDWIR | Load work store input register. |
| LDBR | Load buffer register with section A or section B output data. |
| SECB | Load buffer register with section B output data. |
| $\overline{CBA}$ | Inverted chip enable to WS section A which clocks address lines into internal chip address registers for section A. |
| $\overline{CBB}$ | Inverted chip enable to WS section B which clock address lines into internal chip address registers. |
| $\overline{WSA}$ | When low write input data into A section of WS from input register. |
| $\overline{WSB}$ | When low write input data into B section of WS from input register. |

The work store input register 204 which stores 16 bits, is loaded from the limiter output register 331 (FIG. 17) for writing into work store 200 (section A) or work store 202 (section B). The work store input register 204 is loaded in response to the decoded term LDWIR from the timing and control unit 208.

The work store memory 199 which is organized with the work store sections 200 and 202 when accessed for either a read or a write cycle always accesses section A and subsequently accesses section B. Data to and from these two work store memory sections 200 and 202 supports the dual beam processing feature of the processor system in accordance with the invention. Thus data words are written in pairs and are read out in a pair relative to the work store memory 199 which in the illustrated system is formed of RAM memory. The two memory sections 200 and 202 may for example, be implemented with MOSTEK 4104 Static M.O.S. RAM memories, each RAM chip being organized as 4096 words of a single bit memory with sixteen RAM chips being utilized for each memory section. The cycle time for these RAMS is approximately 340 ns. The work store address is supplied commonly to both sections A and B and the work store address MUX 126 in the address generator unit 34 supplies the 12-bits of address required to effect addressing 4096 locations of work store section A and subsequently section B. Thus when the programmer codes memory accesses to the work store memory 199 he must do so for two consecutive instructions and clock times. When starting access of a WS memory, 400 ns is required for section A followed by section B being accessed in the following 200 ns, section A being again accessed in another 200 ns and section B being again accessed in another 200 ns. Section A and B are respectively associated with RALU0 and RALU1. It is to be noted that the access timing for the EWS units is the same as discussed above for the WS units. Thus, when accessing the WS units or the EWS units, the starting access requires 400 ns but the subsequent accesses provide 16-bit word each 200 ns. The work store section 200 receives the control term $\overline{WSA}$ and $\overline{CEA}$ and the work store section 202 receives the terms $\overline{WSB}$ and $\overline{CEB}$ all from the timing and control unit 208. The accesses for reads and writes are thus controlled by 2-bits from the microcommand register as follows:

| | Assembler Coding | Comment |
|---|---|---|
| MCR17 | | |
| 0 | WA=0 | No work store memory 199 access. |
| 1 | WA=1 | Work store memory 199 access. Code for two instructions. |
| MCR18 | | |
| 0 | WW=R | Work store reads access when MCR17=1 code for two instruction times. |
| 1 | WW=W | Store two consecutive words from the limiter register 331 into work store sections A then B. Write cycle coded for two instructions. |

A buffer register 214 is provided as a temporary storage register which holds first data from work store section 200 (section A) and subsequently data from work store section 202 (section B) and the control for this register SECB and LDBR1 are provided by the timing and control unit 208.

The work store output register 206 is loaded from two sources, the first being the buffer register 214 and the second being the external work store output register 50 which provides the terms EWSOR00 through EWSOR15. The control for selecting the source for the output register 206 is MCR17 delayed by one clock time to form the signal MCR17D. The microbit MCR17D when a 0 specifies access to EWS unit 18 and when a 1, specifies that the output register 206 can input data from the work store buffer register 214. A clock C5 is applied to the work store output register 206. Data from the extended work store or the work store is supplied to the multiplier 52 and the RALU units 54 and 56 as a pair of words with the first word being received from section A and subsequently the second word being received from section B. The timing diagram of FIG. 10 shows that data from section A is available in the work store output register 206 as shown by a waveform 212 at the end of the second clock time of a waveform 214 of coding a read cycle after memory access of a waveform 216. Section B data is resident in this output register 206 one clock time or 200 ns after section A data as shown by the waveform 212.

Referring now to FIG. 11 which shows the extended work store unit 18 in further detail, as well as referring to FIG. 8, the EWS unit 18 is mechanized similarly to the WS unit 50 with each of the internal registers being of a similar type as those in the WS unit 50. An extended work store input register (EWSIR) 220 which is similar to the work store input register 204 receives limited output data LOR00 through LOR15 from the limiter output register 331 with control being provided by a term LDEWSIR. A timing and control unit 222 provides term on output leads 224 for internal use in that module, the terms being LDEWSIR, LDEWSBR, SECB, $\overline{CEA}$, $\overline{CEB}$, $\overline{WSA}$, $\overline{WSB}$. The input register 220 also receives 16 bits of input data from the EI unit 24 (EXTDAT00 through EXTDAT15). An extended work store memory 228 having extended work store section 230 (section A) and an extended work store section 232 (section B) is organized similar to the work store memory 199. The terms $\overline{WSA}$ and $\overline{WSB}$ control writing into the respective EWS sections 230 and 232 and $\overline{CEA}$ along with $\overline{CEB}$ are enabling terms as previously discussed relative to WS memory 199. A MUX buffer register 236 receiving the term LDBR and SECB is similar to the buffer register 214 and an extended work store output register (EWSOR) 238 is arranged similarly to the work store output register 206. The input terms and signals of the extended work store unit 18 may be summarized as follows:

| Data Inputs | Comments |
|---|---|
| LOR00/LOR15 | These signals are from the limiter output register 131 which is written into the extended work store input register 220 under program control (MCR19D). |
| EXTDAT00/EXTDAT15 | The 16 data lines from the external interface unit. |
| EWSA00/EWSA19 | The twenty data lines from the EWS output MUX 134 in the EIU. |

The four control signals required to initiate read or write memory cycles and control MUX register input selection are as follows:

| Signal | Comments |
|---|---|
| MCR19D | The delayed EWS access control bit pushed back one instruction by the assembler for controlling the extended work store input register 220. |
| MCR19B | MCR19D delayed by one clock time or delayed EWS external read access for controlling the extended work store output register 238. |
| EWSAccss | Composite access by external interface or program MCR19D which is applied to the timing and control unit 222. |
| EWSWrite | Composite access write when = 1 or read when =0. This composite signal is from external interface unit or MCR18 if a programmed write to EWS. |

The output supplied from the EWS unit 18 is as follows:

| Signal | Comment |
|---|---|
| EWSOR00/EWSOR15 | Module output data supplied to WS output register 206 or to the external interface unit. |

Referring now also to FIG. 12 which shows the multiplier unit 52 in further detail, as well as referring to FIG. 8, the multiplier of the AE unit 12 is mechanized as a two stage pipe-lined multiplier with the two arguments to be multiplied being held in a multiplicand register (MDR) 240 and a multiplier register (MRR) 242. These two registers 240 and 242 are loaded under program control in response to respective microinstruction bits MCR30 and MCR28. Each of these two registers 240 and 242 have a capacity of holding 4 hex characters. A multiplier 246 may utilize 16 PROMs to develop 16 partial products for the cross multiplication of all 8 hex characters with these table look-up partial products, then being appropriately summed to produce a 31-bit fractional 2's complement result. However, since the time required to access PROMs, add and provided an output to the RALU0 and RALU1 input registers exceeds 200 ns, the summing operation is performed in two steps in the illustrated system. During the first 200 ns, an intermediate partial product is developed and transferred into two internal holding registers and these two intermediate partial products are then summed during the next 200 ns interval to produce the final result. It should be noted that the mechanization is such that the PROMs are used for only one clock time for each multiply. Therefore, one can load new arguments into this pipe-line every clock time. The product is always available from this multiplier, 2 clock times after loading the last argument into the multiplier or multiplicand registers.

The 16-bit data inputs to the multiplier unit 52 are first from the limiter output register 331 which supplies one (LOR00 through LOR15) of two data inputs to a delayed multiplicand register (MDRD) 248. A second input to this multiplier unit 52 is from the work store output register 206 (WOR00 through WOR15), which supplies data from the work store buffer register 214 or the extended work store koutput register 238 to one of two inputs of the multiplier register 242 or the multiplicand register 240. A third 16-bit data input to multiplier unit 52, is from the coefficient store output MUX 182 which supplies coefficient data (CSD00 through CSD15) to one of two inputs of the multiplier register 242. It is to be understood that the scope of the invention is not limited to the illustrated multiplier arrangement but includes any suitable multipliers.

The 16-bit data output from this module (MUL0-0–MUL15) is a product provided by a product MUX 250 under the control of two multiplier control bits (MCR33 and MCR34) after being delayed. One of three outputs can be selected and outputted from the multiplier unit 52 to the RAL0 and RALU1 input data registers 270 and 272, the three selectable outputs being the 16-bit MSH (most significant half) of a rounded 31-bit product, the 16-bit MSH of a truncated 31-bit product and 16-bit LSH of a 31-bit product whose LSB=0. The control required for the multiplier unit 52 is the 7-bits MCR28 through MCR34.

The 16bit multiplier register 242 holds one input to the table look-up partial product generator multiplier 246 and it is loaded and clocked under the direct control of the microcommand register (MCR29) from one of two sources. A clock C5 and the microcommand instruction provide the term (C5.MCR29). The source of the data input to the multiplier register 242 is specified directly from the microcommand register by the microcommand signal MCR28. It is to be noted that the multiplier register 242 is implemented with a two input MUXed register as well known in the art. The data selection and control of the multiplier register 242 is as follows:

| MCR28 | MCR29 | Comment |
|---|---|---|
| 0 | 0 | Hold previous contents. |
| 0 | 1 | Load MRR 242 from work store output register 206. |
| 1 | 0 | Hold previous contents. |
| 1 | 1 | Load MRR 242 from coefficient store output MUX 182. |

The multiplicand register 240 is a 16-bit register which holds one of the arguments which feeds the table look-up partial products generating PROM of the multiplier 246. This register 240 is loaded and clocked under the control of the bit MCR32 which emanates from the microcommand register, the control being provided by the signal C5.MCR32. The data input to this two input register 240 is from one of two sources, the first being the work store output register 206 which provide the terms WOR00 through WOR15. The second source of data is the "in-module" delayed multiplicand register 248 which provides the terms MDRD00 through MDRD15. The data selection and control of the multiplicand register 240 is as follows with the bit MCR30 controlling data selected and the bit MCR32 clocking the multiplicand register when it is a one.

| MCR30 | MCR32 | Comment |
|---|---|---|
| 0 | 0 | Hold current contents. |
| 0 | 1 | Load MDR 240 from work store store output register 206. |
| 1 | 0 | Hold current contents. |
| 1 | 1 | Load MDR 240 from in module MDRD register 248. |
| Data Select | Clock MDR when a one | |

The delayed multiplicand register 248 is loaded (i.e., clocked) under the control of the same bit (MCR32) which clocks the multiplicand register 240. Thus, every time the multiplicand register 240 is receptive to input data, the delayed multiplicand register 248 also changes its contents. The register 248 is a two input register with data source selection specified by the MCR31 bit from the microcommand register. The delayed register 248 can copy the contents of the multiplicand register 240 when MCR31 is a zero and this copy capability makes the register 248 appear to have delayed multiplicand register data. The control of the delayed multiplicand register 248 is provided by the bit MCR31 controlling data select and the bit MCR32 clocking the register when this microbit is a one.

Because the multiplicand register 240 and the delayed multiplicand register 248 are enabled to be loaded by the same bit (MCR32), a single merged control table explains the control of these registers as follows and is useful for understanding the operation. The bit MCR30 controls data select of the multiplicand register, the bit MCR31 controls data select of the delayed multiplicand register 248 and the bit MCR32 provides the control for both the multiplicand registers 240 and the delayed multiplicand register 248.

| MCR30 | MCR31 | MCR32 | Comment |
|---|---|---|---|
| 0 | 0 | 0 | Hold contents. |
| 0 | 0 | 1 | Load MDR 240 from work store and load MCRD 248 from MDR 240 |
| 0 | 1 | 0 | Hold contents. |
| 0 | 1 | 1 | Load MDR 240 from work store and load MDRD 248 from LOR 331. |
| 1 | 0 | 0 | Hold contents. |
| 1 | 0 | 1 | Exchange contents of MDR 240 and MDRD 248. |
| 1 | 1 | 0 | Hold contents. |
| 1 | 1 | 1 | Load MDR 240 from MDRD 248 and load MDR 248 from from LOR 331. |

The high speed multiplier 246 generates 8-bit partial products from 16 different PROMS and these partial products are then properly summed to produce the answer. Referring now also to FIG. 13, the figure depicts the multiplier register 242 as containing 4 hex characters $ABCD_{16}$ and the multiplicand register 240 containig 4 hex characters $EFGH_{16}$. Implicit in writing a hex word in this way is that each character is multiplied by a hex scale factor as follows:

$$ABCD = A + 2^{-4}B + 2^{-8}C + 2^{-12}D$$

and, $$EFGH = E + 2^{-4}F + 2^{-8}G + 2^{-12}H.$$

When any two hex characters are multiplied, the scaling or position of the results may be carried and the figure shows this scaling by positioning each partial product shifting it 0, 4, 8, 16, 20 or 24 places to the right. The desired answer is obtained by adding all of the 8-bit partial products with the sign bit spread into these locations which contains S. It is to be noted that only the A and E characters are signed and that any character which is multiplied by A or E must carry the sign spread information.

The addition process required to add all partial products and output the result to the RALO and RALU1 input register 270 and 272 exceeds the 200 ns clock time. Thus, the summing of all of the table look-up partial products is performed in two stages or during two clock periods. An intermediate sum is produced during the first 200 ns and stored with pertinent carry save information into internal registers (not shown). The second 200 ns interval generates the last required adds and supplies to the product MUX 250 a 32-bit 2's complement fractional product with the LSB=0. The multiplier and its outputs are controlled by two microcommand bits which specify the following:

| MCR33 | MCR34 | Assembler Coding | Comment |
|---|---|---|---|
| 0 | 0 | MC = R | Output MSH 16-bit rounded product. |
| 0 | 1 | MC = T | Output MSH 16-bit truncated product. |
| 1 | 0 | MC = U | Table look-up function based on MRR. |
| 1 | 1 | MC = L | Output least significant bits unrounded. |

It is to be noted first that MCR34=0 specifies rounding and this action is effected in the table look-up data in the partial products PROMs. The rounding process can be described as adding in a one to the MSB of the least significant half of a 31-bit fractional answer. Thus, a bit is added at $2^{-16}$ to cause the product to be rounded up, which adding is effected in the look-up table when MCR34=0. The multiplier control table also depicts that the multiplier must output the least significant half of the product (LSB=0) only when MCR33 and MCR34 are both ones. In order to control the output or product MUX 250 during the second 200 ns time interval, this state is clocked into a D flip-flop (not shown) so that the delayed state 3 can be applied to the product output MUX 250.

The product output MUX 250 outputs the MSH or the LSH of the multiplier in response to the delayed control state 3 (MCR33, MCR34). When the delayed control state 3 is true, the product MUX outputs the LSH of the product and when the control state 3 is false, outputs the MSH of the product, the 16 output lines being connected to RALO and RALU1 input registers 270 and 272.

Referring now to FIGS. 14 and 15 which show the RALU0 unit 54 and RALU1 unit 56 in further detail, as well as referring to FIG. 8, the RALUs (register and logic unit) are each 16-bit processors and supporting registers with the difference between RALU 54 and RALU 56 being the following two control exceptions.

1. The RALU1 unit has 25 bits of delayed control. In the RALU1 diagram of FIG. 15, all control bits similar to the RALU0 controls are labeled with a "D" as the last character to denote delayed by one instruction clock time.

2. The RALU0 and RALU1 units have their tri-state output buses tied together and output to a RALU output register 260. The control for putting the RALU0 bus on the bus is the inverse for putting the RALU1 unit on the bus (MCR38).

The RALU units 54 and 56 respectively include RALU processor units 287 and 289 which may be AMD 2901A 16-bit processors, which, for example, may be an American Micro device unit.

The data input to the RALU units 54 and 56 are as follows:

| Data Input | Comment |
|---|---|
| WOR00/WOR15 | 16-bit data word from the work store output register 206 on a bus 272. This data can be work store memory 199 or extended work store memory 228 contents. This data is inputted to temporary store registers 264 and 268 (ROR and R1R) in respective RALU |
| CSD00/CSD15 | 16-bit data word from coefficient store output MUX 182 via a coefficient and immediate data bus 277. This data can be coefficient store memory 160 contents or immediate data from the current instruction. Thus, data is inputted to temporary |

| Data Input | Comment |
|---|---|
| | store registers 264 and 268 (ROR and RIR) in respective RALU units 54 and 56. |
| MUL00/MUL15 | 16-bit data from the multiplier unit 52 which is MSH rounded or MSH truncated or LSH with zero in LSB. This data is inputted to the input registers 270 and 272 (ROIR and RIIR) of respective RALU units 54 and 56 on a bus 277. |

The data output from the RALU units 54 and 56 is RAL00 through RAL15 which is 16-bits of data from the RALU output register 260 which outputs only to the limiter units such as 58 of the AE unit 12.

The control for the RALU units 54 and 56 are 26-bits of the programmed instruction which emanate from the microcommand register in the program memory unit 30 with this 26-bit field being subdivided into the following subfields.

| Control | Comment |
|---|---|
| MCR38 | Specifies which of the two RALU units in this AE unit is enabled on a tri-state bus 271 which is clocked into the output register 260. MCR38 = 0 puts the RALU0 unit on the bus. MCR38 = 1 puts the RALU1 unit on the bus 271. |
| MCR39/MCR48, MCR39D/MCR48D | This 10-bit field directly specifies the next 2901A OP CODE and input carry when control bit MCR49 or MCR49D = 0. When MCR49 or MCR49D = 1 then this next OP CODE field is interpreted as an IP instruction. |

The following 3-bit field is utilized to load status indicator registers 288 and 292 of respective RALU units 54 and 56, from one to two sources and to designate the manner in which the OP CODE field is to be interpreted.

| Control | Comment |
|---|---|
| MCR49, MCR49D | This bit specified that the next instruction field (MCR39/MCR48) is to be interpreted as a standard 2901A OP CODE when = 0. When MCR49 or MCR49D = 1 then the next OP CODE field is interpreted as an IP instruction. |
| MCR50, MCR50D | Specifies which of two groups of flags are to be entered into the condition indicator status register 288 and 292 for subsequent data dependent operations by the IP instructions. This term is meaningful only if MCR51 or MCR51D = 1. |
| MCR51, MCR51D | Load the 4 indicator flip-flops of the status registers 288 and 292 from one or two sources when MCR51 or MCR51D = 1. |

The following 4-bit field controls the loading and multiplexing of data into the memory temporary store registers 264 and 268 and the input register 270 and 272 of the two RALU units 54 and 56.

| Control | Comment |
|---|---|
| MCR52, MCR52D | Select coefficient store as input to ROR register 264 and RIR register 268 when = 1. Select work store register 206 as input to ROR register 264 and RIR register 268 when = 0. Meaningful only if load control bit MCR53 = 1. |
| MCR53, MCR53D | Load ROR register 264 and RIR register 268 from one of two sources when = 1. |
| MCR54, MCR54D | Select one of two sources of input data to the RALU input registers 270 and 272. When = 1 select temporary registers 264 and 268. When = 0 select multiplier module output data. Meaningful only when MCR55 = 1. |
| MCR55, MCR55D | Load RALU input data registers 270 and 272 when MCR55 = 1 from one of two sources as designed by MCR54. |

The following 8-bit field designates the two address fields required for the illustrated 2901A RALU implementation.

| Control | Comment |
|---|---|
| MCR56/MCR59, MCR56D/MCR59D | Specifies the A address of one of 16 registers in the register file (not shown) in the precessors 287 and 289. |
| MCR60/MCR63, MCR60D/MCR63D | Specifies the B address of one of the 16 registers in the register file (not shown) in the processors 287 and 289. |

It sould be noted that the data inputs to RALU units 54 and 56 are identical which supports the two beam or channel parallel processing achitecture of the system in accordance with the invention. Data for the two RALU units is time division multiplexed from the work store unit 50 or the external work store unit 18. Data from the multiplier unit 52 is likewise multiplexed since its inputs are the multiplexed input data from work store sections A and B (200 and 202) or from extended work store sections A or B (230 or 232). Thus, because the beam data is automatically multiplexed to the RALU processing units, the controls for processing two beams of alternating data need only to be delayed with respect to one another. This delay is provided in a RALU1 control delay register 294 receiving terms MCR39 through MCR63 and providing delayed terms MCR39D through MCR63D. Thus, in accordance with the principles of the invention a programmer write a code to process a single channel or beam and a second channel or beam of data is automatically processed by the other RALU processing unit.

The dual input status indicator registers 288 and 292 are utilized to hold RALU status information for subsequent data dependent operations under programmed IF instruction control. Four bits of status information are loaded into these registers from a first source in the processor units 287 and 289 which are the arithmetic logic units (ALU) as are well known in the art.

Loading of status information into the indicator flip-flops of the status registers 288 and 292 is controlled by 2-bits of programmable information emanating from the microcommand register. The status information from the first source is:

| Signal | Comment |
|---|---|
| CO | When = 1 specifies an output carry from the (ALU) (not shown) in the processor elements 287 and 289. |
| FEZ | When = 1 specifies that all 16-bits of the ALU are equal to zero. |
| OFLO | When = 1 specifies that overflow/underflow has changed sign bit in the programmed operation. |
| SIGN | When = 1 specifies that the MSB of the ALU output is negative. |

The corresponding bits of information loaded from a second source in the processor elements 287 and 289 are:

| Signal | Comment |
|---|---|
| RAM15 | Tri-state RAM0 output bit which is in a high impedance state except when shifting. When destination specifies shifting, then for right shift, this bit is equal to LSB of ALU output. When left shift, this bit is MSB of an internal register (not shown). |
| Q15 | Tri-state LSB of an internal register input or output. Active only when shifting. When right shift, this signal is the LSB of an internal register and when left shift, this signal is zero. |
| ROR00 (or R1R00) | Sign bit (MSB) or ROR register 264 and R1R register 268. Specifies a negative number in registers 264 and 268 when = 1. |
| R0IR00 (or R1IR00) | Sign bit (MSB) of input register (ROIR) 270 and input register (R1IR) 272, and specifies a negative number when = 1. |

The microcontrol term MCR50 selects the source of indicator data and the microcontrol bit 51 controls loading the indicators when equal to a 1.

| MCR50 | MCR51 | Comment |
|---|---|---|
| 0 | 0 | No change. |
| 0 | 1 | Load indicators with CO, FEZ, OFLO, SIGN. |
| 1 | 0 | No change. |
| 1 | 1 | Load indicators with RAM15, Q15, ROR00 (or R1R00), R0IR00 (or R1IR00). |

The status registers 288 and 292 provide their outputs respectively to IF table OP CODE PROMs 296 and 298 which translate conditional OP CODES as specified by the next 5-bit conditional OP CODE field MCR43 through MCR47 and one of the four indicators into one of two output operations. These table PROMS 296 and 298 thus output eight of the ten bits required to specify the next instruction for the illustrated 2901A processor and are applied to an instruction register (not shown) in the processors. Two of the required instruction bits (I6,I7) do not require modification to effect the desired data dependent conditional operations. The bit MCR49 is utilized to specify whether a next instruction in the processor is a conditional operation. As is well known in the art, 27 data dependent operations may be provided by the illustrated processor and defined by the microcode bits MCR42 through MCR49 summarized in the portion of Table 1 entitled CONDITIONAL AE RALU OPERATIONS.

The symbols of this table are as follows for ease o reading:

FO=ALU sign (MSB) is equal to 1 for a negative number.
Z=Zero
P=pass
2SC=2ϵ complement
1SC=1ϵ complement
INC=increment
DEC=decrement
A=add
S=subtract
S−1=subtract−1
OR=logical OR
PA=pass A
PB=pass B
A and B are addresses of a register file in the AML 2901A unit
RS=right shift
RSA=right shift A
LSA=left shift A
DEC=decrement
ROR0=sign bit in R0 register in RALU
ROIR0=sign bit of RALU input register
FEQ0=RALU outputs are all equal to zero
CO=output carry from 2901A
R1=source register address in 2901A
OP=operation
S2=the destination address of the source register ii 2901A.
DEST=any of stated registers
RBJ=shift right
LBJ=shift left The table is composed of 5 major columns.

The first column labeled Microcode Bits specifie those bits inserted into MCR42 through MCR49 fo each of the conditional operations. These bits are set fo each of the 27 conditional operations by the assemble conditional OP CODE directive which is coded by the user in the column marked field. For example, the con ditional operation, FIXP, Bj coded by the user, direct the assembler to assemble the 8-bits listed in the micro code bit field for this specific conditional operation.

The second column labeled operation is a shorthan notation of the operation. For example, FO=1: Z/1 states "IF" the FO indicator flip-flop is equal to one then zero the specified destination. However, "IF" th FO indicator is equal to zero, then pass the contents o the register specified by the B address field to the desti nation.

This shorthand notation is described more fully in th column(s) labeled description.

The alternate condition column specifies what the I1 condition is when the indicators have been loaded fron the alternate source. Recall that the four indicator flip flops can be loaded from one of two sources with th following correspondence between the four flip-flo indicator groups.

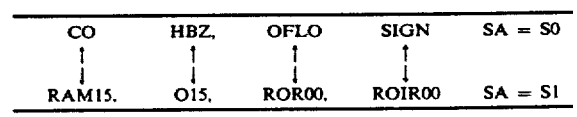

Thus, it can be seen that each of the 27 conditional operations applies to the group of flags that have been set into the four indicators.

As is characteristic of these illustrated processors, when the indicators have been loaded from the alternate source different group of the 27 conditional operations is performed. The PROM Table units 296 and 298 may be implemented with 512 addressable 8-bit word, 4-bits of address being supplied by the four indicator flip-flop outputs from status registers 288 and 292, CON0 through CON3 and 5-bits of address are supplied by the next conditional data dependent operation field MCR43 through MCR47. Each of the 27 data dependent operations is a function of only one of the four indicator flip-flops. However, MCR43 through MCR47 addresses 16 different address in the PROM table units 296 and 298 includes a table which corresponds to the 24 different indicator address inputs. Half or 8 of these 16 locations are coded to output 8-bits of OP CODE for the specified indicator being equal to zero. The other 8 locations are coded to translate to 8-bits of next instruction when the specified indicator is equal to a one. In this manner, 8-bits of next instruction OP CODE is output for the specified indicator equal to zero, or 8 different bits of OP CODE are output for the specified indicator equal to a one. This look-up process is utilized to affect the IF instruction mechanization for the next conditional operation to be executed. The 27 instructions coded for 16 different locations in each of these Tables 296 and 298 requires 27×16 or 432 words, the remaining 80 words not being utilized in the illustrated system. The instruction register 300 includes a two input MUX register 304 and a register 306 in the RALU unit 54 and the instruction register 301 includes a two input MUX register 308 and a register 310 in the RALU unit 56. The instruction registers 300 and 301 hold the current instruction being executed in the respective processor elements 287 and 289 and each holds nine instruction bits and input carry (CIN) required for the standard instruction set of the illustrated processor. The instruction changes every 200 ns and the next instruction is entered into this register from one of the two next instruction sources.

The conditional OP CODE of the illustrated processor element having been previously explained being conditional by the bit MCR49 being a one. The nonconditional OP CODE with MCR49 being a zero as specified by the program memory is summarized in the portion of Table 1 entitled AE RALU OP CODES (NON-CONDITIONAL).

It is to be noted that for those operations which are not conditional operations, the next instruction is taken directly from the microcommand register bits MCR39 through MCR48 and the next instruction is specified as being sourced from the microcommand register by bit MCR49. Thus, the bit MCR49 is made equal to zero from any assembled nonconditional OP CODE.

For conditional or data dependent operation of the processor element, 8-bits of the next instruction is sourced from the IF Table look-up OP CODE PROM 296 and 298 and 2-bits of the 10-bit instruction are taken directly from the microcommand register (MCR40 and MCR41). For any conditional OP CODE, the control bit MCR49 is set equal to 1. Referring now also to FIG. 16, 11-bit field (MCR39 through MCR49) specifies control. The early look at this 11-bit field is accommodated by the program assembler. When a RALU instruction is being assembled, this 11-bit field is pushed back into the previous instruction so that a conditional operation is properly correlated with the indicator outputs from the status registers 288 and 292. A waveform 312 indicates the current instruction with the indicators being changed as a result of executing the first instruction as shown by a waveform 314. As shown by a waveform 316, the next conditional instruction after the indicators change is derived from the new data and the third instruction so that the next conditional instruction is executed during a clock period 318. It is to be noted as shown during clock period 320 that if the second instruction is conditional, it is a function of the old indicators. When executing the second instruction during a clock period 321, the new indicator contents are used and the next (conditional) instruction is a function of new indicators and the third instruction. It can thus be seen that the first conditional instruction based on the new indicator contents can be executed two clock times after changing the indicators.

The memory temporary store registers 264 and 268 are utilized as temporary storage registers to hold data from one of two memory sources (WOR00 through WOR15 or CSD00 through CSD15). Those registers are controlled by 2-bit field (MCR52 and MCR53) derived from the microcommand register to provide the control as follows:

| MCR52 | MCR53 | Comment |
| --- | --- | --- |
| 0 | 0 | Hold current contents. |
| 0 | 1 | Load registers 264 and 268 from work store unit 50 and extended work store unit 18 by receiving the data from work store output register 206. |
| 1 | 0 | Hold current contents. |
| 1 | 1 | Load registers 264 and 268 with data from coefficient store output data MUX 182. Can be CS memory or immediate data. |

It can thus be seen that the bit MCR52 selects the coefficient store memory when equal to 1 and the bit MCR53 loads the registers 264 and 268 when equal to 1.

It is to be understood that the processing elements 287 and 289 can be any suitable register and arithmetic logic unit suitable for performing the functions indicated in Table 5. As previously discussed the illustrated system utilizes a 16-bit processor which is implemented with four 2901A, bit slice microprocessor elements with a fast carry look-ahead unit S182 being utilized to effect 16-bit arithmetic in a 200 ns microinstruction clock time. The 9-bit instruction and the input carry CIN are applied to the processor elements 287 and 298 from the instruction registers 300 and 301. As this type of processor has a two port register file, two 4-bit fields specify the A and B addresses for the two register ports, with the A field being specified by MCP56 through MCR59 and the B field being specified by MCR60 through MCR63. The input data (ROIR00 through ROIR15) is supplied to the processing element from input data registers 270 and 272. The output bus 271 which may be a tri-state bus is controlled by a single microcommand MCR38 which, when a zero, outputs the data from processing unit 287 to the bus and when a one outputs the data from processing unit 289 to the bus. The four status outputs from the arithmetic logic unit in the processing elements 287 and 289 are outputted to the status indicator registers 288 and 292 in their respective units 54 and 56. These flags can be set into the indicator and subsequently, data dependent operations as a function of the indicator, can be effected. Four status outputs are:

| Signal | Comment |
|---|---|
| CO | Carry out of ALU when = 1. |
| FEZ | All 16 ALU outputs equal zero, i.e., F = zero when FEZ = 1. |
| OFLO | The ALU has overflowed/underflowed into the ALU SIGN position. |
| SIGN | The ALU MSB output which when equal to one specifies a negative number. |

These status signals indicate the condition of the arithmetic logic unit (not shown) that is incorporated in these types of processor elements.

The output register 260 receives data output from the processor elements 287 or 289 each 200 ns instruction time. The data in this register changes every clock time with the data source being the bus 271. The output register 260 which is a 16-bit register supplies inputs (RALO00 through RALO15) to the limiters throughout the system such as the limiter 58.

The input registers 270 and 272 hold 16-bits of data (R1IRO00 through R1IR16 and R0IR00 through R0IR15) the input data lines of the processing elements 287 and 289. These registers can be loaded from one of two sources under the control of microbits MCR54 and MCR55 to receive data from either the register 264 and 268 of the respective processing units 54 and 56 or data MUL00 through MUL15 through the bus 277 from the output MUX 250 at the output of the multiplier 246. The control for this register is summarized as follows with the bit MCR54 selecting the temporary storage register 264 and 268 when equal to one and the bit MCR55 when equal to one loading the input registers.

| MCR54 | MCR55 | Comment |
|---|---|---|
| 0 | 0 | Hold current contents. |
| 0 | 1 | Load output of multiplier unit 52 into the registers 270 and 272. |
| 1 | 0 | Hold current contents. |
| 1 | 1 | Load temporary store registers 264 and 268 into respective input registers 270 and 272. |

Referring now to FIG. 17 which shows the limiter unit 58 in further detail as well as referring to FIG. 8, the limiter is the last element in the processing pipe-line of each of the arithmetic elements. The function of the limiter 58 is to hard limit the output data from the RALU processing units 54 and 56 to one of four possible limit values as directed by two control bits emanating from the microcommand register. The data inputs to this unit are the 16-bit word from the output register 260 which is applied to both a mapping PROM 330 and a limiter output register (LOR) 331. The limiter output register 331 includes a MUX two input register 332 and the four input register 336 to jointly form a 16-bit register which supplies data to three other modules, the work store input register 204, the extended work store input register 220 and the multiplicand delayed register 248. An additional output from the limiter unit 58 is from an overflow flip-flop 338 which provides a signal AEOVR which can be tested in the address generator unit by loading it into the AG flag flip-flop. The control for the limiter unit 58 is 2-bits of directive from the microcommand register.

| MCR35 | MCR36 | Comment |
|---|---|---|
| 0 | 0 | Pass RALU processing units. Output data with no limiting but output a 1 in the overflow indicator if the two MSBs are different. |
| 0 | 1 | Output ½ scale limiting of input data from RALU processing units and set AEOVR indicator to 1 if two MSBs are different. |
| 1 | 0 | Output ¼ scale limiting of input data from RALU processing units and set AEOVR indicator to 1 if 3 MSBs are different. |
| 1 | 1 | Output ⅛ scale limiting and set AEOVR indicator if 4 MSBs are different. |

The mapping PROM 330 which is a high speed unit is utilized to map the three MSBs (excluding SIGN) into the limiter output register 336. As a function of the four MSBs of the output register 260 and the two microcommand bits MCR35 and MCR36, processor units output bits 01 through 03 are mapped to the limiter output register 336. In addition, three other bits OFLO, LIMITED and data bits 01, to 03 are outputted from the mapping PROM 330. The bit OFLO specifies that two MSB are different for full scale or that overflow exists for half, quarter or eighth range scaling as a function of MCR35, MCR36 and the input data. The LIMITED signal specifies the input number exceeds the half, quarter or eighth range scaling as a function of MCR35 and MCR36. In this case, the data bit output from the mapping PROM 330 is a zero or a one to be supplied to input bits 4 through 14 of the limiter output register 332.

The overflow indicator flip-flop 338 is loaded every clock time from the mapping PROM 330 with the term OFLO. In a program control the output of this flip-flop AEOVR can be tested in the address generator.

The limiter output register 331 (LOR00 through LOR15) is divided into two sections, the first being the register 336 which receives the high order 4-bits and receives a SIGN and three mapped PROM bits every clock time (LOR00 through LOR04). The second section is the register 332 which contains the 12 low order bits and if the limiter output bit from the PROM is a zero (data not limited) then the contents of the output register 260 (RALO04 through RALO15) replaces the contents of the register 332. If the input number equals or exceeds the limited range specified by MCR35 and MCR36 then second input to the register 332 is utilized. If MCR35 is a one, a one is loaded into the LSB the PROM data bit output (zero or one). This MCR35 also specifies loading into bits LOR04 through LOR14.

Table 6 is an input and output summary for showing the output data from the limiter output register 331 and the state of the overflow flip-flop 338 for each of the operations.

TABLE 6

LIMITER INPUT/OUTPUT SUMMARY

| MCR35 | MCR36 | Operation | RALU Input Data | LØR Output Data | Indicator AEØR |
|---|---|---|---|---|---|
| 0 | 0 | No Limiting | 0 0 X X | Pass Input Data | 0 |
|   |   |   | 0 1 X X | Pass Input Data | 1 |
|   |   |   | 1 0 X X | Pass Input Data | 1 |

TABLE 6-continued

LIMITER INPUT/OUTPUT SUMMARY

| | | | | | |
|---|---|---|---|---|---|
| | | 1 1 X X | Pass Input Data | 0 | |
| 0 | 1 ↕ Scale Limiting | 0 0 X X | Pass Input Data | 0 | |
| | | 0 1 X X | 0 0 1 . . . 1 1 | 1 | |
| | | 1 0 X X | 1 1 0 . . . 0 1 | 1 | |
| | | 1 1 X X | Pass Input Data | 0 | |
| 1 | 0 ↕ Scale Limiting | 0 0 0 X X | Pass Input Data | 0 | |
| | | 0 0 1 X X | 0 0 0 1 . . . 1 1 | 1 | |
| | | . | | | |
| | | 0 1 1 X X | 0 0 0 1 . . . 1 1 | 1 | |
| | | 1 0 0 X X | 1 1 1 0 . . . 0 1 | 1 | |
| | | . | | | |
| | | 1 1 0 X X | 1 1 1 0 . . . 0 1 | 1 | |
| | | 1 1 1 X X | Pass Input Data | 0 | |
| 1 | 1 ↕ Scale Limiting | 0 0 0 0 X | Pass Input Data | 0 | |
| | | 0 0 0 1 X | 0 0 0 0 1 . . . 1 1 | 1 | |
| | | . | | | |
| | | 0 1 1 1 X | 0 0 0 0 1 . . . 1 1 | 1 | |
| | | 1 0 0 0 X | 1 1 1 1 0 . . . 0 1 | 1 | |
| | | . | | | |
| | | 1 1 1 0 X | 1 1 1 1 0 . . . 0 1 | 1 | |
| | | 1 1 1 1 X | Pass Input Data | 0 | |

Note:
When |Input| > Limit, packed limited Data to LØR is from sources shown

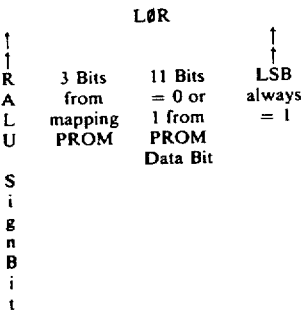

The multiplier RALU arrangement of the invention allows twice the number (or more if more than 2 RALUS are provided) of arithmetic operands to be performed as the multiplier operations that are performed, and allows the control signals and addresses to be developed only once or in common for the two RALU units. The RALU units may each typically require two or more clock times to perform their computations so that the limiter receives results at a rate no greater than the clock rate in the illustrated example.

Figure 18:
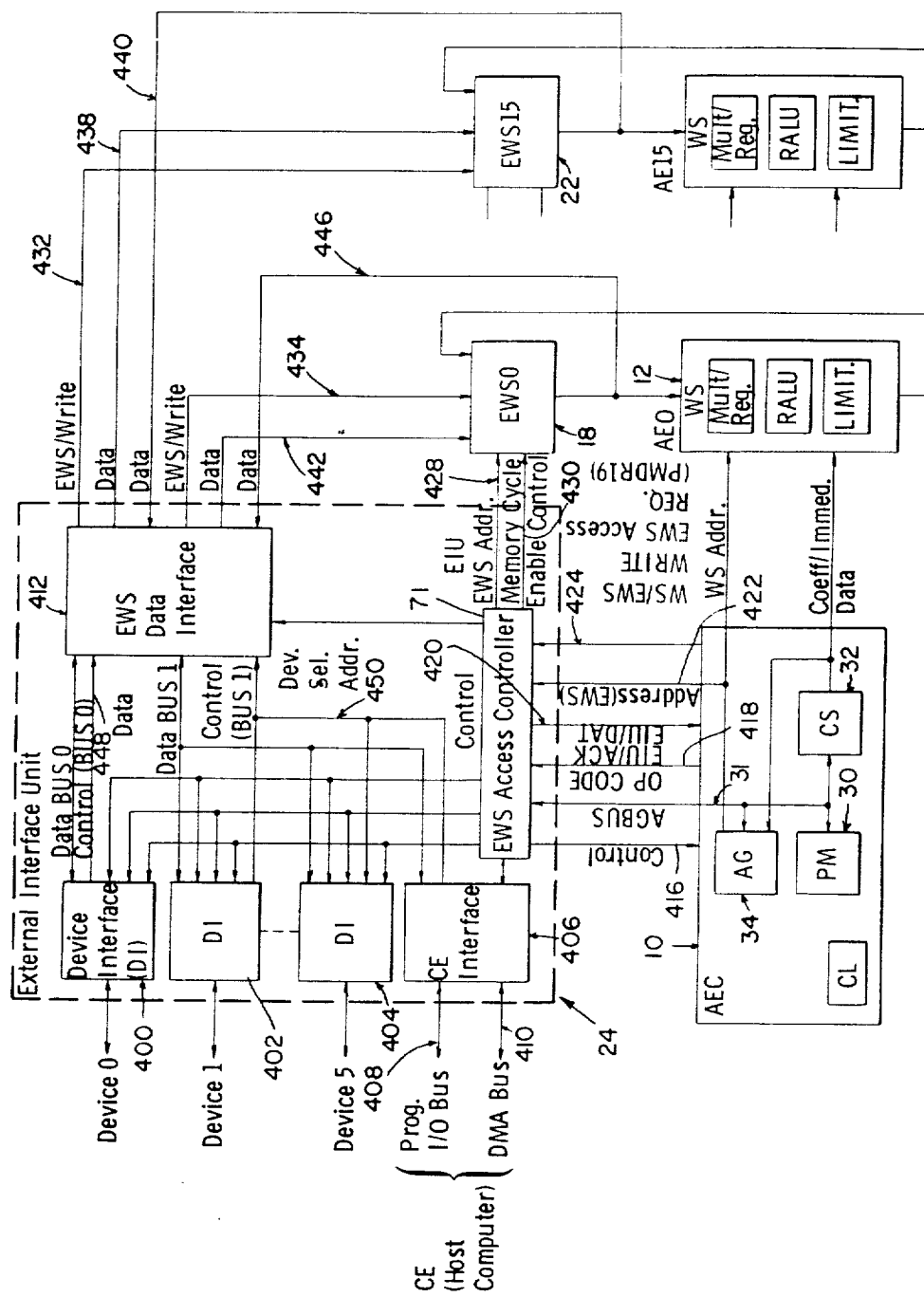
FIG. 18 is a schematic block diagram for further explaining the external interface unit of FIG. 1.

Referring now to FIG. 18 the external interface unit 24 will be explained in further detail. The external interface (EI) unit 24 allows multiple external devices, the control element (CE) 48 (FIG. 1) and the arithmetic element controller unit 10 to access the extended work store units such as 18 and 22. The multiple external devices which are devices 0 through 5 such as 62, 63 and 65 of FIG. 1 are each coupled to a device interface (DI) such as 400, 402 and 404. The CE is coupled to a CE interface 406 through a programmed input/output bus 408 and a DMA (direct memory access) bus 410. An extended work store data interface (EWSDI) unit 412 is coupled between the device interfaces such as 400, 402 and 404 and the CE interface 406, to the EWS units such as 18 and 22. The extended work store access controller (EWSAC) unit 71 responds to various commands from the CE and the AEC unit 10 to initiate data transfers involving the CE's memory, the AEC's program memory 30 or coefficient store 32, external devices and the EWS units such is 18 and 22. The extended work store access controller unit 71 is coupled to the AEC unit 10 by control leads 416, the AGBUS 31, and OP CODE bus 418, a bus 420 which transfers control signals EIU/ACK and EIU/DAT to the controller 10, an (EWS) ADDRESS bus 422 and a control lead 424 for passing signals WS or EWS (MCR18) and EWS ACCESS REQ (PMDR19) from the controller 10 to the EWS access controller 71. The EWS ACCESS controller 71 has a principal function of providing addresses through an EWS ADDR bus 428 to the EWS units such as 18 and 22 and providing a control signal MEMORY CYCLE ENABLE CONTROL through a lead 430 to the extended work store units. It is to be noted that the same address and the same control signals are applied to each of the extended work store units such as 18 and 22.

The EWS data interface unit 412 provides a control signal EWS WRITE through a composite lead 432 to an EWS unit such as 22 and a similar signal EWS WRITE through a composite lead 434 to an EWS unit such as 18. Sixteen-bits of data are transferred from the EWS data interface unit 412 to the EWS unit 22 through a 16-bit data bus 438 and data is transferred from the EWS unit 22 to the data interface 412 through a 16-bit bus 440. Data is transferred in a similar manner from the extended work store data interface unit 412 to each extended work store unit such as 18 through a 16-bit data bus such as 442 and receives data from EWS unit 18 through a 16-bit data bus such as 446. Thus, each EWS unit is coupled to the EWS data interface unit 412 through two data buses and with individual control leads. The device interface unit 400 is coupled to the EWS data interface unit 412 through a DATA BUS0 having sixteen leads and a CONTROL (BUS0) bus 448 having six leads therein. The other device interfaces such as 402 and 404 and the CE interface 406 are coupled through the EWS data interface unit 412 through a sixteen lead DATA BUS1 and a CONTROL (BUS1) bus 450. Data is transferred between the EWS access controller unit 71 and the CE interface 406 and the device interfaces such as 400, 402 and 404 along with control signals DEV SEL ADDR and CONTROL.

External devices need to either store unprocessed data into the extended work store units or read processed data from the extended work store units. In addition the CE unit can request that data be transferred between its memory and the extended work store units, the arithmetic element controllers program memory 30 or coefficient store 32 through the DMA bus 410. Also the AEC unit 10 can request data transfers between the memory in the CE unit and the extended work store units, between the extended work store units, between the memory in the CE unit and the coefficient store 32 or program memory 30 and between the EWS units such as 18 and 22 and the coefficient store memory 32 or the program memory 30. The external interface unit 24 also refreshes the extended work store units in the illustrated systems whenever they are implemented with 16K dynamic instead of 4K static RAMS. Table 7 summarizes the data transfer capabilities of the illustrated system.

TABLE 7

DATA TRANSFER CAPABILITIES

| To: | External Device | CE Memory (PIO Bus) | CE Memory (DMA Bus) | EWS | AEC PM | AEC CS |
|---|---|---|---|---|---|---|
| From: | | | | | | |
| External Device | | | | AEC | | |
| CE Memory (PIO Bus) | | | | CE[3] | CE[1] | CE[1] |
| CE Memory (DMA Bus) | | | | CE; AEC | CE[1]; AEC[1] | CE[1]; AEC[2] |
| EWS | AEC | CE; AEC | | AEC | CE[1]; AEC[1] | CE[1]; AEC[2] |
| AEC PM | | CE[1] | | | | |
| AEC CS | | CE[1] | CE[1]; AEC[2] | CE[1]; AEC[2] | | |
| AEC Registers | | CE[1] | | | | |

LEGEND
CE . . . CE Command Initiates Data Transfer
AEC . . . AEC Command to EIU Initiates Data Transfer
NOTES:
[1]Concurrent AEC Program Execution Not Allowed.
[2]Data Transfer Requires either an AEC Utility Program or transfer is performed entirely by EIU.

Figure 19:
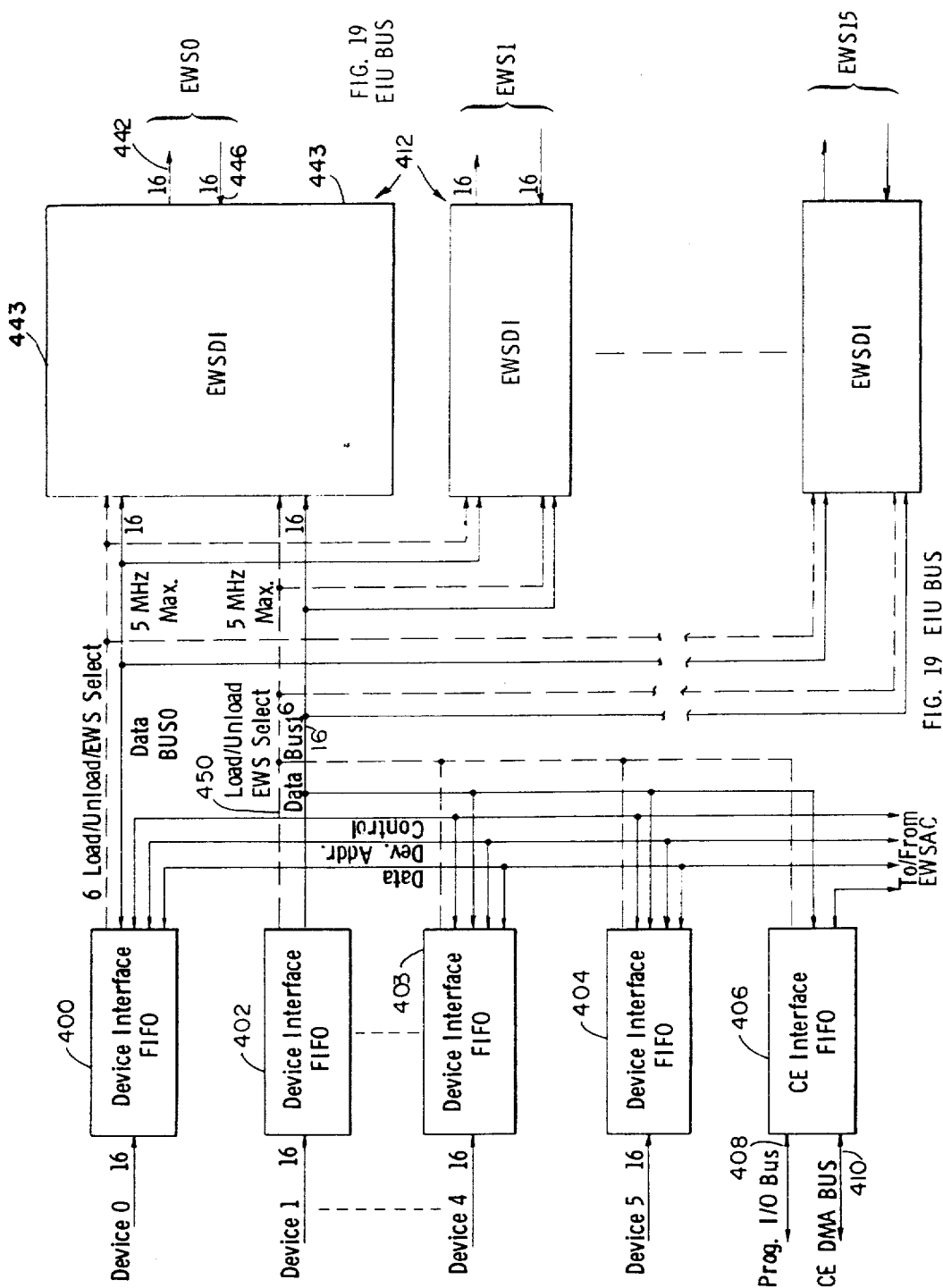
FIG. 19 is a schematic block diagram of the external interface unit bus structure.
Figure 20:
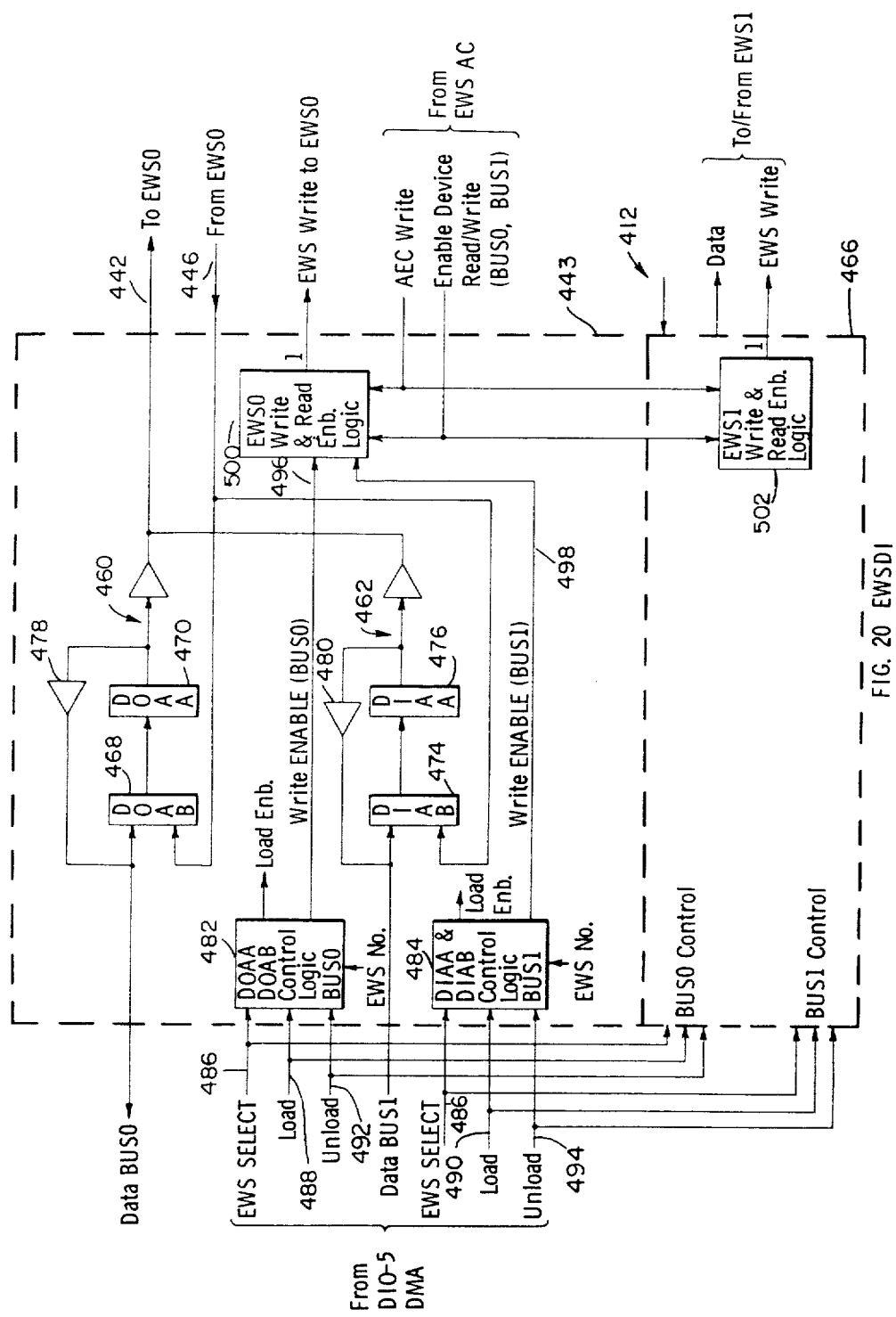
FIG. 20 is a schematic block diagram of the EWS data interface (EWSDI) unit of FIG. 19.

Referring now to FIGS. 19 and 20 EWS data interface units 412 includes, for each extended work store unit, storage units 460 and 462 in an EWS data interface unit 443 shown in detail in FIG. 20 which provide bidirectional transfer of data from the buses 442 and 446 to DATA BUS0 and DATA BUS1. The extended work store data interface units thus provide the capability to simultaneously transfer two words into or out of each extended work store unit by the data bus structure and the two word storage capability of the units 460 and 462. Data is transferred between a device interface or the CE interface and the EWS data interface units such as 443 in two N-word blocks where N equals the number of extended work store units such as 16. The data rate across the data bus in the illustrated system is 5 MHz. First in, first out (FIFO) units such as 400, 402, 403 and 404 are provided in each device interface and are provided in the CE interface such as FIFO unit 406 to insure that two N-words blocks of data can be supplied or accepted. The device or the CE unit selects BUS0 (high speed bus) or BUS1 and selects the EWS units for writing into the EWS unit or reading data therefrom. For writing into the EWS unit, each EWS unit is selected by the device and for reading from the EWS units data is read from all EWS units into the storage units such as 460 and 462, and then selectively transferred to the devices.

Referring now principally to FIG. 20, the extended work store data interface unit 412 will be explained in further detail including the section 443 for the EWS unit 18, a section 446 for a second extended work store unit EWS1 (not shown) and fourteen identical units (not shown) for extended work store units EWS2 through EWS15. The sections such as 443 include the storage units 460 and 462 for respective data buses BUS0 and BUS1, each of the 16 sections in the illustrated system being similar. The storage unit 460 includes the DOAB register 468 which in turn is coupled to the DOAA register 470 and through a suitable buffer to the bus 442 for transferring data to the extended work store unit 22 (EWS15). Data received on the bus 446 is provided as an input to the register 468 and in turn to the register 470 for transfer through a buffer 478 to DATA BUS1. The storage unit 462 includes DIAB and DIAA storage registers 474 and 476. The register 474 is coupled from DATA BUS 1 for applying data to the register 476 which in turn is coupled through an amplifier to the bus 442. Data received on the bus 446 is applied to the register 474 and then to the register 476 from transfer through a buffer 480 to the DATA BUS1. Thus, the DATA BUS1 is coupled as a second input to the register 474. It is to be noted that the registers 470 and 476 receive data from the A portion of the memory of the EWS unit 18 and registers 468 and 474 store data from the B portion of the memory of the EWS unit 18.

BUS0 has a DOAA and DOAB control logic unit 482 and BUS1 has a DIAA and DIAB control logic unit 484. Each of the units 482 and 484 receive an EWS SELECT signal on a bus 486 which has four leads so that each of the storage units 460 or 462 corresponding to each extended work store unit may be selected such as 0000 selecting the storage 460 or 462 for the extended work store unit 18. A LOAD signal is provided on each of buses 488 and 490 to their respective logic units 482 and 484 for developing the signal WRITE ENABLE on leads 496 and 498 for respective buses 0 and 1. The device thus selects the EWS unit for writing data therein. An UNLOAD signal is provided on respective buses 492 and 494 to logic units 482 and 484 for routing data to the device interface when reading data from the extended work store units. All of these signals are from the external device or the CE interface and data is transferred therefrom or thereto through DATA BUS0 or DATA BUS1. Each of the control logic units 482 and 484 receive a signal EWS NO. which may be a hard wired 4-bit number for comparing with EWS SELECT. Each control logic unit 482 and 484 provides a LOAD ENB signal for controlling the operation of writing data into the EWS unit memories. The WRITE ENABLE signals are applied through the leads 496 and 498 to a EWS0 WRITE and READ ENBL logic unit 500 which in turn provides an EWS WRITE signal to the EWS unit 18.

A signal AEC WRITE, and an ENABLE DEVICE READ/WRITE (BUS0, BUS1) signal is received from the EWS access controller 414 and applied to the read enable logic unit 500 as well as to other units throughout the interface such as a read enable logic unit 502. The signal AEC write is limited to writing into the EWS units. The ENABLE DEVICE signal only occurs when the AEC unit 10 does not have control of the EWS units.

Thus, it can be seen that two clock periods are required to write into the EWS units data from the storage units such as 460 and 462 after being received from the devices or the CE interface units. For transferring data from the device interface or the CE interface into an extended work store memory the data is written serially into the sections such as 443 and 466 and then transferred into the EWS unit under control of the EWS access controller. The data stored in the EWS data interface units such as in storage units 460 and 462 is written in parallel into the EWS memories in 2 clock times under control of the EWS access controller. It is to be noted that only when data is written (in response to EWS SELECT and LOAD ENB) into the storage units corresponding to an EWS unit, is data transferred to the corresponding EWS during the parallel transfer into the EWS memories. For transfer of data to the devices or the CE interface, from the EWS units, each EWS is read in two clock times into the storage unit such as 460 and 462, 16 EWS units being read in parallel. The EWS data interfaces such as 443 are then selected or sequentially selected (selection being by EWS SELECT) so that 16 times as long a period, in the case of 16 EWS units, is required to read out the data from the EWS data interface unit as is required to read data from the extended work store units therein.

Figure 21:
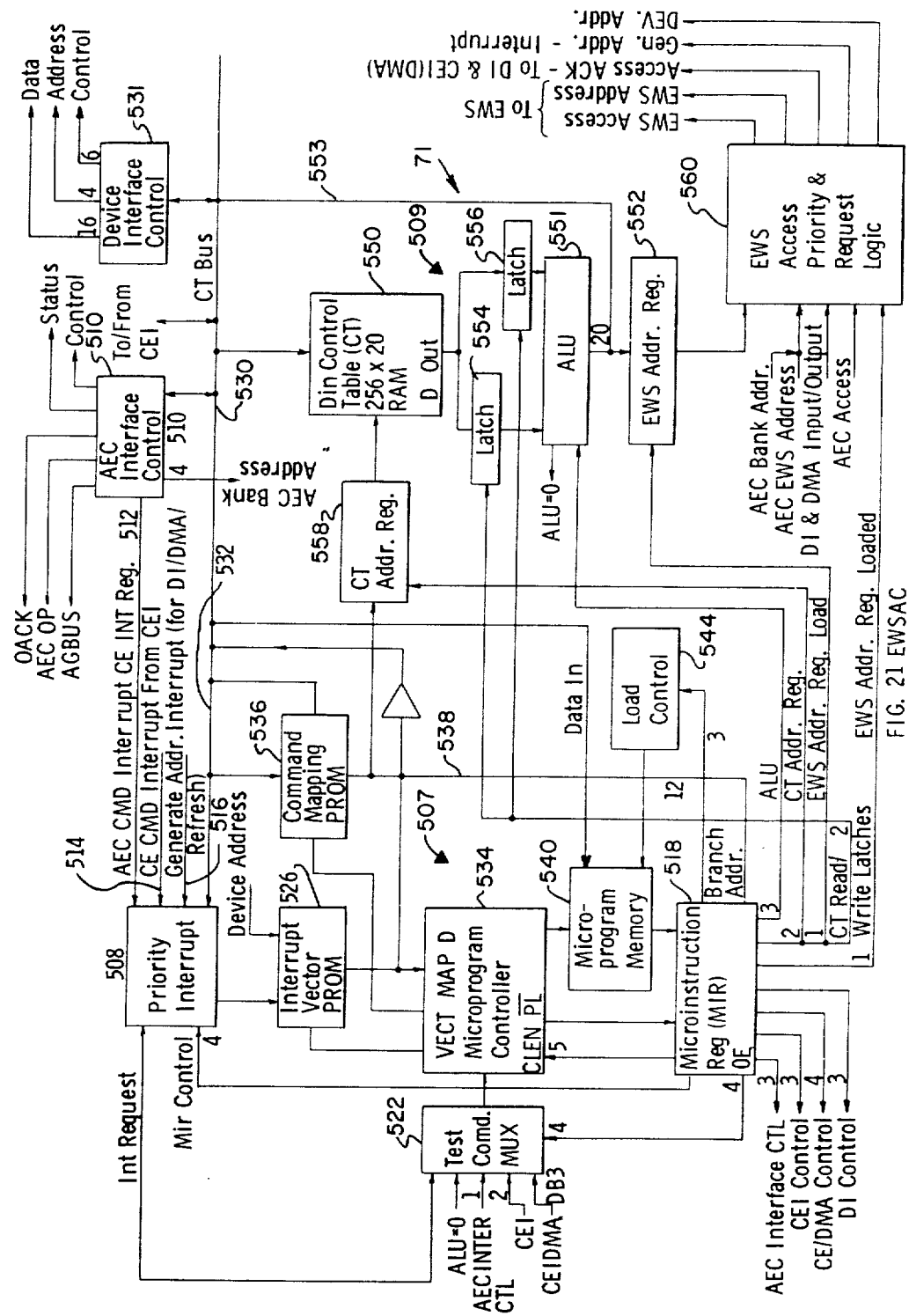
FIG. 21 is a schematic block diagram of the EWS access controller (EWSAC) of FIG. 18.

Referring now to FIG. 21 the extended work store access controller 71 is a microprogrammable unit that responds to various commands from the CE (typically a general-purpose computer) and the AEC unit 10 to initiate data transfer where the data sources and sinks are the memory in the CE, the program memory 30 or coefficient store 32 in the arithmetic element controller 10, external devices and the EWS units such as 18 and 22. Upon receiving a command, the EWS access controller 71 initializes the appropriate units such as a device interface or the DMA logic in the CE interface 406 (FIG. 18) and responds to extended work store access requests from these units. Extended work store access requests from the device interface, the DMA logic and the AEC unit 10 are serviced with the access controller 71 supplying a 20-bit address and the appropriate access control signals to the extended work store units. Extended work store access controller 71 generates the appropriate extended work store addresses for data transfers that involve a device interface or the DMA logic. AEC unit 10 supplies its own extended work store address whenever an executing program needs to access data in the extended work store units. The EWS access controller 71 also generates the appropriate extended work store addresses to refresh the dynamic RAMS if they are used in the extended work store implementation. The access controller 71 is generally composed of five areas: a microprogram control unit 507, an address generation unit 509, an extended work store access logic unit 560, an arithmetic element controller interface control 510, and a device interface control 531.

The EWS access controller 71 is interrupt driven by a priority interrupt unit 508 which includes an Advanced Micro Devices, Inc. 2914 unit as is well known in the art, and that is microprogrammed to perform in the illustrated system. Sources for providing interrupts include the AEC 10 which provides an interrupt AEC CMD INTERRUPT CE INT REQ from an AEC interface control unit 510 through a bus 512 to the priority interrupt unit 508. A second source of interrupt is the CE which provides a signal CE CMD INTERRUPT FROM CEI on a lead 514. A signal GENERATE ADDR INTERRUPT for a device interface, DMA logic, or refresh access of EWS is provided on a lead 516. The priority interrupt unit 508 receives four control bits MIR CONTROL from a microinstruction register 518, applies an INT REQUEST to a test condition MUX 522 and applies three bits through a composite lead 524 to an interrupt vector PROM 526. The priority interrupt unit 508 also receives 8-bits from a CT bus 530 and through leads 532 for interrupt masking, i.e., enabling selected interrupts. The interrupt vector PROM 526 receives a device address which indicates the device or the DMA logic from which the interrupt request has been received. The interrupt vector PROM 526 then provides the next microinstruction address which is pointing to the location to start the program in a microprogram controller which may be an Advanced Micro Devices 2910 controller. The priority unit 508 indicates to the vector PROM 526 the highest priority source that has made a request. The test condition MUX 522 in response to an INT REQUEST signal receives terms for testing so that the next instruction can be selected as a function of these conditions. The input signals to the test condition MUX 522 are INT REQUEST, ALU=0, AEC INTER CTL, CEI and CEIDMA DB and 4 microinstruction bits from the microinstruction register 518. These terms are then tested by the microprogram controller 534 to determine if a routine as addressed by the interrupt vector PROM 526 can be performed. Thus, if the test conditions are met, the microprogram controller 534 receives from the interrupt vector PROM 526 an instruction enabling signal as well as the next microinstruction address pointing to where the interrupt program will be started.

The microprogram controller 534 also receives starting addresses for various microprograms address as a function of commands from the CE or AEC unit 10 through a command mapping PROM 536. This PROM translates commands from the CE or from the arithmetic element controller (through the AEC interface controller unit 510). The command mapping PROM 536 then provides a next microinstruction address to the controller 534 indicating the next instruction commands. The CE command formats are shown in Table 8 for the various CE commands as defined in Table 9. The eight most significant bits of the command shown in Table 8 are the OP CODE that is transferred to the command mapping PROM 536. The other command from the AEC unit 10 is shown in Table 10 with the eight most significant bits being applied to the CT bus 530 for reception by the command mapping PROM 536. Table 11 shows the format of the AEC data transfer command and Table 12 further describes the AEC data transfer commands.

TABLE 8

| | CE COMMAND FORMATS | | |
|---|---|---|---|
| | Command | Format | Required For |
| Format 1: | Halt<br>EXP | MSB 0　　　3　　COMMAND CODE │ MEMORY ADDRESS │ LSB 15 | All Commands |
| | SBP<br>LPMC<br>LCSC<br>LPMDA | │ CONTROL WORD 1 │ | All except<br>HALT and EXP |
| | LCSDA<br>RPM<br>RREG | │ CONTROL WORD 2 │ | LPMDMA, LSCDMA<br>RCS, RCSDMA |
| | RCS<br>RCSDMA | │ CONTROL WORD 3 │ | RCSDMA |

TABLE 8-continued

CE COMMAND FORMATS

| | Command | Format | Required For |
|---|---|---|---|
| Format 2: | RSTAT<br>SSTAT | 0  3 4      7  11   15<br>COMMAND CODE \| MODIFIER \| STATUS | All Commands |
| Format 3: | LEWS<br>REWS<br>LPMEWS<br>LCSEWS<br>SCSEWS | 0  3 4      7  12  15<br>COMMAND CODE \| MODIFIER \| BANK | All Commands |
| | | CONTROL WORD 1 | All Commands |
| | | CONTROL WORD 2 | All Commands |
| | | CONTROL WORD 3 | All Commands |
| | | CONTROL WORD 4 | All Except LPMEWS |
| | | CONTROL WORD 5 | LEWS, REWS |
| Format 4: | LMPH<br>RMPH<br>LCT<br>RCT | 0   3 4       7<br>COMMAND CODE \| MODIFIER | All Commands |
| | | CONTROL WORD 1 | All Commands |
| | | CONTROL WORD 2 | All Commands |

TABLE 9

CE COMMAND DEFINITIONS

| Command | Command and Control Word Contents | Comments |
|---|---|---|
| HALT:<br>Halt AEC<br>Operations | Command Code: 0<br>Memory Address: None | Resets control logic in Minipro to a known initial state; resets all AEC status register bits. |
| EXP:<br>Execute<br>program | Command Code: 1<br>Memory Address: PM address of first instruction to be executed | An interrupt to the CE will be generated if AEC program execution terminates. |
| SBP:<br>Set break-<br>point | Command Code: 4<br>Memory Address: Break-point address<br>Control Word 1: (Break-point loop-count)-1 | The SBP command enables the break-point logic. An EXP command will then result in an AEC program being executed until the instruction located at the break-point address has been executed "loop-count" (≧4096) times. When this condition occurs, an interrupt will be generated and sent to the CE. |
| LPMCE:<br>Load<br>program<br>memory<br>from CE | Command Code: 5<br>Memory Address: Starting PM address<br>Control Word 1: Word count | Following the command the CE sends the 64-bit program memory words to the EIU via the CE's PIO bus in groups of four 16-bit words until the program memory load has been completed. The 16 MSBs of each 64-bit PM word are sent first, then the next 16 MSBs, c. The word count specifies the number of 16-bit words (ie, four times the number of PM instructions) to be transferred. |
| LCSCE:<br>Load<br>coefficient | Command Code: 6<br>Memory Address: Starting CS address | Following the command the 16-bit coefficient store data words are sent to the EIU via the CE's PIO bus one word at a time, until the CS load is complete. |
| store from<br>CE | Control Word 1: Word count | |
| LPMDMA:<br>Load PM<br>via DMA<br>bus | Command Code: 7<br>Memory Address: Starting PM address<br>Control Word 1: Starting CE memory address<br>Control Word 2: Word count | The word count is the number of 16-bit words (ie, four times the number of PM instructions to be transferred via the DMA bus and loaded into PM. An interrupt to the CE is generated at the completion of the transfer. (LPMDMA is undefined if there is no DMA bus.) |
| LCSDMA:<br>Load CS<br>via DMA<br>bus | Command Code: 8<br>Memory Address: Starting CS address<br>Control Word 1: Starting CE address<br>Control Word 2: Word count | The CS is loaded with the specified number of words via a DMA transfer. An interrupt will be generated and sent to the CE at the completion of the transfer. (LCSDMA is undefined if there is no DMA bus.) |
| RPM:<br>Read<br>program<br>memory<br>to CE | Command Code: 9<br>Memory Address: Starting PM address<br>Control Word 1: Word count | The 64-bit program memory words are sent to the CE via the CE's PIO bus in groups of four words. The 16 MSBs of each 64-bit PM word are received first. The word count specifies the number of 16-bit words (ie, four times the number of PM instructions) to be transferred. |
| RREG:<br>Read AEC<br>registers | Command Code: A<br>Memory Address: PM address of RREG utility program<br>Control Word 1: Word count | This command causes the execution of an AEC program under the direct control of the EIU; ie, the EIU increments a PM |

TABLE 9-continued
CE COMMAND DEFINITIONS

| Command | Command and Control Word Contents | Comments |
|---|---|---|
| | | state counter after each register is read. Up to 27 registers are output to the CE via the PIO bus in the following order: AG registers 0 thru F, the AGO register, CSAC, CSAR, WSAC, and WSAR. Word count specifies the number of registers to be output. |
| RCS: Read coefficient store to CE | Command Code: B Memory Address: PM address of RCS utility program Control Word 1: Starting CS address Control Word 2: Word count | The 16-bit CS data words are sent to the CE via the CE's PIO bus. |
| RCSDMA: Read coefficient store via DMA bus | Command Code: C Memory Address: PM address of RCSDMA utility program Control Word 1: Starting CS address Control Word 2: Starting CE memory address Control Word 3: Word count | The 16-bit CS data Words are sent to the CE via the CE's DMA bus. An interrupt to the CE is generated at the completion of the transfer (RCSDMA is undefined if there is no DMA bus.) |
| RSTAT: Read AEC status register | Command Code: P Modifier: 0 Status: (Not used) | The 16-bit AEC status register is sent to the CE via the CE's PIO bus. |
| SSTAT: Set CE status | Command Code: F Modifier: 1 Status: CE status | The 5-bit CE status is loaded into the corresponding bits in the AEC status register and the VAL bit is set. The VAL bit is reset by the AEC when it has read the CE status bits. |
| LEWS: Load EWS | Command Code: F Modifier: 2 Bank: EWS bank Control Word 1: Starting EWS Control Word 1: Starting EWS address Control Word 2: EWS address increment Control Word 3: EWS select Control Word 4: Word count Control Word 5: Starting CE memory address | The 16-bit EWS data words are transferred from the CE via the DMA bus, if one exists; otherwise, the DMA bus, if one exists; otherwise, the PIO bus is employed. (Control word 5 does not exist if there is no DMA bus.) Control word 3 specifies the EWSs to be loaded. |
| REWS: Read EWS | Command Code: F Modifier: 3 Bank: EWS bank Control Word 1: Starting EWS address Control Word 2: EWS address increment Control Word 3: EWS select Control Word 4: Word count Control Word 5: | The 16-bit EWS data words are transferred to the CE via the DMA bus, if one exists; otherwise, the PIO bus is employed. (Control word 5 does not exist if there is no DMA bus). |
| LPMEWS: Load PM from EWS | Starting CE memory address Command Code: P Modifier: 4 Bank: EWS bank Control Word 1: Starting EWS address Control Word 2: EWS select Control Word 3: Word count Control Word 4: Starting PM address | The PM is loaded from EWS. The word count specifies four times the number of 64-bit PM words to be transferred. |
| LCSEWS: Load CS from EWS | Command Code: P Modifier: 5 Bank: EWS bank Control Word 1: Starting EWS address Control Word 2: EWS select Control Word 3: Word count Control Word 4: Starting CS address | The CS is loaded from EWS. |
| SCSEWS: Save CS in EWS | Command Code: F Modifier: 6 Bank: EWS bank Control Word 1: Starting EWS address Control Word 2: EWS select Control Word 3: Word count Control Word 4: Starting CS address Control Word 5: PM address of SCSEWS utility program | The CS data words are saved in the EWS. |
| IMPM: Load EWSAC MPM | Command Code: F Modifier: 7 Control Word 1: Starting MPM address Control Word 2: Word count | Load the microprogram memory (MPM) in the EWSAC via the CE's PIO bus. |
| RMPM: Read EWSAC MPM | Command Code: P Modifier: 8 Control Word 1: Starting MPM address Control Word 2: Word count | Read the MPM in the EWSAC via the CE's PIO bus. |
| LCT: Load EWSAC CT | Command Code: P Modifier: 9 Control Word 1: Starting CT address Control Word 2: Word count | Load the control table (CT) in the EWSAC via the CE's PIO bus. |
| RCT: Read EWSAC CT | Command Code: F Modifier: A Control Word 1: Starting CT address Control Word 2: Word count | Read the CT in the EWSAC via the CE's PIO bus. |

TABLE 10

AEC OPERATIONS TO SUPPORT COMMUNICATIONS BETWEEN THE AEC AND EIU

| Function | Modifier | Description |
|---|---|---|
| AEC OPERATION | | |
| SSTA | — | Set AEC status bits in the AEC status registers from the 5 LSBs (bits 11 thru 15) of AG register A. |
| SSTA | SWI | Same as SSTA; in addition set the SWI bit in the AEC status register. (Setting SWI causes a CE interrupt ot be generated.) |
| SSTI | — | Set AEC status bits in the AEC status register from the 5 LSBs of the immediate data field (microinstruction bits 31 thru 35). |
| SSTI | SWI | Same as SSTI; in addition set the SWI bit in the AEC status register. |
| RSTA | — | Read the AEC status register into AG register B. |
| RSTA | VAL | Same as RETA; in addition clear the VAL bit in the AEC status register. |
| OCMD | — | Output a command from AG register A to the EIU. |
| OMCI | — | Output a command from the microinstruction immediate data field to the EIU. |
| ODAT | — | Output data from AG register A to the EIU. |
| ODAI | — | Output data from the microinstruction immediate data field to the EIU. |
| RADT | — | Read data from the EIU into AG register B. |
| LBAR | — | Load the EWS bank address register from bits 12 thru 15 of AG register A. |
| LBAI | — | Load the EWS bank address register from the 4 LSBs of the immediate data field (microinstruction bits 32 thru 35). |
| RBAR | — | Read the EWS bank address register into bits 12 thru 15 of AG register B. |
| LRAB | ACK | Load AG register A into AG register B; load AG FLAG F/F with ACK signal from EIU. (The ACK signal designates whether or not the EIU has processed a command or data word previously sent to the EIU from the AEC. Specifically whenever the AEC executes a OCMD, OCMI, ODAT, or ODAI instruction, the ACK signal will be cleared false until the EIU has processed the command or data word at which time it will be set true.) |
| LRAB | DAT | Load AG register A into AG register B; load AG FLAG F/F with DAT signal from the EIU. (The DAT signal designates whether or not the EIU has a data word available word available for the AEC. Specifically the EIU will set the DAT signal true whenever a data word is available for the AEC; when the AEC executes a RDAT instruction the DAT signal will be cleared false. |

TABLE 11

AEC DATA TRANSFER COMMAND FORMATS

| | Command | Format | Required For |
|---|---|---|---|
| Format 1: | LPMC LCSC SCSC | MSB<br>0　　3 4　　　　　　　　15<br>\| CODE \| MEMORY ADDRESS \| | All Commands |
| | | \| CONTROL WORD 1 \| | All Commands |
| | | \| CONTROL WORD 2 \| | All Commands |
| | | \| CONTROL WORD 3 \| | |
| Format 2: | PDBF LDBF | MSB　　　　　　　　　　LBS<br>0　3 4　　7　　13　15<br>\| CODE \| MODIFIER \| DI \| | All Commands |
| | RBSW | | Except FLAE |
| | RDIS FLAE | 0　　3 4　　　7 8 11 12　15<br>\| CODE \| MODIFIER \| F \| AB \| | FLAE |
| | HDAX CEIU | | |
| Format 3: | LEWC SEWC XEWS | 0　　3 4　　　5　　12　15<br>\| CODE \| MODIFIER \| \| BANK \| | All Commands |
| | LPME LCSE SCSE | \| CONTROL WORD 1 \|<br>\| CONTROL WORD 2 \|<br>\| CONTROL WORD 3 \| | All Commands<br>All Commands<br>All Except |
| | RDCE ODCE | | RDCE and ODCE |

TABLE 11-continued
AEC DATA TRANSFER COMMAND FORMATS

| Command | Format | Required For |
|---|---|---|
| RDEW ODEW XEDE | CONTROL WORD 4 | LEWC, SEWC, XEWS, LPME, SCSE, SCSE and XEDE |
|  | CONTROL WORD 5 | LEWC, SEWC, XEWS, LPME, LCSE & SCSE |
|  | CONTROL WORD 6 | XEWS and SCSE |
|  | CONTROL WORD 7 | XEWS |
|  | CONTROL WORD 8 | XEWS |

TABLE 12
AEC DATA TRANSFER COMMANDS

| Command | Command and Control Word Contents | Comments |
|---|---|---|
| LPMC: Load PM from CE memory via DMA bus | Code: 1 Memory Address: Starting PM address Control Word 1: Starting CE memory address Control Word 2: Word count Control Word 3: PM address of instruction to be executed after PM load | The LPMC command allows the AEC to initiate loading its PM from the CE memory. The word count specifies the number of 16-bit words (ie, four times the number of PM instructions) to be transferred via the CE's DMA bus. An AEC program cannot be executing while the PM load is in progress; control word 3 specifies the instruction to be executed after the PM load is performed. The LPMC command is undefined if there is no DMA bus. |
| LCSC: Load CS from CE memory via DMA bus | Code: 2 Memory Address: Starting CS address Control Word 1: Starting CE memory address Control Word 2: Word count Control Word 3: PM address of instruction to be executed after PM load | The LCSC command allows the AEC to initiate loading its CS from the CE memory via the CE's DMA bus. An AEC program cannot be executing while the PM load is in progress; control word 3 specifies the instruction to be executed after the CS load is performed. The LCSC command is undefined if there is no DMA bus. |
| SCSC: Store CS in CE memory via DMA bus | Code: 3 Memory Address: PM address of 'Read CS' utility program Control Word 1: Starting CS address Control Word 2: Starting CE memory address Control Word 3: Word count Control Word 4: PM address of instruction to be executed after PM load | The SCSC command allows the AEC to initiate storing its CS into the CE memory via the CE's DMA bus. An AEC program cannot be executing while this operation is in progress; control word 4 specifies the instruction to be executed after the CS store is performed. The SCSC command is undefined if there is no DMA bus. |
| RDCE: Read data from CE memory via DMA bus | Code: 4 Modifier: 0 Bank: (not used) Control Word 1: Starting CE memory address Control Word 2: Word count | The RDCE command allows the AEC to read data from the CE memory via the DMA bus. The EIU will read the data is in the EIU, the DAT (Data Available) signal from the EIU will be activated and the AEC program can read the 16-word block, one word at a time. This command differs from the LCSC command in that an AEC program is executing in parallel with the CE memory to EIU data transfer. The RDCE command is undefined if there is no DMA bus. |
| ODCE: Output data to CE memory via DMA bus | Code: 4 Modifier: 1 Bank: (not used) Control Word 1: Starting CE memory address Control Word 2: Word count | The ODCE command allows the AEC to output data to the CE memory via the DMA bus. The AEC outputs the data to the EIU in 16-word blocks. When the EIU is ready for the next block, the ACK (acknowledge) signal from the EIU will be activated. This command differs from the SCSC command in that an AEC program is executing in parallel with the EIU to CE memory data transfer. The ODCE command is undefined if there is no DMA bus. |
| RDEW: Read data from EWS | Code: 4 Modifier: 2 Bank: EWS bank address Control Word 1: Starting EWS address Control Word 2: EWS select Control Word 3: Word count | The RDEW command is identical in operation to the RDCE command except that data is read from the EWSs rather than CE memory. |
| ODEW: Output data to EWS | Code: 4 Modifier: 3 Bank: EWS bank address Control Word 1: Starting EWS address Control Word 2: EWS select | The ODEW command is identical in operation to the ODCE command except that data is output to the EWSs rather than CE memory. |

TABLE 12-continued
AEC DATA TRANSFER COMMANDS

| Command | Command and Control Word Contents | Comments |
|---|---|---|
| | Control Word 3: Word count | |
| LEWC: Load EWS from CE memory via DMA bus | Code: 4<br>Modifier: 4<br>Bank: EWS bank address<br>Control Word 1: Starting EWS address<br>Control Word 2: EWS address increment<br>Control Word 3: EWS select<br>Control Word 4: Word count<br>Control Word 5: Starting CE memory address | The LEWC command allows the AEC to initiate a CE memory to EWS data transfer via the DMA bus. When the transfer is complete, the ACK (acknowledge) signal from the EIU will be activated. The LEWC command is undefined if there is no DMA bus. |
| SEWC: Store EWS in CE memory via DMA bus | Code: 4<br>Modifier: 5<br>Bank: EWS bank address<br>Control Word 1: Starting EWS address<br>Control Word 2: EWS address increment<br>Control Word 3: EWS select<br>Control Word 4: Word count<br>Control Word 5: Starting CE memory address | The SEWC command allows the AEC to initiate an EWS to CE memory data transfer via the DMA bus. When the transfer is complete, the ACK (acknowledge) signal from the EIU will be activated. The SEWC command is undefined if there is no DMA bus. |
| XEWS: Transfer data from EWS to EWS | Code: 4<br>Modifier: 6<br>Bank: EWS bank address (source)<br>Control Word 1: Starting EWS address (source)<br>Control Word 2: EWS address increment (source)<br>Control Word 3: EWS select (source)<br>Control Word 4: EWS bank address (destination)<br>Control Word 5: Starting EWS address (destination)<br>Control Word 6: EWS address increment (destination)<br>Control Word 7: EWS select (destination)<br>Control Word 8: Word count | The XEWS command allows the AEC to initiate an EWS to EWS data transfer. When the transfer is complete the ACK (acknowledge) signal from the EIU will be activated. |
| LPME: Load PM from EWS | Code: 4<br>Modifier: 7<br>Bank: EWS bank address<br>Control Word 1: Starting EWS address<br>Control Word 2: EWS select<br>Control Word 3: Word count<br>Control Word 4: Starting PM address<br>Control Word 5: PM address of instruction to be executed after PM load | The LPME command allows the AEC to initiate loading its PM from the EWS. The word count specifies the number of 16-bit words (ie, four times the number of PM instructions) to be transferred. An AEC program cannot be executing while the PM load is in progress; control word 5 specifies the instruction to be executed after the PM load is performed. |
| LCSE: Load CS | Code: 4<br>Modifier: 8 | The LCSE command allows the AEC to |
| from EWS | Bank: EWS bank address<br>Control Word 1: Starting EWS address<br>Control Word 2: EWS select<br>Control Word 3: Word count<br>Control Word 4: Starting CS address<br>Control Word 5: PM address of first instruction to be executed after CS load | initiate loading its CS from the EWS. An AEC program cannot be executing while the CS load is in progress; control word 5 specifies the first instruction to be executed after the CE load is performed. |
| SCSE: Store CS in EWS | Code: 4<br>Modifier: 9<br>Bank: EWS bank address<br>Control Word 1: Starting EWS address<br>Control Word 2: EWS select<br>Control Word 3: Word count<br>Control Word 4: Starting CS address<br>Control Word 5: PM address of 'Read CS' utility program<br>Control Word 6: PM address of first instruction to be executed after CS store | The SCSE command allows the AEC to initiate storing its CS into the EWS. An AEC program cannot be executing while this operation is in progress; control word 6 specifies the first instruction to be executed after the storing operation is performed. |
| XEDE: Transfer data between an external device and the EWSs | Code: 4<br>Modifier: A or B<br>Bank: EWS bank address<br>Control Word 1: Starting EWS memory address<br>Control Word 2: EWS address increment<br>Control Word 3: EWS data buffer length<br>Control Word 4: Device interface mode (bits 0+7) and device interface number (bits 13+15) | The XEDE command initiates a data transfer between an external device and the EWSs. Control word 4 specifies the particular device interface and the mode that the device interface should operate in.) The mode is passed directly to the device interface and is not used by the EWSAC.) If MODIFIER = A, then the data transfer involves a single data buffer in EWS and is finite in length; if MODIFIER = B then the data transfer involves two buffers in EWS and continues indefinitely (ie, double buffing of data is employed). In either case control word 3 specifies the number of EWS locations in a single data buffer. |
| PDBF: Processed data buffer Modifier | Code: 5<br>Modifier: Denotes data buffer for a particular device interface: | The PDBF commands allow; the AEC to notify the EIU when it has completely processed the data in a device interface's data buffer. Upon receiving this command, the EWSAC will clear |

| Modifier | Buffer | Device/Interface |
|---|---|---|
| 0 | 1 | 0 |
| 1 | 2 | 0 |

TABLE 12-continued
AEC DATA TRANSFER COMMANDS

| Command | Command and Control Word Contents | | Comments |
|---|---|---|---|
| 2 | 1 | 1 | the appropriate bit in the buffer starting word. If a device interface is inputting data in a "double buffering" mode, then the AEC must issue a PDBF command prior to the time the device interfaces needs to store data in the buffer; if this does not occur, the appropriate error bit in the device interface status word will be set. |
| 3 | 2 | 1 | |
| 10 | 1 | 5 | |
| 11 | 2 | 5 | |
| LDBF: Loaded data buffer | Code: 6 Modifier: Denotes data buffer for a particular device interface; | | The LDBF command allows the AEC to notify the EIU when it has loaded data to be output by a particular device interface into a particular data buffer associated with that device interface. |
| Modifier | Buffer | Device/Interface | |
| 0 | 1 | 0 | |
| 1 | 2 | 0 | |
| 2 | 1 | 1 | |
| 3 | 2 | 1 | |
| 10 | 1 | 5 | |
| 11 | 2 | 5 | |
| RBSW: Read buffer status word | Code: 7 Modifier: 0 | | The RBSW command allows the AEC to read the buffer status word (located in the EWSACs control table). |
| RDIS: Read device interface status word | Code: 7 Modifier: 1 | | The RDIS command allows the AEC to read the device interface status word (located in the EWSACs control table). |
| FLAE: Failed AE | Code: 7 Modifier: 2 AE: Denotes failed AE | | The FLAE command allows the AEC to specify one of sixteen AEs or their associated EWS as having failed. This command is employed only when the system contains a redundant AE. In this case, data transfers to or from the failed AE will actually involve the redundant AE. |
| HDAX: Halt data transfer | Code: 7 Modifier: 3 DI: Device interface number | | The HDAX command allows the AEC to halt a data transfer associated with a particular device interface. |
| CEIU: Clear EIU | Code: 7 Modifier: 4 | | The CEIU command allows the AEC to clear the EIU to a known quiescent state. In particular all data transfers are terminated, all device interfaces are cleared, and the buffer status and device interface status words are cleared. |

A branch ADDR from the microinstruction register 518 is applied through a bus 538 to the microprogram controller 534. Thus, the three sources of the next microinstruction address are the address from the interrupt vector PROM 526, the address from the command mapping PROM 536 and the branch address from the microinstruction register 518. The microprogram controller 534 selects the source by activating signals at $\overline{VECT}$, $\overline{MAP}$ or $\overline{PL}$. The microprogram memory 540 which may be a combination of RAM and ROM, 64-bits wide, stores the microprogram words which are transferred to the microinstruction register 518. The microprogram memory 540 is addressed every 200 ns or each clock time with the next microinstruction address and provides the next microinstruction for the microinstruction register 518. In order to load the RAM portion of the memory 540 a load control unit 544 includes a counter (not shown) which indicates which one of sixteen bits of the 64-bit wide word has been written into the microinstruction register 518. The microinstruction bits are shown controlling the various units with 4-bits MIR control provided to the priority interrupt units 508, 4-bits to the test input MUXS 522, 5-bits to the microprogramming controller 534, 3-bits to the load control unit 544, 3-bits to the AEC interface CTL, 3-bits to control element interface (CEI), 4-bits to DMA logic in CEI, 3-bits to DI control and 12-bits branch address to the bus 538.

The vector priority interrupt controller 508 allows the microprogram control unit to operate on an interrupt driven basis, thus reducing the overhead time associated with generating an extended work store address for a particular device. The priority interrupt unit 508 receives interrupt requests to: (1) generate an EWS address for a device interface, the CEI's-DMA logic, or an EWS refresh cycle; (2) process an AEC or a CE command; and (3) generate an interrupt to the CE. Generating extended work store addresses takes highest priority and to minimize overhead the following two functions occur: (1) a device interface activates its EWS access request signal in advance of all data words being loaded into the data registers in the EWS data interface unit, and (2) all microprograms that are associated with processing an AEC or CE command or generating an interrupt to the CE are instantaneously interruptable by an EWS address generation request interrupt.

The address generation unit 509 in the illustrated arrangement includes a 256×20 RAM control table (CT) 550, a 20-bit arithmetic logic unit (ALU) 551 which may be a S381 unit, and a 20-bit EWS address register 552. Latches 554 and 556 are coupled between the control table 550 and the ALU 551. A CT address register 558 provides addresses for the RAM in the control table 550 and it is loaded from the branch address field from the microinstruction register 518. The control table 550 memory may be 20-bits wide and this memory may be preloaded by the CE unit. The output of the control table 550 supplies one of the two latches 554 and 556, the selection being made by 2 bits from the microinstruction register 518 which are the CT READ/WRITE LATCHES signals. The CT address register 558 is controlled by 2 bits from the microinstruction register 518 which is the EWS ADDR REG LOAD term, the ALU unit 551 receives 3 microbits which is the ALU term, and the extended work store address register 552 receives 1 bit which is EWS ADDR REG LOAD term. Thus, the computed address can be loaded into the address register 552 under microcommand instruction control or the ALU 551 output can be written back into the control table unit 550 through a bus 553 and the CT bus 530. The control table unit 550 contains the extended work store address (current address and initial buffer address), the address increment, word count and other information that defines the current state of a particular data transfer. This information is placed in the control table 550 at the time that the data transfer is initiated. For PMFL (performance monitoring fault location) purposes, the contents of the control table 550 may be read by the CE through a path not shown. The 20-bit ALU 551 performs the required address incrementation and word count decrementation. Thus, the extended work store address register 552 holds the generated extended work store address that is utilized for all EWS unit accesses except when under control of the AEC unit 10.

Figure 22:
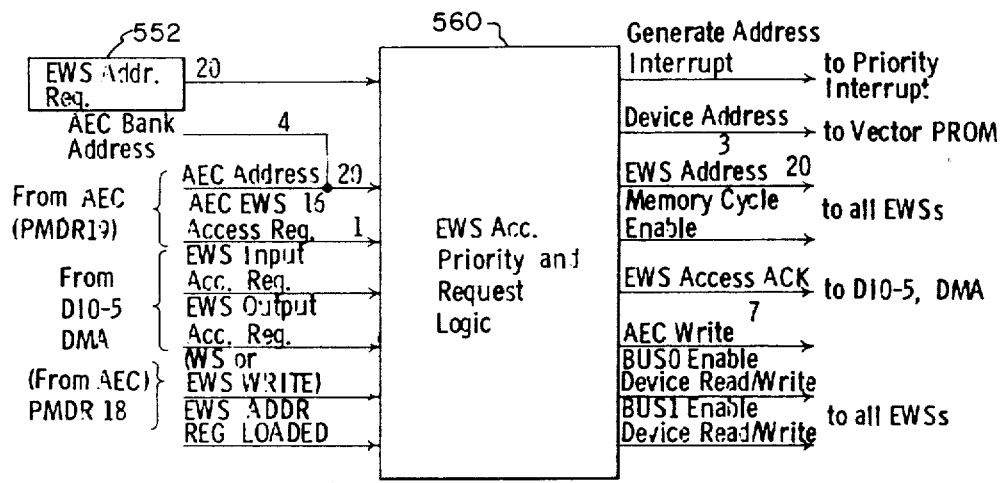
FIG. 22 is a schematic block diagram showing the input and output signals of the EWS access priority and request logic unit of FIG. 21.

Referring now also to FIG. 22, an extended work store access priority and request logic unit 560 receives the extended work store address from the register 552 and from other sources. The input and output terms which are only generally indicated in FIG. 21 are shown as separated terms in FIG. 22 for further clarity. The unit 22 receives from the AEC unit 10 a 4-bit AEC bank address and a 16-bit AEC address to form the 20-bit address EWSA00 through EWSA19. Also, from the AEC the unit 560 receives the term PMDR19 which is the AEC EWS ACCESS REQ term. From DI0 through DI5 and from the DMA logic in the CEI the unit 560 receives EWS INPUT ACC REQ and EWS OUTPUT ACC REQ terms. From the microinstruction register 518, the access priority and request logic unit 560 receives a 1-bit signal EWS ADDR REG LOADED. The EWS access logic unit 560 in response to these input terms provides access priorities according to the following:

| EWS ACCESS PRIORITY | |
| --- | --- |
| UNIT | PRIORITY |
| AEC | Highest |
| EWS Refresh Logic | |
| Device Interface 0 | |
| Device Interface 1 | |
| Device Interface 2 | |
| Device Interface 3 | |
| Device Interface 4 | |
| Device Interface 5 | |
| CEI's DMA Logic | Lowest |

The first output from the output logic unit 560 is GENERATE ADDRESS INTERRUPT whis is input to the priority interrupt unit 508. A DEVICE ADDRESS term which is really a device number is also generated and applied to the interrupt vector PROM 526. An EWS ADDRESS of 20-bits and a MEMORY CYCLE ENABLE allows access to the extended work stores and is applied to all EWS units. One of the seven EWS ACCESS ACK signals is applied to each of the devices DI0 through DI5 and the CEI's DMA units and acknowledges to those units that access has been obtained, to allow the Di or DMA to load or unload information in or out of the extended work store units. For an input request, the signal EWS ACCESS ACK indicates that the registers are free and can be loaded; for an output request, this acknowledge tells the device interface that data has been loaded from the extended work store unit into the extended work store data interface and the device interface can unload that information to the device. An AEC WRITE signal which is provided to all extended work store units and device interfaces provides a write access or command to the logic units 500 and 502 of FIG. 20. If this term AEC WRITE is not present, then the operation provides reading by default, thus a predetermined signal level is a command to perform writing. A BUS0 ENABLE DEVICE READ/WRITE signal and a BUS1 ENABLE DEVICE READ/WRITE signal are supplied to all EWS units and device interfaces and is an enable signal for selecting BUS0 or BUS1 for reading or for writing from or into the EWS units. Thus, it can be seen that the principle function of the access priority and request logic units 560 is to receive the EWS access requests from the various sources and on the basis of priority apply them to the proper units.

Referring now principally to FIG. 23, the EWS access priority and request logic unit 560 will be explained in further detail. A MUX 564 responds to the address in the EWS address register 552 and an address from the AEC address bus to apply an EWS address of 20-bits to all extended work store units. The EWS bank address is received from the AEC interface control unit 510. It is to be noted that the AEC WRITE and BUS0 and BUS1 ENABLE DEVICE signals go to the EWS device interface unit. The MUX 564 responds to a 1-bit output from an EWS access priority logic unit 566 which receives a 7-bit INPUT REQUEST from DI0 through DI5 and the CEI's DMA, and a 7-bit OUTPUT REQUEST from DI0 through DI5 and DMA, along with a refresh request from an extended work store refresh timer control unit 568. In response to a control bit EWS ADDRESS REG LOADED from the microinstruction register 518 (FIG. 21) and PMDR19 which is the AEC EWS ACCESS REQUEST, the priority unit 566 controls the MUX 564. Also, the priority logic unit 566 applies an EWS ACCESS ENABLE signal and control signals to an EWS access request logic unit 570. On a priority basis, the access priority logic unit 566 as previously discussed, provides GENERATE ADDRESS REQ to the priority interrupt 508 (FIG. 21) and DEVICE ADDR to the vector PROM 526.

The EWS access request logic unit 570 developes the AEC WRITE signal and the BUS0 and BUS1 ENABLE DEVICE (READ/WRITE) signals and develops and EWS MEMORY CYCLE ENABLE signal which is applied to all EWS units. The EWS ACCESS ACK is provided to the DIs, the DMA and the EWS refresh timer control unit 568. It is to be noted that the refresh timer control unit 568 which requests a refresh operation each two milliseconds, for example, is only required when dynamic type memory storage is utilized. It also is to be noted that the AEC EWS access request signal PMDR19 indicating that the AEC unit 10 will be performing an EWS access, in MCR19 pushed back two instruction times so that if this signal is not present, for two consecutive clock periods then a requesting unit such as a device interface or the DMA has two clock periods to access EWS units. The INPUT REQUEST and the OUTPUT REQUEST signals to the priority logic unit 566 are each for DI0 through DI5 and for the DMA. The buffer registers are full when the input request signal falls so this is an indication that in the case of inputs, the buffer registers are loaded, and in case of outputting, (output request) they are unloaded.

Figure 24:
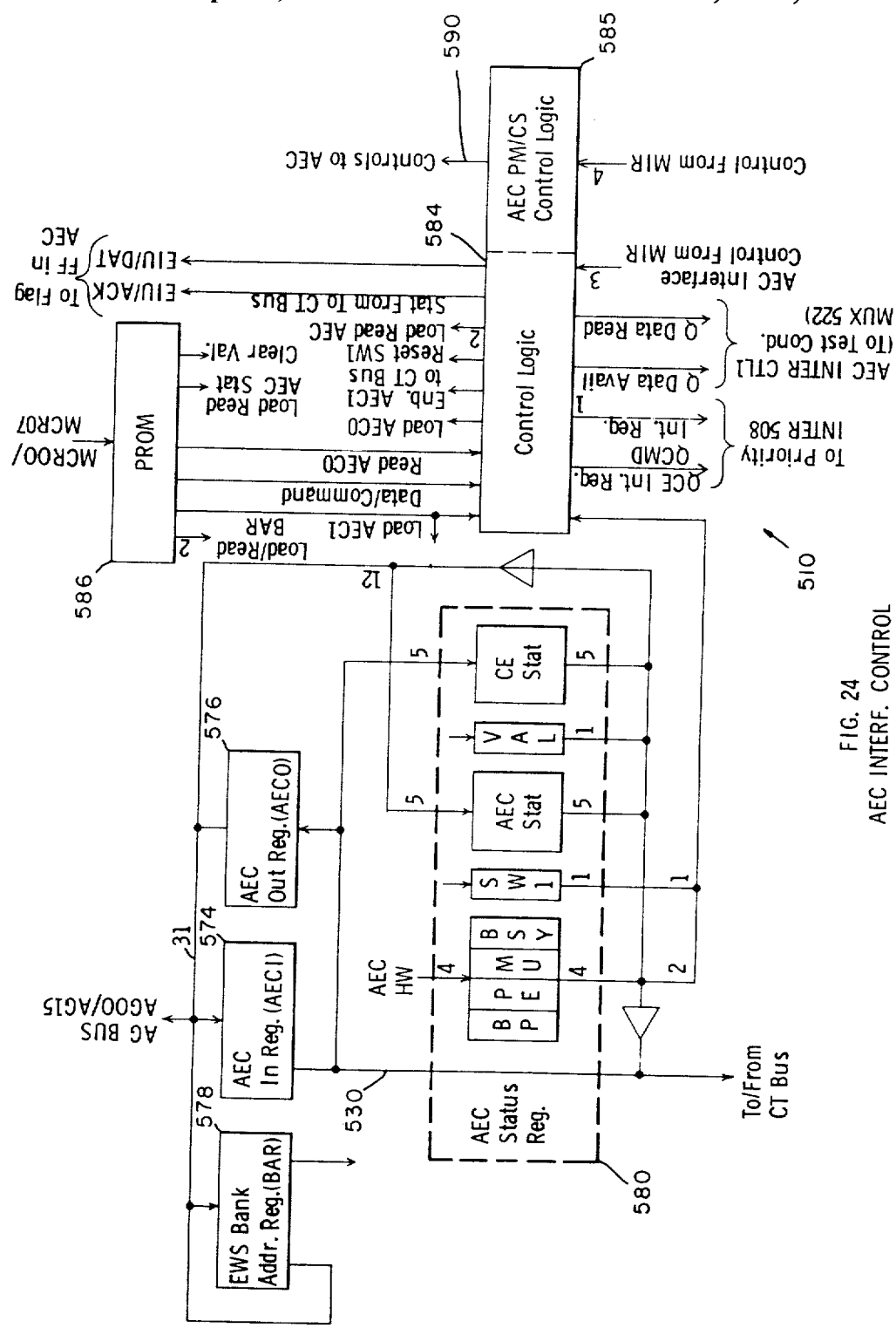
FIG. 24 is a schematic block diagram of the AEC interface control unit of FIG. 21.

Referring now to FIG. 24, the AEC interface control unit 510 from FIG. 21 provides the logic that interfaces the EWS access controller 71, with the AEC unit 10. An AEC input register (AECI) 574 coupled between the AG bus 31 and the CT bus 530, allows the AEC unit 10 to output commands and data (such as CS, PM or AEC register data) to the EWS access controller 71. An arithmetic element controller output register (AECO) 576 is also coupled between the AG bus 31 and the CT bus 530 to allow program memory coefficient store or device interface status data to be sent to the AEC unit 10. An EWS bank address register 578 is provided to allow the arithmetic element controller to designate one of sixteen 128K word EWS banks.

An AEC status register 580 is also provided to provide a status word format shown in Table 13 with the AEC status register bits as defined in that Table.

TABLE 13

ABC STATUS REGISTER

MSB / LBS

| 0 | 1 | 2 | 3 | 4 | 5 6 7 8 9 10 | 11 12 13 14 15 |
|---|---|---|---|---|---|---|
| BP | PE | MU | BSY | SWI | ABC STATUE | VAL | CE STATUE |

| ABC Status Register Bit(s) | Definition | Comments |
|---|---|---|
| BP | Break-point condition met | Set whenever a break-point condition is met; cleared by a HALT or EXP CE command. |
| PE | Program memory parity error | Set whenever the ABC detects a PM parity error during program execution; cleared by a HALT or EXP CE command. |
| MU | Minipro unavailable | Set whenever Minipro is in an off-line mode; cleared otherwise. |
| BSY | ABC busy | Set whenever ABC is executing a program; cleared otherwise. |
| SWI | Software interrupt | Set whenever the ABC executes a 'Set ABC Status and interrupt' instruction; cleared when ABC status register is read during the resulting CB interrupt processing cycle (SWI being cleared indicates to the ABC program that the SW interrupt was processed.) |
| ABC STATUS | AEC program status | Set or cleared as specified whenever the ABC executes a 'Set ABC Status' or a 'Set ABC Status and interrupt' instruction. |
| VAL | CB status valid | Set whenever the CB issues a 'Set CB Status' command; cleared whenever ABC executes a 'CB Status Read' instruction. |
| CB STATUS | CE program status | Set or cleared as specified whenever the CB issues a 'Set CE Status' command. |

Whenever the BP, PE or SWI bits become set, an interrupt processing sequence will occur causing a transfer of the AEC status register contents to the CE. The CE can then analyze the status register bits to determine the cause of the interrupt. The CE STATUS and AE STATUS bits in the AEC status register are user definable and allow the application program executing in the CE to communicate as necessary with the program executing in the arithmetic element controller 10. The AEC interface control unit 510 also supplies the control signals to the AEC unit 10 that are necessary to write data into or read data from the program memory or the coefficient store, to read the arithmetic element controllers registers, to load the arithmetic element control break-point address register and loop counter and to initiate or halt program execution. The control unit 510 activates the appropriate control signals during the execution of various arithmetic element controller and CE commands. A sequential control logic unit 584 receives data from a PROM 586 the latter receiving AEC OP code data MCR00 through MCR07. The PROM 586 provides coded signals in the form of LOAD AEC1, DATA/COMMAND, READ AEC0. The PROM 586 also provides other signals, LOAD READ BAR, LOAD READ AEC STAT, CLEAR VAL and the control logic unit 584 provides signals LOAD AEC0, ENB AECI to CT BUS, RESET SWI, and LOAD/READ AEC STAT from/to CT BUS. Also, the control logic unit 584 provides EIU/ACK and EIU/DAT to the flag flip-flop in the AEC unit 10. The input terms to control the sequential control logic unit 584 are three bits of AEC INTERFACE CONTROL which provide LOAD AEC0, READ AECI TO CT BUS, ENB CMD OP CODE TO CT BUS, READ AEC STATUS REG, INTERRUPT PROCESSED and RESET SWI. Output terms QCE INT REQ, QCMD INT REQ, are applied to the priority interrupt unit 508 and Q DATA AVAIL (in AECI) and Q DATA READ FROM AEC0 form an AEC INTER CTL signal which is applied to the test condition MUX 522.

An AEC PM/CS control logic unit 588 responds to 4-bits of control from the microinstruction register 518 to provide signals (CONTROLS TO AEC) on a bus 590 that interface with the arithmetic element controller unit 10 and control various functions therein as previously discussed. These signals on the bus 590 may be summarized as follows:

| Hardware Function | Comment |
|---|---|
| | AEC CONTROL BY EIU |
| EIU/HALT | A single clock-time pulse that resets the AEC RUN flip-flop. It also resets the program counter in the AEC to zero. RUN being false inhibits the AEC program counter from the incrementing. |
| EIU/START | This single clock-time pulse loads the program counter from the AGBUS and turns on the RUN flip-flop to start program execution. |
| | MULTIPLEXED CONTROL OVER THE AEC PROGRAM COUNTER |
| EIU/PCEN | Enable EIU to control the AEC program counter. |
| EIU/PCL | Load the AEC PC from the AG BUS when EIU/PCEN is true |
| EIU/PCINCR | Increment the AEC PC when EIU/PCEN is true. |
| EIU/WPMLSH | Write AG BUS into program memory halfword. The 16 LSH bits are written into when EIU/PCEN is true. |
| EIU/MPMMSH | Write AGBUS into program memory halfword. The 16 MSH bits are written into when EIU/PCEN is true. |
| | PROGRAM MEMORY CONTROLS |
| EIU/PMDR | Enable left or right half of PMDR to the AGBUS. |
| EIU/MSH | When 1 MSH of PMDR to AGBUS. When zero LSH to AGBUS. Meaningful only if EIU/PMDR is true. |
| EIU/CS | When true the EIU has control over CS memory multiplexed controls. When false, the control is from the microcommand register. |
| EIU/LCSAR | When true, the coefficient store address register is loaded from the tri-state AGBUS. But only |

| Hardware Function | Comment |
|---|---|
| | -continued |
| | if EIU/CS is true. |
| EIU/CSACO | Two control lines which control |
| EIU/CSACI | holding, loading, incrementing, or decrementing the CSAC in the AEC. Meaningful only when EIU/CS is equal to a one. |
| EIU/CSW | Write contents of AGBUS into CS memory. Meaningful only when EIU/CS is equal to a one. |
| | BREAKPOINT ADDRESS AND BREAKPOINT LOOP COUNTER IN PM |
| EIU/LBPAR | Load breakpoint address register from AGBUS. |
| EIU/LBPLC | Load breakpoint loop counter. |
| | ADDRESS GENERATOR |
| EIU/AGOFF | Remove AG from AGBUS. |

All of these signals are applied on the 17-bit composite lead or bus 590 to the various units of the arithmetic element controller 10.

Referring now to FIG. 25, the device interface control unit 531 introduced in FIG. 21 in the EWS access controller 71 allows the controller 71 to communicate with the device interfaces via a general device interface bus structure. A device input register (DIR) 594 and a device output register (DOR) 596 are coupled between a data bus 593 and the CT bus 530. Device address (ADDR) REGISTER (DAR) 598 is coupled between a 4-bit DEV SEL ADDRESS lead 560 and the CT BUS 530. The 16-bit bidirectional data bus 593 allows the EWS access controller 71 to send command information to and receive status information from the device interfaces and the 4-bit address lead 560 allows the EWS access controller 414 to select a particular device according to the following:

| Address | Device Interface |
|---|---|
| 0 | Device Interface 0 |
| 1 | Device Interface 1 |
| 2 | Device Interface 2 |
| 3 | Device Interface 3 |
| 4 | Device Interface 4 |
| 5 | Device Interface 5 |
| 6 | (Undefined) |
| 7 | (Undefined) |

A device control register 602 provides signals CLEAR, DATA AVAIL, CMD AVAIL, DATA REQ and STATUS REQ, which control signals are applied to the device interfaces as well as to a PROM 604. The 6-bit control bus allows data, commands and status to be transferred via the data bus. The CLEAR signal allows the EWS access controller 71 to clear all device interface independent of the 4-bit address bus 560. The PROM 604 also receives a signal ACK which allows the register 602 to be locked with its present values. A DI CONTROL signal of 3-bits is received from the microinstruction register 518 providing states that defines LOAD CMD INTO DOR, READ STATUS, READ DATA and LOAD DATA INTO DOR. The PROM 604 applies 5-bits to the device control register 602, 2-bits of LOAD and ENB DIR to the register 594, 2-bits of LOAD and ENB DOR to the device output register 596 and 1-bit of LOAD DAR to the device address register 598. A JK flip-flop 606 receives a signal from the PROM 604 for synchronizing and shaping a signal DI DEV ACK which is applied to the test input MUX 522 of FIG. 21.

Referring now to FIG. 26, the portion of the CE interface 406 forming the programmed I/O bus as discussed relative to FIG. 18 receives commands from the CE unit by way of the programmed I/O bus of the CE unit and loads them into a CE input register (CEIR) 610. This register after holding the data applies it to the CT bus 530 for distribution as determined by a CE command. As explained relative to Table 7 the first word into the register 610 from the CE computer is always a command word. As a function of this command word, the system can put the CT bus 530 under microinstruction register control and the address from the mapping prom 536 of FIG. 21 is interpreted as a starting point for a micro routine to execute the CE command. The CE computer then sends all instruction and the interface unit executes commands for the remainder of the micro routines. A control logic unit 612, upon receiving a CEI control signal from the microinstruction register 518 applies a CE CMD INT REQ signal to the priority interrupt unit 508 of FIG. 21. When the interrupt is recognized, the EWS access controller unit 71 decodes a command and performs the necessary operation to execute that command. These operations could involve: (1) reading additional control words that define the command into the CE input register 610; (2) outputting data from internal processor memories to the CE computer via a CE output register (CEOR) 614; (3) reading data from the CE computer via the CE input register 610; (4) outputting AEC status to the CE via the CE output register 614; and (5) initializing the CE interface unit's DMA logic to perform a data transfer between the CE memory and the EWS units. The allowable CE command of Tables 7 and 8 are summarized in Table 14.

TABLE 14

CE COMMANDS

| Command | Definition | Command Code | Modifier |
|---|---|---|---|
| HALT | Halt | 0 | — |
| EXP | Execute program | 1 | — |
| (Undefined) | | 2 | — |
| (Undefined) | | 3 | — |
| SBP | Set break-point | 4 | — |
| LPMCE | Load program memory from CE (via PIO bus) | 5 | — |
| LCSCE | Load coefficient store from CE (via PIO bus) | 6 | — |
| LPMDMA | Load program memory (via DMA bus) | 7 | — |
| LCSDMA | Load coefficient store (via DMA bus) | 8 | — |
| RPM | Read program memory to CE (via PIO bus) | 9 | — |
| RREG | Read AEC registers to CE (via PIO bus) | A | — |
| RCS | Read coefficient store to CE (via PIO bus) | B | — |
| RCSDMA | Read coefficient store (via DMA bus) | C | — |
| (Undefined) | | D | — |
| (Undefined) | | E | — |
| RSTAT | Read AEC status register | F | 0 |
| SSTAT | Set CE status | F | 1 |
| LEWS | Load EWS from CE | F | 2 |
| REWS | Read EWS to CE | F | 3 |
| LPMEWS | Load PM from EWS | F | 4 |
| LCSEWS | Load CS from EWS | F | 5 |
| SCSEWS | Save CS in EWS | F | 6 |
| LMP | Load EWSAC MPM (via PIO bus) | F | 7 |

TABLE 14-continued

CE COMMANDS

| Command | Definition | Command Code | Modifier |
|---|---|---|---|
| RMPM | Read EWSAC MPM (via PIO bus) | F | 8 |
| LCT | Load EWSAC CT (via PIO bus) | F | 9 |
| RCT | Read EWSAC CT (via PIO bus) | F | A |
| (Undefined) | | F | B |
| (Undefined) | | F | C |
| (Undefined) | | F | D |
| (Undefined) | | F | E |
| (Undefined) | | F | F |

A CE interface control unit 616 transfers control signals from and to the programmed I/O bus and to the control logic unit 612. The unit 616 receives output data/status generate interrupt signals and provides CMD IN DATA IN INT PROCESSED DATA READ signals. The control logic unit 612 also provides CEI DMA DB signals to the test condition MUX 522 which are further defined as DATA AVAIL IN CEIR, DATA READ FROM CEOR and CE INT PROCESSED.

Control from the microconstruction register is a 3-bit signal CEI CONTROL which defines LOAD CEOR WITH DATA, LOAD CEOR WITH STATUS, READ COMMAND FROM CEOR, READ DATA FROM CEIR and GENERATE CE INTERRUPT.

Referring now to FIG. 27 the CE interface unit 406 includes a CE interface DMA bus unit 620 for providing data transfers between the CE computer and external interface unit via the DMA bus 410 (FIG. 18). A DMA control section 620 includes a DMA interface control logic unit 624 and a CE memory address counter 626 to provide the interface with the DMA bus and the EWSDI control section 628 which interfaces with the EWS data interface units 412 through the data BUS1. A data storage section 630 includes a 64-word FIFO storage and I/O register 632 to accommodate the difference in data transfer rates, the latter being controlled by a FIFO control unit 634. Both data in and data out are handled by the storage section 630 so that data is transferred between the CE data bus, data BUS1 and the CT bus 530. The EWSDI control section 628 includes an AE select register logic unit 638 which provides control to the EWS data interface unit 412 and a control unit 630 providing additional controls with the data interface units. A sequential control logic unit 642 applies signals EWS INPUT REQ and EWS OUTPUT REQ to the EWS access controller logic, and receives a signal EWS ACC ACK therefrom. Also, the logic unit 642 receives controls from the microinstruction register 518 CE/DMA which define LOAD CE MEM ADDR REG, load AE SELECT REG, LOAD FIFO rom CT bus, READ FIFO TO CT BUS, INITIATE DMA TRANSFER, LOAD WORD COUNTER and TERMINATE DMA TRANSFER. The INITIATE DMA TRANSFER control selectively allows a CE to or from EWS transfer, CT to or from EWS transfer, CE to or from CT transfer and EWS to EWS transfer. The control logic unit 642 also sends a 2-bit signal CEI to the test condition MUX 522 the 2-bits indicating BUSY, FIFO FULL and FIFO EMPTY. Thus, the control logic responds to commands from the EWS access controller 414 to initiate a data transfer between, (1) the CE and the EWS units, (2) the CT bus and the EWS units, (3) the CE and the CT bus, and (4) the EWS units. Other signals provided by the sequential control logic unit 642 are CONTROL DMA CONTROL SECT, CONTROL DATA STORAGE SECT and CONTROL EWSDI CONTROL SECTION. A word counter 644 counts the data words received from the CT bus 530 and applies a signal to the sequential logic unit 642 indicating that four 16-bit words have been transferred.

Figure 28:
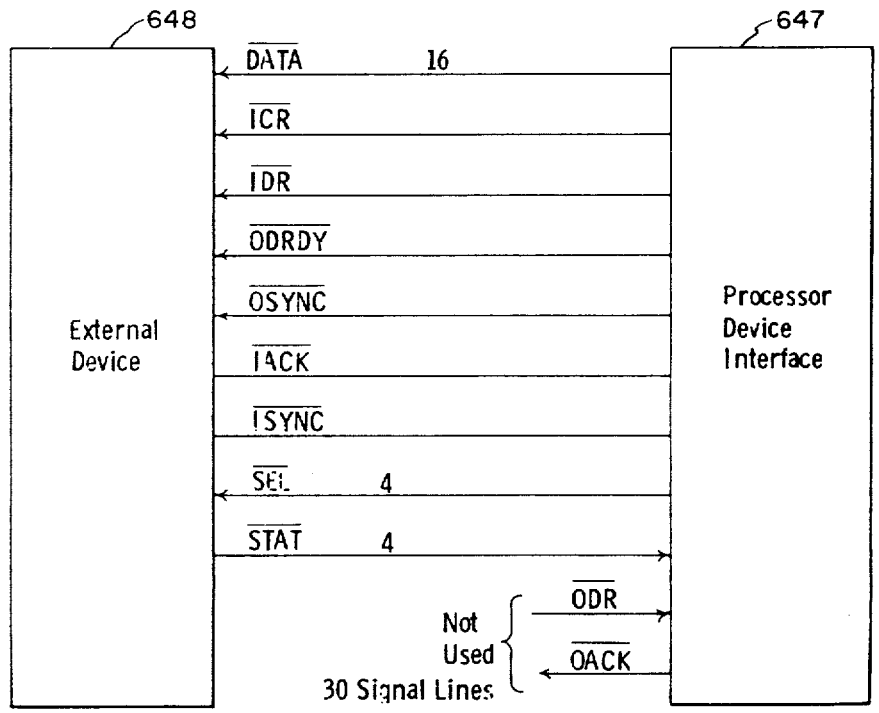
FIG. 28 is a schematic block diagram of the device interface (DI) to external device connections of FIG. 18.

Referring now to FIG. 28, the device interfaces such as 400, 402 or 404 are shown as a general unit 647; these interfaces allowing an external device 648 to store data into the EWS memories and/or read data from the EWS memories. The Data is transferred via a 16-bit bidirectional data bus. A 64-word FIFO data buffer shown in FIG. 19 is provided to accommodate the difference between the data transfer rates to and from the external device 648 and a rate to and from the extended work store memories. As is well known in the art, synchronization capabilities are available to allow an external device to input or receive a sequence of data samples that correspond to a finite set of channels or beams in a time multiplexed manner. Control signals are provided that allow an external device to be an identical device interface so data generated in one processing system in accordance with this invention may be transferred to another similar processing system for further processing. Table 15 summarizes the device interface signal lines including data and control signals as utilized between the external device 648 and the device interface 400 in an illustrative example.

TABLE 15
DEVICE INTERFACE SIGNALS

| Signal Line | Mnemonic | Definition |
|---|---|---|
| Data | DATA00-15 | A 16-bit, bidirectional, tri-state data bus. DATA00 is the MSB DATA 15 is the LSB. |
| Input Control Data Request | $\overline{ICR}$ | A signal, unidirectional input control data request control signal. This signal is generated by the device interface to indicate that control data is requested from the external device. The external device is expected to respond by placing valid control data on the data bus and then activating the input acknowledge ($\overline{IACK}$) signal. $\overline{ICK}$ is not used if the external device is another Minipro). |
| Input Data Request | $\overline{IDR}$ | A single, unidirectional input data request control signal. This signal is generated by the device interface to indicate that data is requested from the external device. The external device is expected to respond by placing valid data on the data bus and then activating the input acknowledge ($\overline{IACK}$) signal. |
| Output Data Ready | $\overline{ODRD}$ | A single, unidirectional output data ready control signal. This signal is generated by the device interface to indicate the information on the data bus is valid output data. The external device is expected to respond with an input acknowledge ($\overline{IACK}$) signal when it has accepted the data. ($\overline{ODRDY}$ is not used if external device as another Minipro, see definition of $\overline{ODR}$). |
| Output Synchronization | $\overline{OSYNC}$ | A single, unidirectional output synchronization control signal that is activated by the device interface during an output data transfer whenever the information on the data bus is a sample from the first channel. The external device can use this signal to synchronize its internal operation with that of Minipro. The output synchronization signal is activated during the time that valid information is on the data bus. |
| input Acknowledge | $\overline{IACK}$ | A single, unidirectional input acknowledge signal that is generated by the external device in response to the device interface's $\overline{ICR}$, $\overline{IDR}$, and $\overline{ODRDY}$ control signals. This acknowledge signal must remain active until the appropiate control signal is deactivated by the device interface. |
| Input Synchronization | $\overline{ISYNC}$ | A single, unidirectional input synchronization control signal that is activated by the external device during an input data transfer whenever the information on the data bus is a sample from the first channel. The device interface can use this signal to synchronize its operation with that of the external device. The input synchronization signal is activated during the time that valid information is on the data bus. |
| Output Data Request | $\overline{ODR}$ | A single, unidirectional output data request control signal that is activated by an external device (specifically another Minipro device interface) to indicate that data is requested from the device interface. The device interface responds by placing valid data on the data bus and then activating the output acknowledge ($\overline{OACK}$) signal. ($\overline{ORD}$ is not used of the |

TABLE 15-continued
DEVICE INTERFACE SIGNALS

| Signal Line | Mnemonic | Definition |
|---|---|---|
| | | external device is not another Minipro; see definition of $\overline{ODRDY}$). |
| Output Acknowledge | $\overline{OACK}$ | A single, unidirectional output acknowledge signal that is generated by the device interface in response to the external device $\overline{ODR}$ control signal. This acknowledge signal remains active until the ODR signal is deactivated by the external device. ($\overline{OACK}$ is not used if the external device is not another Minipro.) |
| Select | $\overline{SEL0-3}$ | A 4-bit, unidirectional, control bus whose state is valid during input and output data transfers. The device interface can be programmed to generate various states as required by a particular external device. |
| Status | $\overline{STAT0-3}$ | A 4-bit, unidirectional, control bus whose state should be valid during input and output data transfers. The device interface can be programmed to sample and test the $\overline{STAT}$ lines during a data transfer. |

Referring now also to FIG. 29, the device interface unit 647 illustrative of the other device interfaces such as 402, 403 and 404 as well as device 2, 3 and 4 (FIG. 18) will be explained in further detail. The device interface unit as was also discussed relative to FIG. 19 consists of four main sections; a FIFO data buffer and control section 651 including a FIFO data buffer 652 and a data buffer control unit 654, an EWS data sequencer unit 656, an external device data sequencer unit 658 and a device interface controller unit 660. It is to be understood that the device interface as shown is only an illustration of a type that may be utilized which type is well known in the art, and the invention is not to be limited to any particular interface structure. A 64-word by 16-bit FIFO data buffer 652 either receives data from an external device, accumulates at least two N-words where N=the number of AE units, and then outputs a block of two words to the EWS data interfaces, or receives data from the EWS data interface units and then outputs the data to the external device such as 648 (FIG. 28). The direction of transfer is specified by the device interface controller 660, receiving DATA, DEV SEL ADDR and CONTROL signals from the EWS access controller 71. The direction of transfer cannot be changed unless the FIFO is empty. The FIFO data buffer 652 receives signals SHIFT IN and SHIFT OUT from the data buffer control unit 654 and transfers signals IN READY and OUT READY to the data buffer control unit 654. The data buffer control unit 654 receives LOAD/UNLOAD signals from the EWS data sequencer 656 and transfers a word AVAIL signal thereto. Also the data buffer control unit 654 receives a LOAD/UNLOAD signal from the external device data sequencer 658 and applies a WORD AVAIL signal to the sequencer 658. Data buffer supplies a signal BUFF STATUS to the controller 660 and receives signals XFER DIRECTION and RESET from the controller 660. It is to be noted that the device interface controller 660 can monitor the FIFO data buffer status (either full or empty) at any time that it desires. Thus, the FIFO data buffer control logic unit 654 responds to signals from both the external device data sequencer 658 and the EWS data sequencer 656 to either load or unload data into or from the FIFO data buffer 652. The device interface control bus 660 is responsible for keeping track of how many words have been loaded and also then removed from the FIFO buffer 652 at any particular point in time. The control logic of the buffer control unit 654 informs the two sequencers 656 and 658 when a word is available in the FIFO to be output by the signal WORD AVAIL.

The external device data sequencer 658 activates the signal lines to the external device as previously discussed to transfer data between an external device and the FIFO data buffer 652. The data transfers are performed in response to a command from the device interface controller 660, the signal being COMMAND. The external device data sequencer 658 also receives a signal WORD COUNT and transfers the signals BUSY, SYNC and STAT to the device interface controller 660. The sequencer 658 supplies to the external device, the signals $\overline{ICR}$, $\overline{ODRDY}$, $\overline{SEL}$, $\overline{IDR}$, $\overline{OACK}$, and $\overline{OSYNC}$ and receives from the external device, the signals $\overline{STAT}$, $\overline{IACK}$, $\overline{ISYNC}$ and $\overline{ODR}$. The set of allowable command is defined in Table 16.

TABLE 16
COMMANDS FROM DEVICE INTERFACE CONTROLLER 660 TO EXTERNAL DEVICE DATA SEQUENCE 658

| Command | Word Count | Description |
|---|---|---|
| RCW | N | Read N control words from external device into FIFO. |
| RDATA | N | Read N data words from external device into FIFO. The first word accepted from external device must be one for which ISYNC is activated. Set SYNC flag if and only if $\overline{ISYNC}$ is activated for the first data word. |
| RDATB | N | Read N data words from external device into FIFO. set SYNC flag if and only if $\overline{ISYNC}$ is activated for the first data word. |
| ODATA | N | Output N data words from FIFO to external device that is not a Minipro. |
| ODATB | N | Same as ODATA except $\overline{OSYNC}$ is activated during transfer of first word. |
| ODATC | N | Output N data words from FIFO to external device that is a Minipro. |
| ODATD | N | same as ODATC except $\overline{OSYNC}$ is activated during transfer of first word. |
| SPLAG | N | Set 4-bit flags register to state "N". |

Basically the device interface controller 660 can command the external device data interface unit 658 to read or output up to 16 data words from or to the external device. External device data sequencer performs the necessary operations to execute the command independent of the device interface controller 660, the latter controller determining when the BUSY command has been executed by monitoring the BUSY, SYNC signal of the external device data sequencer 658. The operations initiated by each of the commands of Table 16 are defined as follows:

1. Control/Initialization Subroutine (initiated by RCW command)
   (a) Activate $\overline{ICR}$ to device.
   (b) Read control word when $\overline{IACR}$ is activated by device.
   (c) Repeat (a) and (b) to read N control words.
2. Input Subroutine A (initiated by RDATA command)
   (a) Activate $\overline{IDR}$ to device.
   (b) Read first data word when $\overline{ISYNC}$ and $\overline{IACK}$ is activating by device. Set SYNC flag.
   (c) Activate $\overline{IDR}$ to device.
   (d) Read data word when $\overline{IACK}$ is activated by device. Clear SYNC flag if $\overline{ISYNC}$ is activated during date word transfer.
   (e) Repeat (c) and (d) until all N words have been input from device.
3. Input Subroutine B (indicate by RDATB command)
   (a) Activate $\overline{IRD}$ to device.
   (b) Read data work when $\overline{IACK}$ is activated by device. If $\overline{ISYNC}$ is only activated on first data word transfer, then set SYNC flag.
   (c) Repeat (a) and (b) to read N data words.
4. Output Subroutine A (initiate by ODATA command)
   (a) Activate $\overline{ODRDY}$ to device.
   (b) Data had been read by device when $\overline{IACK}$ is activated by device.
   (c) Repeat (a) and (b) to output N data words.
5. Output Subroutine B (initiated by ODATB command)
   (a) Same as 4.(a) except $\overline{OSYNC}$ is activated on first data word transfer.
   (b) Same as 4.(b).
   (c) Same as 4.(c).
6. Output Subroutine C (initiated by ODATC command)
   (a) When $\overline{ODR}$ is activated by device, place data on $\overline{DATA}$ lines.
   (b) Acitvate $\overline{OACK}$ to device.
   (c) Repeat (a) and (b) to output N data words.
7. Output Subroutine D (initiated by ODATD command)
   (a) Same as 6.(a).
   (b) Same as 6.(b) except $\overline{OSYNC}$ is activated during transfer of first data word.
   (c) Same as 6.(c).

The EWS data sequencer 656 activates the signal lines to the EWS access controller 71 in the proper manner to transfer a block (usually 2N words, N equalling the number of AE units) to the registers in the EWS data interface unit. The data transfers are performed in response to the COMMAND signal from the device interface controller unit 660. The sequencer 656 receives WORD COUNT from the controller 660 and applies the signal BUSY to the controller 660. Signals transferred to the EWS access priority and request logic unit are EWS INPUT REQ and EWS OUTPUT REQ. A signal ACCESS ACK is received from the priority and request logic unit in the EWS access controller 71. The signal EWS SELECT which is a number defining an EWS unit memory, a LOAD signal and an UN-LOAD signal are applied to the extended work store units.

The set of allowable commands, from the device interface controller 660 to the EWS data sequencer 656 that allows the sequencer 656 to perform data transfers is as follows:

| Command | Word Count | Description |
| --- | --- | --- |
| WEWS | N | Read N data words from FIFO, transfer them to the registers on the EWSDI boards, and store them in EWS. The first two words should be written in "logical" EWS0, the second two into "logical" EWS1, etc. (The N data words must be in the FIFO prior to issuing this command.) The maximum allowable value for N is 2 times the number of non-redundant AEs. |
| REWS | N | Read N data words from EWS into registers on the EWSDI boards and then load them into the FIFO. The first two words loaded into the FIFO should be from "logical EWS0", the next two from "logical EWS1", etc. (N empty locations must be available in the FIFO prior to issuing the command.) The maximum allowable value for N is 2 times the number of nonredundant AEs. |
| AEFAIL | N | Specifies that AE number N has failed and that the redundant AE should be used in data transfers rather than AE number N. |
| SELEWS | N | Specifies that the first two words of a data transfer should be read from EWS number N. Succeeding pairs of words will be read from EWS number N+1, N+2, etc. Normally the SELEWS command is issued immediately after a WEWS or a REWS command. |

Figure 30:
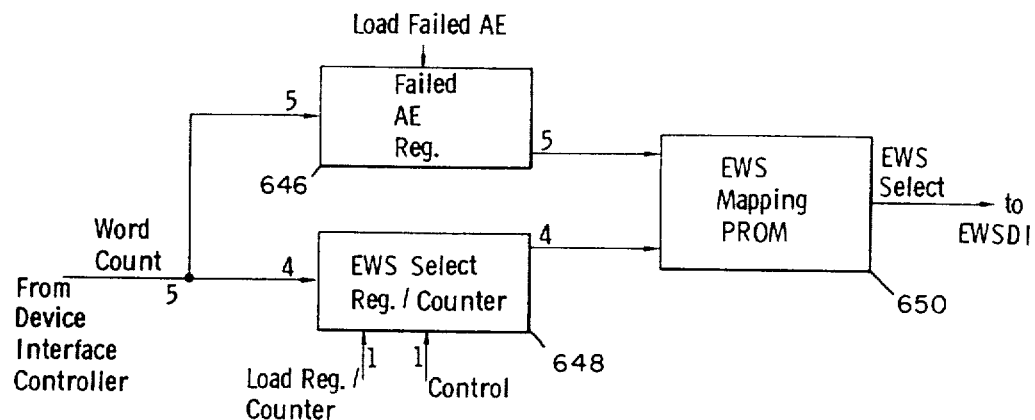
FIG. 30 is a schematic block diagram of the logic arrangement in the EWS data sequencer of FIG. 29 for controlling a failed and a redundant arithmetic element unit or extended work store unit.

The operations initiated by each of the device interface controller commands is described as follows:

| EWS DATA SEQUENCER SUBROUTINES |
| --- |
| 1. Output Subroutine (initiated by WEWS command)<br>(a) Activate EWS access request (write cycle)<br>(b) When EWS access request has been granted, read N words from FIFO and output them to the N registers on the EWSDI boards. (Once in the registers on the EWSDI boards, the N words are automatically written into the EWSs). |
| 2. Input Subroutine (initiated by REWS command)<br>(a) Activate EWS access request (read cycle).<br>(b) When EWS access request has been granted, read N words from the N registers on the EWSDI boards and load them into the FIFO. |
| 3. Failed AE subroutine (initiated by AEFAIL)<br>Load the number of the failed AE into a 5-bit failed AE register 646 (FIG. 30). This register modifies EWS select outputs to the EWSDIs in the event an AE has failed. |
| 4. Select EWS Subroutine (initiated by SELEWS command)<br>Load the EWS select register/counter with the 4-bit code designating the EWS to be used during the transfer of the first two words of an N-word transfer specified by a WEWS or a REWS command. The actual EWS selected depends on the contents of the failed AE register 646 (FIG. 30) and an EWS mapping PROM 648 (FIG. 30). If a transfer involves more than two words, then the EWS data sequencer will select the EWS from which the next two words will be transferred by incrementing the EWS select register/countor. |

It is to be noted that the AEFAIL specifies that a certain number N arithmetic element or EWS unit has failed and that the redundant arithmetic element unit should be utilized rather than the arithmetic element number N.

Referring now also to FIG. 30 which is the logic arrangement to accommodate a failed AE in the EWS data sequencer 656, the signal WORD COUNT which is the starting EWS number is applied to the failed AE register 646 and to the EWS select register counter 648. The signal EWS SELECT which is applied to the EWS data interface unit is provided by an EWS mapping PROM 650 which receives from the failed AE register 646 a 5-bit number, the most significant bit being a ZERO in absence of failure and being a ONE in the presence of an AE unit failure and the four least significant bits representing the number of the AE unit that has failed. The address from the counter 648 is the number of each EWS unit and is combined with the five least significant bits from the register 646 to address the PROM 650. When a failed AE number is in the register 646, the redundant AE unit which may be AE15 is substituted as an EWS select number to the EWS data interface unit. Thus, the AEFAIL command and the EWS mapping PROM 650 allow the EWS data sequencer 656 to automatically isolate a failed AE (or the EWS associated with that AE) from the system. A performance monitoring fault location (PMFL) program running in the AEC determines that an arithmetic element or its associated extended work the store unit has failed. The arithmetic element controller will then notify the device interface of such a failure. The device interface controller will then execute the AEFAIL command thereby causing the number of the failed AE to be loaded into the 5-bit failed AE register 646 via the WORD COUNT lines. The signal LOAD FAILED AE loads COUNTER and signals CONTROL respectively load and control the register/counter 648. The EWS mapping PROM 650 will now bypass all references to the failed arithmetic element, i.e. no data will be read from or written into the EWS unit associated with the failed AE. This operation assumes that redundant AE which in the illustrated arrangement is AE15 has been provided, the normal operation being with 15 arithmetic element units (AE0-AE14) in the illustrated system.

To further understand the operation of the units of FIG. 30, the following Table 17 lists the failed AE number or none, the failed AE register 646 inputs, the EWS select register counter 648 input and the EWS SELECT output from the PROM 650.

TABLE 17

| Failed AE | Failed AE Register Inputs Bit: | | | | | EWS Select Reg/Counter Inputs Bit: | | | | EWS Select Outputs Bit: | | | |
|---|---|---|---|---|---|---|---|---|---|---|---|---|---|
| | 0 | 1 | 2 | 3 | 4 | 0 | 1 | 2 | 3 | 0 | 1 | 2 | 3 |
| NONE | 0 | — | — | — | — | 0 | 0 | 0 | 0 | 0 | 0 | 0 | 0 |
| AE0 | 0 | — | — | — | — | 1 | 1 | 1 | 1 | 1 | 1 | 1 | 1 |
| | 1 | 0 | 0 | 0 | 0 | 0 | 0 | 0 | 0 | 1 | 1 | 1 | 1 |
| | | | | | | 0 | 0 | 0 | 1 | 0 | 0 | 0 | 1 |
| AE1 | 1 | 0 | 0 | 0 | 0 | 1 | 1 | 1 | 1 | 1 | 1 | 1 | 1 |
| | 1 | 0 | 0 | 0 | 1 | 0 | 0 | 0 | 0 | 0 | 0 | 0 | 0 |

TABLE 17-continued

| Failed AE | Failed AE Register Inputs Bit: | | | | | EWS Select Reg/Counter Inputs Bit: | | | | EWS Select Outputs Bit: | | | |
|---|---|---|---|---|---|---|---|---|---|---|---|---|---|
| | 0 | 1 | 2 | 3 | 4 | 0 | 1 | 2 | 3 | 0 | 1 | 2 | 3 |
| | | | | | | 0 | 0 | 0 | 1 | 1 | 1 | 1 | 1 |
| | | | | | | 0 | 0 | 1 | 0 | 0 | 0 | 1 | 0 |
| AE2 | 1 | 0 | 0 | 0 | 1 | 1 | 1 | 1 | 1 | 1 | 1 | 1 | 1 |
| | 1 | 0 | 0 | 1 | 0 | 0 | 0 | 0 | 0 | 0 | 0 | 0 | 0 |
| | | | | | | 0 | 0 | 0 | 1 | 0 | 0 | 0 | 1 |
| | | | | | | 0 | 0 | 1 | 0 | 1 | 1 | 1 | 1 |
| | | | | | | 0 | 0 | 1 | 1 | 0 | 0 | 1 | 1 |
| | 1 | 0 | 0 | 1 | 0 | 1 | 1 | 1 | 1 | 1 | 1 | 1 | 1 |
| AE14 | 1 | 1 | 1 | 1 | 0 | 0 | 0 | 0 | 0 | 0 | 0 | 0 | 0 |
| | | | | | | 1 | 1 | 0 | 1 | 1 | 1 | 0 | 1 |
| | | | | | | 1 | 1 | 1 | 0 | 1 | 1 | 1 | 1 |
| | 1 | 1 | 1 | 1 | 0 | 1 | 1 | 1 | 1 | 1 | 1 | 1 | 1 |
| AE15 | 1 | 1 | 1 | 1 | 1 | 0 | 0 | 0 | 0 | 0 | 0 | 0 | 0 |
| | 1 | 1 | 1 | 1 | 1 | 1 | 1 | 1 | 1 | 1 | 1 | 1 | 1 |

Figure 31:
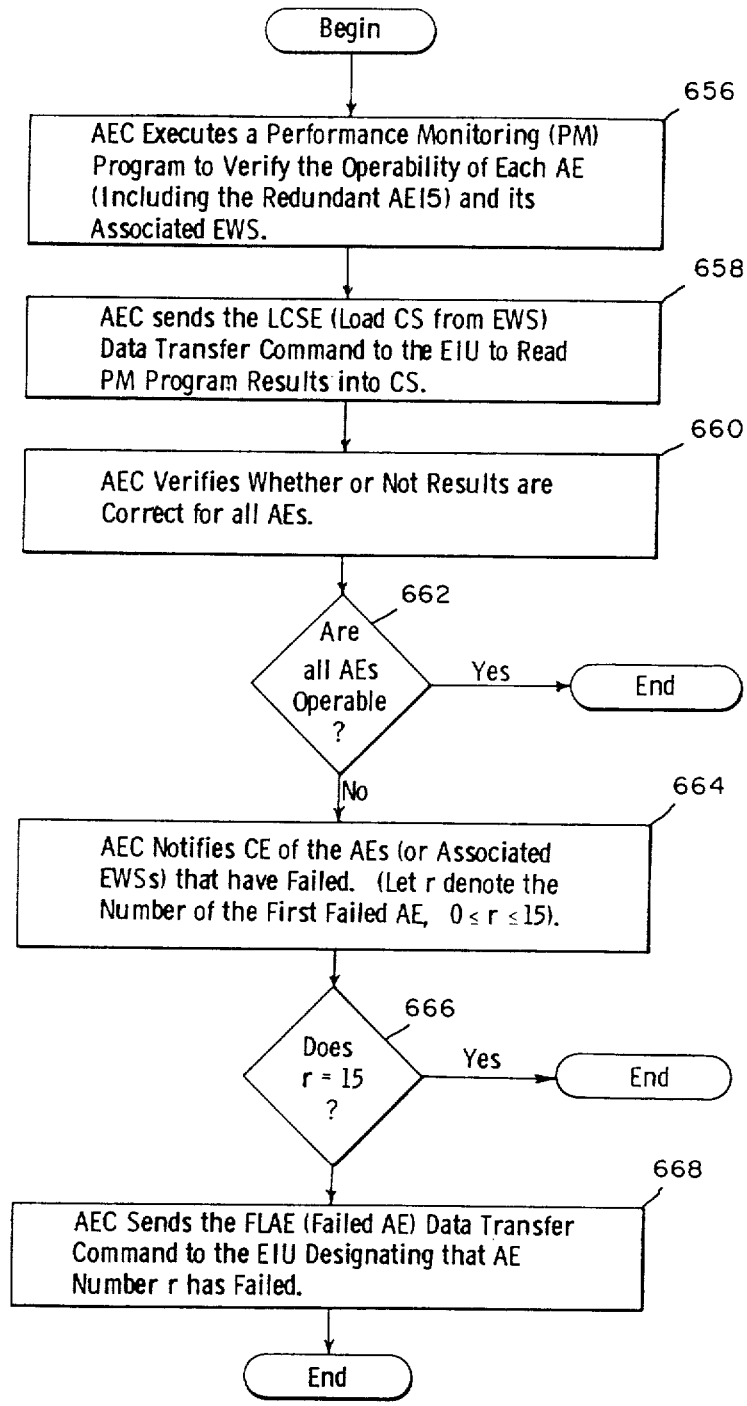
FIG. 31 is a schematic flow chart for explaining the system operation to effectively isolate a failed AE unit.

Referring now also to FIG. 31 which is a flow diagram of the procedure for isolating a failed arithmetic element in a system containing a redundant arithmetic element, the operation begins in box 656 where the arithmetic element controller 10 executes a performance monitor (PM) program to verify the operability of each arithmetic element including the redundant arithmetic element 15 and their associated extended work store memories. The program memory 30 program may be a subset of the real time application program operating on known input data located in the extended work store memories. The program memory 30 then stores the results in known extended work store memory locations. It is to be noted that all arithmetic elements are verified simultaneously. The operation then proceeds to a block 658 where the arithmetic element controller 10 sends the data transfer command LCSE (load CS from EWS) to the external interface unit to read PM program results into the coefficient store memory 32. As can be seen in Table 12 which is a list of the AEC data transfer commands, LCSE allows the AEC to initiate loading its coefficient store from the extended work store memory. The EIU transfers the program results from the extended work stores to the coefficient store 32 in arithmetic element controller 10.

In a block 660 the arithmetic element controller 10 verifies whether or not the results are correct for all arithmetic elements and verification is performed by comparing results with a prior calculated values stored in the coefficient store 32. Operation then proceeds to a block 662 which makes a determination whether or not all arithmetic elements are operable and if the answer is yes, the routine is ended or terminated. If the answer in the block 662 is no, the operation then proceeds to a block 664 where the arithmetic element controller 10 notifies the CE processor of the arithmetic elements (or associated EWSs) that have failed. The number of the first failed arithmetic element may be designated r defined as zero less than or equal r less than or equal 15. Thus, the arithmetic element controller 10 stores a status word denoting the status of each arithmetic element in a predetermined location in all extended work store units. The arithmetic element controller generates a software interrupt to the CE computer and the CE reads the status word from the extended work store units. Operation then proceeds to a block 666 which makes a determination whether r equals 15 and if the answer is yes, a routine is terminated because then only the redundant arithmetic element has failed. If the result of the determination in the block 666 is no, arithmetic element controllers 10 sends the FLAE (failed AE) data transfer command to the EIU designating that AE number r has failed. The command FLAE is further explained in Table 12 and allows the arithmetic element controller to specify one of 16 arithmetic elements having failed. The EWS access controller 71 in the external interface unit passes the command FLAE to each device interface which loads the failed AE number r into its failed AE register 646. The extended work store mapping PROM 650 in each device interface now selects the redundant AE which in illustrative arrangement is AE15 whenever a reference to AE r is made. Thus, all data transfers between an external device and EWS r now employ extended work store unit EWS15. At the conclusion of this operation, the routine ends and is again repeated periodically by the system program which may be stored in the program memory 30.

Figure 32:
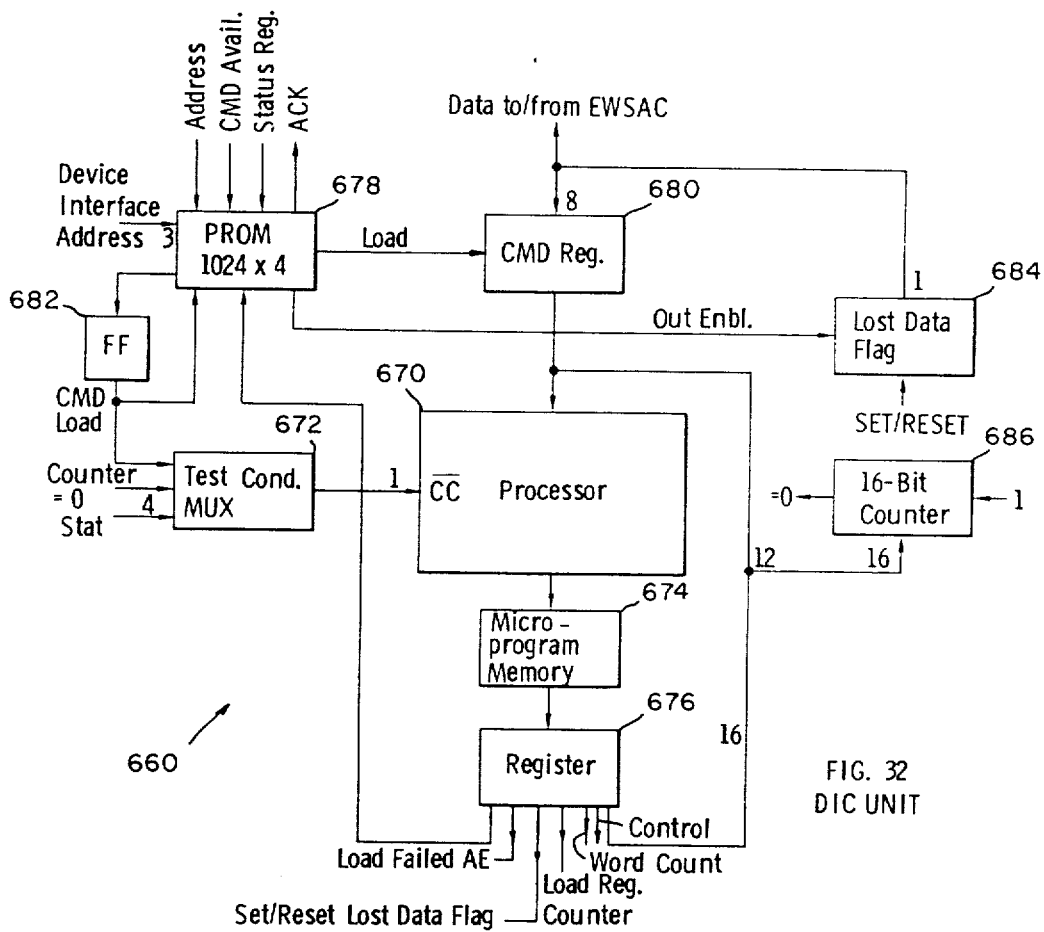
FIG. 32 is a schematic block diagram of the device interface controller (DIC) unit of FIG. 29.

Referring now principally to FIG. 32, the device interface controller 660 responds to commands from the EWS access controller 71 to initiate the data transfers corresponding to a specified pre-microprogrammed mode of operation. The device interface controller 660 includes an AM 2910 microprogram controller or processor 670, a test condition MUX 672, a microprogram memory 674 and a microinstruction (MIR) register 676. A PROM 678 receives the signals ADDRESS, CMD AVAIL, STATUS REQ and ACK, the DEVICE INTERFACE ADDRESS, CMD RECOGNIZED to provide a load signal to a command (CMD) register 680 and a signal to a flip-flop 682 which in turn applies a CMD LOAD signal to the test condition MUX 672 and the PROM 678. The test condition MUX also receives the signals COUNTER=0 and STAT to provide a single input to the microprocessor 670. The command register 680 in response to the LOAD signal applies an address to the microprocessor 670 in response to data from the EWS access controller 71. A lost data flag 684 may be responsive to an OUT ENBL signal from the PROM 678 to indicate that data has been received without sufficient memory for storing therein. The microinstruction register 676 applies a SET/RESET signal to the flag 684 and provides LOAD REG COUNTER, LOAD FAILED AE, WORD COUNT and CONTROL signals to the data sequences of FIG. 30. The arrangement of the device interface controller is similar to that of a processing portion of the EWS access controller 71 in FIG. 21 and will not be explained in detail. A 16-bit counter 686 may be provided to control the transfer of words from the microinstruction register 676 which may have a width of 33-bits, to the input of the microprocessor 670. Once initiated by a command from the EWS access controller 71, the device interface controller 660 issues the appropriate data sequencer commands waiting, of course, for data to be loaded into or read from the FIFO. In essence, the extended work store data buffer map is maintained in the microprogram memory 674. The 16-bit counter 686 along with a 12-bit counter inside the microprogram controller 670 are used to count the number of input words read and the number of blocks. The 8-bit commands received by the command register 680 from the EWS access controller 414 completely defines the mode of operations for the device interface that is, a command selects a particular microprogram to be executed. This 8-bit command is actually specified in control word 4 of the XEDE command sent from the AEC to the EWS access controller 71 to initiate a data transfer. Table 11 defines a format of the XEDE command that the AEC sends to the EIU in order to initiate a data transfer between an external device and the extended work store units. Once a transfer has been initiated, the PDBF, LDBF, RBSW, and RDIS commands can be used to synchronize AEC program execution with data transfers to and from an external device. A 16-bit device interface status word, as shown in Table 18 is maintained in the control table 38 EWS access controller 71 and this status word indicates whether a particular device interface is busy and whether or not a "loss of data" error has occurred during a data transfer. The arithmetic element controller 10 can read this status word by executing the RDIS command.

TABLE 18

DEVICE INTERFACE STATUS WORD

Device Interface Status Word

```
                MSE                            LSB
DEVICE          0                               15
INTER-          |B|B|B|B|B|B|B|B|B|B|B|B|
FACE:            1  2  3  4  5 "DMX"
```

| Device Interface Status Word Bit | Definition | Comments |
|---|---|---|
| B | Busy Bit | The busy bit for a particular device interface or the CEI's DMA logic is set if an ABC command had initiated a data transfer that is currently in progress; the busy bit is cleared when the data transfer completes. |
| E | Error Bit | The error bit is set if during a data transfer an error such as loss of data occurs. |

A 16-bit buffer status word as shown in Table 19 is also maintained in the extended work store access controller 71 controls table and this status word reflects the status (full or empty) of each device interface FIFO data buffer such as 652 in FIG. 29.

TABLE 19

BUFFER STATUS WORD FOR EXTERNAL DEVICE TO EWS DATA TRANSFERS

Buffer Status Word

```
                MSB                            LSB
BUFFER:         0                               15
DEVICE          |1|2|1|2|1|2|1|2|1|2|1|2|
INTERFACE:       0   1   2   3   4   5
```

| Buffer Status Word Bit | Definition | Comments |
|---|---|---|
| BUFFER 1: | Buffer 1 status (full or empty) for the corres- | On input transfers, buffer 1 is set whenever the device inter- |

TABLE 19-continued
BUFFER STATUS WORD FOR EXTERNAL DEVICE TO EWS DATA TRANSFERS Buffer Status Word

```
              MSB                LSB
BUFFER:        0                  15
DEVICE        |1|2|1|2|1|2|1|2|1|2|1|2|
INTERFACE:     0  1  2  3  4  5
```

| Buffer Status Word Bit | Definition | Comments |
|---|---|---|
| | ponding device interface | face has filled buffer 1; it is cleared whenever the ABC has processed the data in buffer 1. On output transfers, buffer 1 is set whenever the ABC fills buffer 1; it is cleared whenever the device interface has output the data from buffer 1. |
| BUFFER 2: | Buffer 2 status (full or empty) for the corresponding device interface | For those external device/EWS date transfers that utilize double buffering, buffer 2 reflects the status of the second buffer. |

The arithmetic element controller 10 can read this status word by executing the RBSW command and can be set or clear the buffer 1 and buffer 2 status flags by executing the LDBF or PDBF commands.

The task of defining the signal processer architecture relative to the signal processing requirement can be done by identifying the key implementation parameters and working the architecture so as to best use its capabilities. For the illustrative system, the limiting factors are: (1) the arithmetic element controller can generate instructions to the arithmetic element at a 5 MHz rate (200 ns per instruction); (2) each arithmetic element can do a 16×16-bit multiply in one 200 ns clock time, a register and an arithmetic logic unit (RALU) instruction (that is, add, subtract, shift) in one clock time (each AE contains two parallel RALUs so that the AE can do two adds per multiply); (3) data can be read from or written into (but not both simultaneously) a work store of the arithmetic element units or extended work store (again not both simultaneously) every 200 ns clock.

The basic architecture is defined by estimating the time loading for each subroutine, linking the subroutines together to get the time loading for a channel of data, combining (usually by time division multiplexing) channels of data to obtain a 60% time loading (allows for system growth) on an individual arithmetic element, and then adding parallel arithmetic element until all channels are processed. The primary feature is that each arithmetic element unit does exactly the same instruction but on different data.

The time loading estimate will determine the number of clock intervals required to perform the specified signal processing functions on the block of data. It is important to recognize that the processing is generally block oriented and not individual sample oriented. The time loading ratio can be calculated by; (1) determining the time required to process a block of data, and (2) dividing that value by the time required to input the data from the sensor or device. An acceptable time loading goal may be 60% at the peripheral level, and no estimates should exceed approximately 75%, for example. The time loading is controlled by modifying the number of channels being processed in each arithmetic element and changing the signal processing block line.

A time loading estimate is usually made by using a signal flow diagram and calculating the number of multiply, RALU operation over 2, and memory accesses needed to do the basic simple steps for each algorithm. These basic steps usually comprise the most significant parts of the altorhithm. The number of clocks for the most limiting parameter is now assigned to that particular block of the flow diagram.

The handling of the data base allocates sections of the work store and extended work store memory to the signal processing functions. The extended work store units are generally used to store raw or unprocessed data to be transferred to the arithmetic element and processed data to be transferred to the user device. In the illustrated system, each extended work store unit has a minimum capacity of 32k by 16-bit words and each arithmetic element unit has its own extended work store unit. The working store is generally used as a temporary storage for partially processed data which is to be combined with other partially processed data at a later time. The working store has an 8k by 16-bit word capacity and is almost never a limiting factor unless large block sizes are utilized. For an illustrated FFT processing operation, a relatively large amount of work store capacity is required due to its general looping nature. Many passes through basic butterfly are required in FFT processing before the final result of data is available.

The arithmetic element controller unit controls movement of data defined by the specific address of the data to be moved and the length of the block of data (number of words) to be transferred. Data transfers are accomplished one word at a time and should be properly organized so as to not limit the processors.

The program memory in accordance with the invention may contain a sequence of 64-bit wide instructions that define the specific application program. The program memory 30 utilizes a subroutine address table (SAT) in the coefficient store unit to identify the starting point and length of each individual subroutine. These subroutines are then linked into signal processing strings by the executive in the program memory which may be controlled by the host CE computer. These subroutines may be stored either in the random access memory or the read only memory portions of the program memory 30. This arrangement is especially suitable when the application requires many modes of operation that use different combinations of a library of subroutines stored in the program memory 30. Thus, the SAT table may be stored in the coefficient store unit and the executive is stored in the program memory. The SAT table is normally in the RAM portion of the coefficient store unit so as to be table programmable and the subroutines are in the PROM portion of the program memory.

An estimate of the program memory sizing may be made by estimating the number of instructions required for each loop in the subroutine, estimating the number of parameters associated with the subroutine and finally estimating the instructions to initialize and terminate the subroutine. A representative estimate for each subroutine can be made by doubling the number of instructions in the loops (this allows for data handling and loop control), assigning eight instructions to each parameter and finally, adding the ten initializing and terminating instructions. Since each instruction represents a line of code to be generated, this is also the estimate of the subroutine microcode programming that is required. A general purpose executive would require about 450 instructions and can be considered as another subroutine. A special purpose executive that sequentially steps through the SAT in an infinite loop is sufficient for many applications and utilizes less instructions. Thus, it can be seen that the processing system of the invention is table programmable by loading tables into the coefficient store memory from the CE computer for defining the subroutines to be followed in the program memory.

The coefficient store unit 32 is a memory used to store program constants to be used in the execution of the application's program and these constants may be in three groups: (1) coefficients used to weight data values, (2) parameters, used to specify the primary variable in a subroutine, and (3) table data, used to identify the specific program memory address of each subroutine and possibly other data base control and mode control variables. The coefficient tables in some arrangement may be associated with subroutines such as a fast Fourrier transform and digital filters and are determined for each processing operation. These coefficient tables are 16-bit words that are entered as data into the coefficient store memory.

The processing system in accordance with the invention is readily programmable utilizing a number of required subroutines by first defining the basic sequence of signal processing operations to be performed. The second step required is to realize the transfer function. The third step is to follow the data flow map and to use data transfer and control management subroutines to control the data flow through the process. The composite set of subroutines define the subroutine table and each of these subroutines must be stored in the program memory before they can be executed. The address, in addition to the address of the parameter table for each, in program memory for these routines is stored in the subroutine address table (SAT) which is input to the coefficient store for use by the table driven executive. If a sequential infinite loop executive is utilized, the subroutine address table must be ordered in the exact order that one wishes the subroutine execution. The fourth step is to define the coefficience needed by the signal processing routines and to place them in the coefficient store table. The coefficient table is made by concatenating the individual coefficient tables of each routine into a large string of data to be loaded into the coefficient store unit 32. The location of the individual tables is required for the executive in the program memory to control use of these coefficients.

The fifth step is to place the control parameters associated with each subroutine in the coefficient store memory 32. The control parameter tables are also stored in coefficient store 32 for use by the executive. Associated with each subroutine are parameters that define the start address and buffer length for both inputting and output data to the extended work store units.

When the subroutine address table, coefficient table and parameter table have been defined, the programming in accordance with this invention has been substantially completed. In order for the processor to execute the algorithm, the user must load the coefficient and parameter tables including the SAT tables into the coefficient store memory 32, load the library subroutines into program memory, load the executive subroutine into program memory, and provide a command to the processor to execute the program starting at the first address of the executive in the program memory. All of these above tasks are executed from the control element or CE processor. It is to be noted that if this data is stored in the nonvolatile read only memory (ROM), execution can be initiated from a control panel (not shown).

Figure 33:
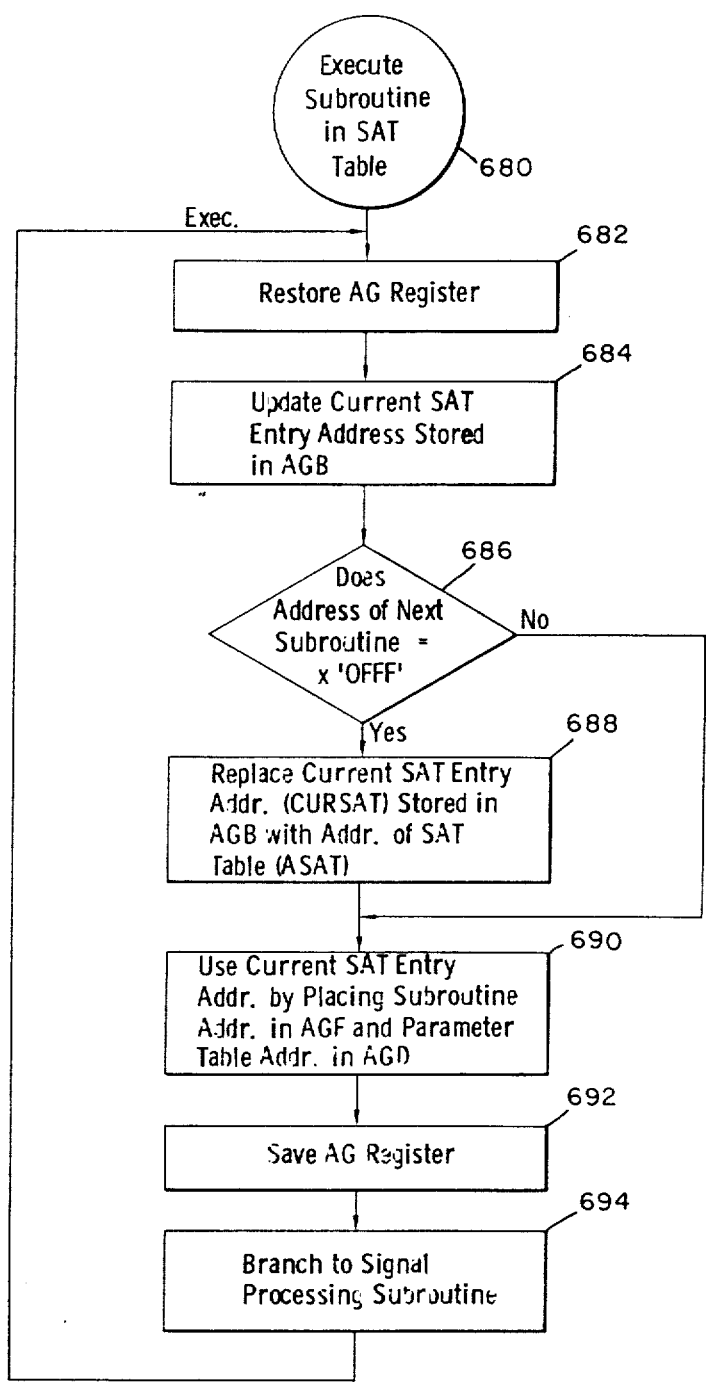
FIG. 33 is a schematic flow chart for explaining the executive control in the arithmetic element controller unit.

Referring now to FIG. 33, a function of the executive is to oversee the transfer of control between the defined signal processing subroutines for the purpose of implementing a signal processing algorithm. This overall process is accomplished through usage of the subroutine address table which contains a listing of the addresses to the applicable signal processing subroutines and the corresponding parameter tables. A basic overview of the executive is to first load program memory, then load parameter tables and then execute the subroutines as defined the SAT table. Thus, program memory for the executive and application subroutines must be initially loaded. In addition, all coefficient store parameter tables must be loaded. The executive then responds to the SAT table and each subroutine is executed in a top down sequential order. After the last subroutine is executed, the first subroutine is again considered. In other words in this illustrative executive, an infinite loop is cycled through the SAT table and the user must stop execution by halting the processor operation. Thus, in one arrangement in accordance with the invention, the executive is basically a simple table driver schedule that controls execution of the signal processing subroutines, as selected by the subroutine address table. The executive is most effective when then following requirements dominate:

(a) only a single SAT table is needed.
(b) execution of the SAT subroutine is in sequential order.
(c) no demand for monitoring the process of loading-/unloading data from extended work store data buffer exists.
(d) the executive will operate in an infinite SAT table so that resulting output may be displayed continuously.

Prior to execution, the coefficient store unit 32 must contain the address of the first subroutine in the SAT table (ASAT) and the current SAT entry address (CURSAT) which is incremented by 2 prior to calling the first subroutine. The flow chart of the executive of FIG. 33 starts with a circle 680 for executing the subroutine defined by the SAT table. The operation then proceeds to a block 682 for restoring the address generator register with only the SAT address (ASAT) and the current SAT address (CURSAT) being saved and stored therein. The operation then proceeds to a block 684 where the current SAT entry address stored in the address generator register is updated followed by preceeding to a block 686. A determination is then made whether the address of the next subroutine equal XOFF, and if the result is yes, the operatio proceeds to a block 688 where the current SAT entry address (CURSAT) is replaced with the address of the SAT table (ASAT). If the result provided by the block 686 is no, the operation passes directly to block 690. Upon completion of the operation of the block 688, the operation also proceeds to the block 690 where the routine uses a current SAT entry address by placing the subroutine address in the address generator register and parameter table address in the address generator device AGD. Operation then proceeds to a block 692 where the contents of the address generation register is saved followed by block 694 for branching to a selected signal processing subroutine. Upon completion of the subroutine of the block 694, the operation then returns to the executive of the circle 680.

Figures 34, 35:
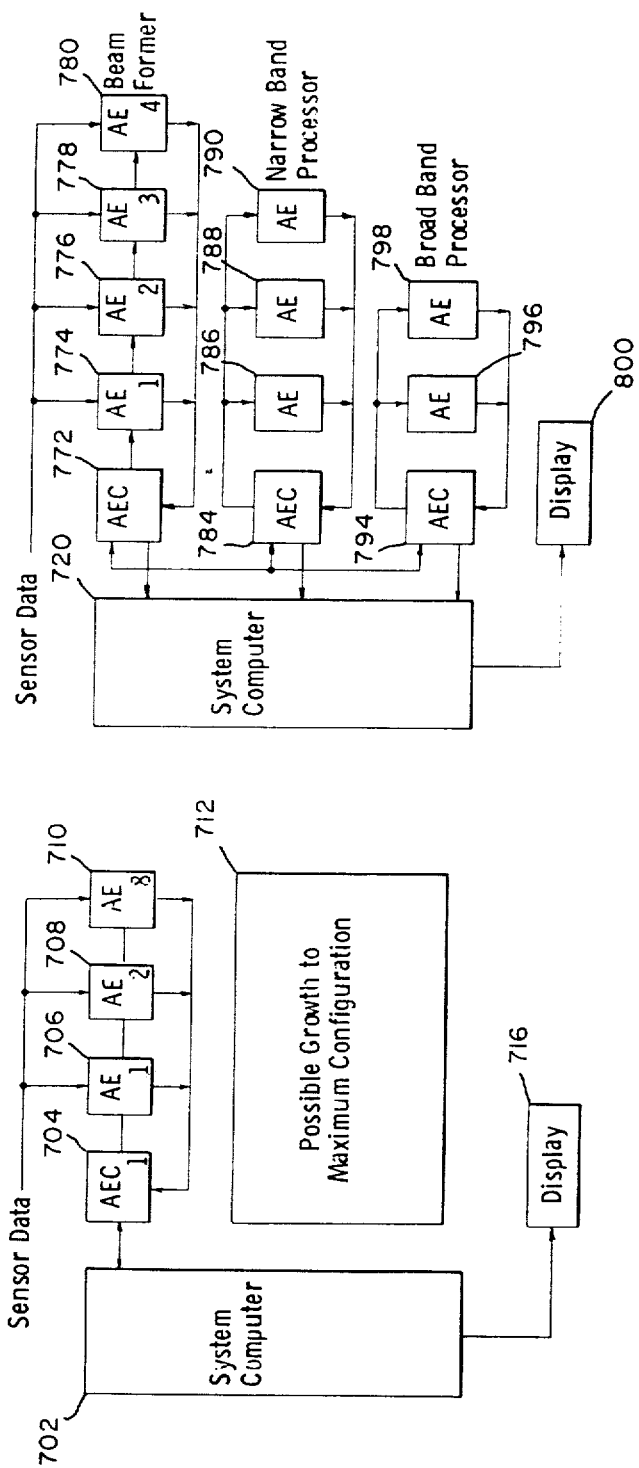
FIGS. 34 and 35 are schematic block diagrams respectively illustrating consolidated and distributed architecture allowed by the modularity of the system in accordance with the invention.

Referring now to FIG. 34 and 35, the modularity of the processor systems in according with this invention allows either consolidated or distributed architecture to be utilized for extended processor systems. An example of a consolidated architecture is in the combination of a computer 702, an arithmetic element controller unit 704 and arithmetic element unit 1-8 such as 706, 708 and 710, all interacting together and with the computer 702 and responding to input sensor data such as from an external device. A box 712 indicates a possible growth to a much larger configuration such as 4 AEC units and 32 arithmetic element. The system computer then provides the results to a suitable utilization unit such as the display 716.

An example of distributed architecture in accordance with the invention in FIG. 35 utilizes a system computer 720, a beam former including an AEC unit 772 and four arithmetic element units 774, 776, 778 and 780 all responding to sensor data. The beam former units, for example, may be in a sonar system receiving data from suitable sensors. A narrow band processor section includes an arithmetic element controller 784, three arithmetic element units 786, 788 and 790. To further illustrate the distributed architecture characteristics of the modular system in accordance with the invention, a broad-band processor then can be provided including an arithmetic element controller 794 and two arithmetic element units 796 and 798. Suitable utilization units such as a display 800 may respond to the system computer 720. Thus, it can be seen that because of the modularity in accordance with the invention that a great number of expanded and expandable architectural configurations can be utilized in accordance with the principles of the invention.

Figure 36:
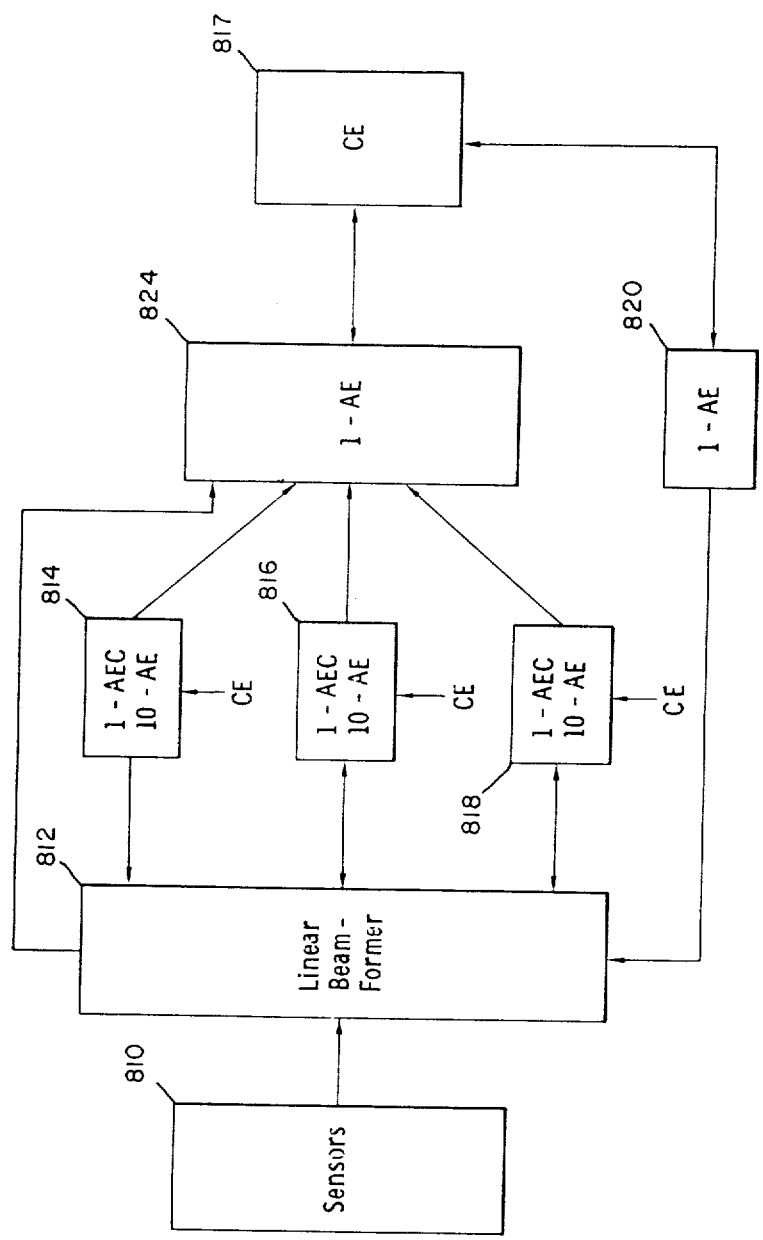
FIG. 36 is a schematic block diagram for further illustrating architectural configurations that may be formed with the processing system concepts in accordance with the invention.

Referring now to FIG. 36, an illustrated processing system which, for example, may be sonar is shown for further indicating the modularity and expandability in accordance with the invention. Sensors 810 provide data to a linear beam former 812, the latter being controlled by processing units 814, 816 and 818, each including one arithmetic element controller unit and ten arithmetic element units with each communicating with a CE host computer 817. The linear beam former 812 also receives processing results from one arithmetic element unit 820. Each of the units 814, 816 and 818 provides processed data to a single arithmetic element unit 824 which in turn, along with the arithmetic element unit 820 communicate with the control element computer 817. Thus, it can be seen that the principles of the invention are expandable not only by the arithmetic element unit expansion for each single arithmetic element controller unit but is equally expandable by combined units or modules containing a fixed or variable number of arithmetic element controller units and arithmetic element units.

Although the invention is not to be limited to any particular size, the modularity in the illustrated arrangement may provides up to or in excess of 16 arithmetic elements per arithmetic element controller unit, multiple arithmetic element controllers per CE computer and extended work store units expandable in 32k word increments up to a maximum of 2048k words per arithmetic elements. The arithmetic element units are illustrated as 16-bit pipeline elements with 5 MHz multipliers and two 5 MHz RALUs and an 8k-word store. In the illustrated arrangement, the arithmetic element controller provides 4k words basic at 4k-word increments times 64-bits in the program memory, 4k words basic at 4k-word increments times 16-bit in the coefficient store and interfaces with the control element. It is also to be understood that the control element can be realized by a general purpose computer or by a suitable control panel all within the scope of the invention.

Thus, there has been provided a novel processing system which is arranged in a modular arrangement so that additional memory controls and memory storage may be added. The system provides the addition of arithmetic elements to each arithmetic element controller for increased calculation power and provides the ability to then add in arithmetic element controllers with their own arithmetic elements all under the control of a control element or a computer. A further feature of the modular system of the invention is the arrangement of the memories of the arithmetic elements and the extended work store memories with the group of either one (WS or EWS units) being addressable simultaneously. In the system of the invention, each arithmetic element unit and the associated extended work store unit forming an independent processing unit or system. Each AEC unit controls the AE units to provide the same computation which may be with the same coefficient except on different data as has been provided to the extended work store memory. A feature in accordance with the invention allows determination of failure of an arithmetic element unit or its associated extended work store unit and simplified and improved substitution of a redundant arithmetic element unit for the failed unit, thus minimizing any delay and minimizing erroneous results in the computations. Another novel item in accordance with the invention is the arrangement of the arithmetic element which matches a multiplier to the arithmetic logic or RALU unit. Also, in accordance with the invention, the AEC unit is provided with an improved architecture to allow simplified and reliable table programming.

What is claimed is:

1. A processor system operable with control element means and external device means, comprising:
   a plurality of arithmetic elements each including calculating means providing a similar arithmetic operation and including a work store unit for storing a pluralitry of addressable data words, said work store unit being coupled to said calculating means for transferring data between said work store unit and said calculating means;
   an arithmetic element controller coupled to said calculating means and to said work store unit of each of said plurality of arithmetic elements for providing control signals thereto common to all arithmetic elements and work store addresses to said work store units common to all arithmetic elements and for developing extended work store addresses and extended work store control signals;
   a plurality of extended work store units for storing a plurality of addressable data words each extended work store unit coupled to the calculating means of an associated arithlmetic element for transferring data between said extended work store unit and said calculating means, and each coupled to said arithmetic element controller for receiving said extended work store addresses and for receiving said extended work store control signals; and an external interface unit coupled to selectively transfer data from and to said control element means, said external device means, said plurality of extended work store units and said arithmetic element controller.

2. The combination of claim 1 in which said control element means provides external control of said processor system and in which said external interface unit further includes access controller means coupled to said arithmetic element controller and to said control element means for receiving addresses from said control element means and from said arithmetic element controller for selectively applying addresses to said plurality of extended work store units for transfer of data between said external interface unit and said extended work store units.

3. The combination of claim 1 in which said external interface unit further includes access controller means and data interface means to transfer data between said extended work store units and transfer of data from said external interface unit to said external device means initiated by a command from said arithmetic element controller, said access controller means after receiving said command, controlling said data interface means to transfer said data independent of said arithmetic element controller and with a priority lower than accesses of each extended work store unit by the corresponding arithmetic element.

4. The combination of claim 1 in which one of said arithmetic elements is a redundant arithmetic element and the associated extended work store unit is a redundant extended work store unit and in which said external interface unit is coupled to said arithmetic element controller and includes means for responding to an arithmetic element failed word from said arithmetic element controller and identifying a failed combination of an arithmetic element and associated extended work store unit, to substitute for data transfer between said associated extended work store unit of said identified failed combination and said external interface unit, said redundant extended work store unit.

5. The combination of claim 1 in which said arithmetic element controller includes a coefficient store unit coupled to said calculating means of each of said arithmetic elements for providing common coefficient data thereto.

6. The combination of claim 5 in which said airthmetic element controller further includes a program memory storing a plurality of subroutines and an executive control routine and said coefficient store unit stores a subrouting address table for controlling access of said subroutines in said program memory.

7. The combination of claim 1 in which said arithmetic element controller includes a program memory, said program memory providing common microinstructions to each of said plurality of arithmetic elements and said plurality of extended work store units.

8. The combination of claim 1 in which said arithmetic element controller includes a program memory providing program instructions and includes an address generator responsive to said program instructions for providing said common work store and said extended work store addresses, said program memory providing program control signals and sequencing control signals to said arithmetic elements and to said extended work store units.

9. The combination of claim 1 in which said arithmetic element controller includes a coefficient store unit and a program memory and in which each of said calculating means includes a multiplier coupled to said coefficient store unit, said work store unit and to said extended work store unit, said multiplier providing a plurality of sequential multiplier products of coefficients received from said coefficient store unit and data received from said work store unit and said extended work store unit in response to respective common work store addresses and said extended work store addresses, first and second register and arithmetic logic units coupled in parallel to an output of said multiplier and a limiter coupled between outputs of said first and second register and arithmetic logic units, to said multiplier, to said work store unit and to said extended work store unit; and delay means included in each second register and arithmetic element logic unit and coupled to said program memory so that for each calculating means, said second register and arithmetic logic unit receives a sequential multiplier product for computation one clock time later than said first register and arithmetic logic unit receives the same multiplier product.

10. The combination of claim 1 in which each of said arithmetic element and associated extended work store units is a combination and in which a predetermined number of said combinations are redundant and in which said external interface unit includes control means coupled to said arithmetic element controller and to said plurality of extended work store units for selecting all extended work store units except said predetermined number of said combinations for data transfer between said external device means and said extended work store units, said airthmetic element controller including means for periodically controlling a test routine of all of said combinations of an arithmetic element and an extended work store unit except said predetermined number of combinations for detecting a failed combination and providing a failed word to said control means defining the extended work store unit of a failed combination, said control means responding to a failed word to transfer data between said external device means and the extended work store unit of a redundant combination rather than the extended work store unit of the failed combination.

11. An arithmetic element responsive to a source of coefficients providing each coefficient during a first and a second clock period, to a source of control data provided during each clock period and to a source of data providing first and second words during respective first and second clock periods comprising:

multiplier means coupled to said source of coefficients, to said source of control data and to said first and second words of said source of data;

first and second arithmetic logic units coupled in parallel to the output of said multiplier means, said first and second arithmetic logic units also being coupled to said source of coefficients and to said source of control data; and one clock period delay mens coupled between said source of control data and said second arithmetic logic unit, said second arithmetic logic unit performing the same arithmetic function as said first arithmetic logic unit except delayed one clock period.

12. A processing system operable with control element means and external device means comprising:
- arithmetic element controller means for providing common control signals, common addresses and common coefficient data;
- an external interface unit coupled to said control element means and external device means, said external interface unit also coupled to said arithmetic element controller means for receiving selected ones of said common addresses;
- a plurality of arithmetic element means each including a work store unit for storing a block of data and each coupled to be responsive to said common addresses and said common control signals, calculating means coupled to said work store unit and responsive to saaid common control signals and said common coefficient data, and a limiter coupled to said calculating means and to said work store unit for providing data thereto, each arithmetic element means performing the same functional operation during the same time period; and
- a plurality of extended work store units each storing a block of data and each coupled to the calculating means of a associated one of said plurality of said arithmetic element means for transferring data to said calculating means, the limiter of each arithmetic element means coupled to the associated extended work store unit for transferring data thereto, each extended work store unit coupled to said external interface unit for responding to the selected common addresses and coupled to said arithmetic element controller means for responding to the same control signals so that all simultaneously perform the same reading and writing function during the same time period.

13. A processor system for operating with control element means and external device means comprising:
- arithmetic element controller means including a program memory for providing common control signals, an address generator for providing first and second common extended work store address signals and first and second common work store address signals and a coefficient store unit for providing common coefficient signals and for providing control signals to said program memory, said program memory responding to said control signals from said store unit to provide said common control signals;
- a plurality of combinations of arithmetic element units and extended work store units each extended work store unit having first and second sctions and sequentially reading from said first and second sections respectively in response to said first and second common extended work store address signals, each of said extended work store units coupled to said program memory for receiving selected ones of said common control signals, each arithmetic element unit including a work store unit, having first and second sections, a multiplier, parallel coupled first and second register and logic units and a limiter all respectively coupled in a pipe line configuration and all coupled to said program memory for receiving selected ones of said common control signals, said limiter coupled to said multiplier, to said work store unit and to said extended work store unit for selectively applying calculated data thereto, each work store unit sequentially reading from said first and second sections respectively in response to said first and second common work store address signals, said multiplier being selectively coupled to said work store unit and to said extended work store unit, said multiplier being coupled to said coefficient store unit for receiving said common coefficient signals;
- control delay means coupled between said program memory and said second register and logic units for causing each calculation in said second register and logic unit to be delayed one clock period from the calculation in said first register and logic unit and for delaying the coefficients used in each calculation of said second register and logic unit one clock period from the coefficients used in each calculation in said first register and logic unit; and
- an external interface unit coupled to said control element means, to said external device means, to said arithmetic element controller means and said plurality of extended work store units for transferring data to and from said external unit and selected ones of said extended work store units said external interface unit transferring data to and from said control element means, said external device means and said arithmetic element controller means.

14. The combination of claim 13 in which said external interface unit includes an access controller coupled to said control element means, to said arithmetic element controller means, and to said plurality of extended work store units for providing control for selectively applying addresses to said extended work store units, from either said arithmetic element controller means or from said control element means.

15. The combination of claim 14 in which said external interface unit includes device interface means to transfer data from selected ones to said extended work store units to said external device means, to transfer data from said external device means to selected ones of said extended work store units, to transfer data between said arithmetic element controller means and selected ones of said extended work store units and to transfer data between selected ones of said extended work store units.

16. The combination of claim 13 in which at least one of said plurality of combinations of arithmetic element units and extended work store units is a redundant combination and provides calculations along with the other of said plurality of combinations, and said arithmetic element controller means includes means to provide a failed word specifying that a specific arithmetic element unit and extended work store combination has failed and said external interface unit includes sequencing means for providing selection numbers for selecting extended work store units and responsive to said filed word indicating that a specific arithmetic element unit and extended work store combination has failed, to select an extended work store unit of said redundant combination for data transfer in place of the extended work store unit of the specific combination.

17. The combination of claim 16 in which said sequencing means includes a failed arithmetic element register for storing said failed word, a selection register for providing a register select number and comparison means coupled to said failed arithmetic element register and said selection register for providing said selection numbers with an external work store unit of a redundant combination substituted for an extended work store unit of a combination that has filed.

18. The combination of claim 17 in which said comparison means is a read only memory unit.

19. The combination of claim 12 in which said calculating means of each of said arithmetic element means includes a multiplier unit coupled to the work store unit and the associated extended work store unit, first and second register and logic units coupled in parallel to an output of said multiplier unit, said coupling of said limiter to said calculating means being from said first and second register and logic units to said multiplier unit, and in which said arithmetic element controller means includes a coefficient store unit coupled to the multiplier unit and to the first and second register and logic units in each of said arithmetic element means for providing said common coefficient data thereto.

20. The combination of claim 19 in which in each arithmetic element means, said multiplier unit includes a first register having an input coupled to said work store unit, and to the corresponding extended work store unit, a second register coupled to an output of said first register and to the input of said first register, and a multiplier coupled to the output of said first register and to said coefficient store unit, whereby data received in said first register selectively from said work store unit and said extended work store unit is applied to said multiplier and is also circulated through said second register to said first register for being multilied by coefficients from said coefficient store unit during two multiplication periods.

21. The combination of claim 19 in which said arithmetic element controller means includes an address generator for providing coefficient addresses and said coefficient store unit includes a coefficient store address register coupled to said address generator for receiving said address signals, a coefficient store address counter coupled to said coefficient store address register and a coefficient store memory coupled to said coefficient store address counter, whereby said coefficient store address register stores a reference address and said coefficient store address counter provides an address relative to said reference address.

22. An arithmetic unit responsive to clock means providing clock pulses at a clock pulse rate defining a plurality of sequential clock periods, responsive to a source of addresses and responsive to control means providing common control signals, comprising:

a source of operands coupled to respond to said clock means and coupled to said source of addresses for providing first and second operands during two sequential clock periods;

a source of coefficients coupled to respond to said clock means and coupled to said source of addresses for providing coefficient data during two sequential clock periods;

multiplier means coupled to said source of operands, coupled to said source of coefficients and coupled to said clock means to sequentially provide multiplier values during each of said two sequential clock periods;

first and second register and logic units coupled to said multiplier means and coupled to said clock means, each of said first and second register and logic units having available at least two clock periods to perform their computations, said first and second register and logic units coupled to said control means for receiving said common control signals;

one clock period control delay means coupled between said control means and said second register and logic unit; and means coupled to said first and second register and logic units for receiving computational results therefrom at a rate equal to said clock pulse rate.

23. The combination of claim 22 in which said source of operands includes a selectable work store unit and a selectable extended work store unit coupled to said multiplier means each for sequentially applying said first and second operands thereto, said source of coefficients being coupled to said first and second register and logic units, and in which said one clock period control delay means delays the application of said coefficient data to said second register and logic unit by one clock period.

24. The combination of claim 23 in which said work store unit and said extended work store unit each have first and second sections, said first and second sections for said work store unit receiving the same address and said first and second sections for said extended work store unit receiving the same address, said first and second sections of said work store unit and extended work store unit when selected, respectively providing said first and second operands.

25. In a processor system, the combination comprising:

a plurality of arithmetic element units each including a work store unit, a multiplier coupled to said work store unit and first and second register and arithmetic logic units coupled in parallel to aid multiplier, each of said work store units storing blocks of data words;

a plurality of extended work storage units each for storing blocks of data words, one of said extended work store units associated with each arithmetic element unit; and an arithmetic element controller that includes an address generator coupled to each of said work store units and to each of said extended work store units, a program memory coupled to each of said multipliers and to each of said first and second register and arithmetic logic units and a coefficient store unit being coupled to each of said multiplier units and to each of said first and second register and arithmetic logic units, said program memory including a section storing a plurality of subroutines and a section storing an executive routine for addressing groups of said subroutines, said coefficient store unit including a section storing a subroutine address table for providing starting subroutine addresses to said section of said program memory storing an executive routine.

26. The combination of claim 25 further including a control element and interface means coupled between said control element and said coefficient store unit for transferring subroutine address tables to said coefficient store unit to provide a desired system program.

27. A processor system comprising:

a plurality of calculating means;

a plurality of work store memories, one for each calculating means;

a plurality of extended work store memories, one for each calculating means;

a control signal storage means commonly connected to each of said plurality of calculating means;

a plurality of circuit means, each having two input circuits respectively coupled to receive outputs from the associated one of said plurality of work store memories and the associated one of said extended work store memories and each having an output circuit connected to the associated one of said plurality of calculating means for selectively coupling the output of said associated one of said plurality of work store memories and the output of said associated one of said plurality of extended work store memories to said calculating means;

an extended work store access controller connected to each of said plurality of extended work store memories;

an address generator providing enabling signals to said extended work store access controller and to each of said plurality of work store memories; and a program memory providing timing control signals connected to each of said plurality of circuit means, to said control signal storage means, to said address generator and to said extended work store access controller, for enabling an addressed extended work store memory to load data into said associated one of said plurality of calculating means, for providing priority control to said associated one of said plurality of work store memories and said associated one of said plurality of calculating means to perform arithmetic operations and storing of intermediate arithmetic results in said associated one of said plurality of work store memories and for operating said extended work store access controller to enable an addressed extended work store memory to receive arithmetic results from the associated one of said plurality of calculating means.

* * * * *